United States Patent [19]

Masten et al.

[11] 3,716,840

[45] Feb. 13, 1973

[54] MULTIMODAL SEARCH

[75] Inventors: Michael K. Masten, Richardson; William C. Choate, Dallas, both of Tex.

[73] Assignee: Texas Instruments Incorporated, Dallas, Tex.

[22] Filed: June 1, 1970

[21] Appl. No.: 42,429

[52] U.S. Cl. ....................340/172.5

[51] Int. Cl. ....................G06f 15/18

[58] Field of Search ....................340/172.5, 146.3

[56] References Cited

UNITED STATES PATENTS

| | | | |
|---|---|---|---|
| 3,388,381 | 6/1968 | Prywes et al. | 340/172.5 |
| 3,241,124 | 3/1966 | Newhouse | 340/172.5 |
| 3,346,844 | 10/1967 | Scott et al. | 340/172.5 |
| 3,551,895 | 12/1970 | Driscoll, Jr. | 340/172.5 |
| R26,772 | 1/1970 | Lazarus | 340/172.5 |
| 3,333,249 | 7/1967 | Clapper | 340/172.5 |
| 3,309,674 | 3/1967 | Lemay | 340/172.5 |
| 3,074,050 | 1/1963 | Shultz | 340/172.5 |

*Primary Examiner*—Gareth D. Shaw

*Attorney*—Samuel M. Mims, Jr., James O. Dixon, Andrew M. Hassell, Rene' E. Grossman, Harold Levine and James T. Comfort

[57] ABSTRACT

A trained processor is described which operates beyond an untrained point. Information is stored in a memory array in a tree-allocated file. Information is stored in the memory as key functions with associated trained responses. After the processor has been trained, it is able during an execution cycle, to find appropriate responses for query key functions. These query key functions are compared with the reference key functions stored in the memory array to find an appropriate trained response. During the execution cycle, there are some query keys for which there is no corresponding reference key function stored in the memory array, therefore, no readily apparent appropriate trained response for the query key. These query key functions for which there is no readily apparent trained response are termed untrained points. Thereupon a query key function which constitutes an untrained point is effectively compared with the reference key functions stored in the memory array to establish and store a difference function for stored reference key functions. Logic means then selects for the untrained point a trained response from those trained responses best satisfying a predetermined decision criteria. During the comparison operation, conditions are measured that indicate when reference key functions corresponding to a given group of trained responses cannot be an appropriate response for the untrained point in question. Logic means waive further examination of some stored reference key functions thereby greatly expediting the efficiency of search. In the multimodal search there are several modes of search, each mode further defining the item being searched.

4 Claims, 32 Drawing Figures

INVENTORS
MICHAEL K. MASTEN
WILLIAM C. CHOATE
ATTORNEYS

| NODES | 1 | 2 | 3 | 4 | | 40 | | | 5 | 6 | | 10 | | | | 7 | | | | 11 | 12 |
|---|---|---|---|---|---|---|---|---|---|---|---|---|---|---|---|---|---|---|---|---|---|
| ITOTAL | | | | 5 | | 4 | | | | | | 3 | | | | | | | | | |
| ITOT | 1 | 3 | 4 | 5 | 4 | 4 | 4 | 3 | 3 | 7 | 3 | 3 | 3 | 3 | 1 | 2 | 10 | 2 | 1 | 1 | 1 |
| IE(1) | 1 | | | | | | | | | | | | | | | | | | | | |
| IE(2) | | 2 | | | | | | | | | | | | | | 1 | | | | 0 | |
| IE(3) | | | 1 | | | | | | 0 | | | | | | | | 8 | | | | 0 |
| IE(4) | | | | 1 | | 0 | | | | 4 | | 0 | | | | | | | | | |
| IGI | | | | G 1214 | | G 1215 | | | | | | G 1224 | | | | | | | | | |
| IAI | | | | A 1214 | | A 1215 | | | | | | A 1225 | | | | | | | | | |
| JC | | | | 1 | | 1 | | | | | | 1 | | | | | | | | | |

| NODES | 13 | | | | | 14 | 15 | | 18 | 19 | 20 | | | 21 | | 23 | | | | 25 | | 39 |
|---|---|---|---|---|---|---|---|---|---|---|---|---|---|---|---|---|---|---|---|---|---|---|
| ITOTAL | 1 | | | | | | | | | | 1 | | | | | | | | | | | |
| ITOT | 1 | 1 | 1 | 1 | 0 | 0 | 2 | 0 | 0 | 0 | 1 | 0 | 0 | 2 | 0 | 3 | 0 | 0 | 0 | 5 | 0 | 6 |
| IE(1) | | | | | | 0 | | | | | | | | | | | | | | 5 | | 6 |
| IE(2) | | | | | | | 2 | | 0 | | | | | | | | | | | | | |
| IE(3) | | | | | | | | | | 0 | | | | 2 | | 3 | | | | | | |
| IE(4) | 0 | | | | | | | | | | 1 | | | | | | | | | | | |
| IGI | G 1425 | | | | | | | | | | G1425 G2424 | | | | | | | | | | | |
| IAI | | | | | | | | | | | A1425 A2424 | | | | | | | | | | | |
| JC | 1 | | | | | | | | | | 2 | | | | | | | | | | | |

Fig.20.

MULTIMODAL SEARCH

This invention relates to an expanded search employed when an untrained point is encountered using a tree-allocated file in trainable optimal signal processor.

This invention further relates to a multimodal search in a trainable processor using several modes of search.

This invention further relates to the nonlinear processors disclosed in Bose, U.S. Pat. No. 3,265,870, which represents an application of the nonlinear theory discussed by Norbert Weiner in his work entitled *Fourier Integral and Certain of Its Applications*, 1933, Dover Publications, Inc., and to the trainable signal processor systems described in co-pending patent application, Ser. No. 889,240 for a "Storage Minimized Optimum Processor," co-pending patent application, Ser. No. 889,421 for an "Expanded Search Method and System in Trained Processors" and co-pending patent application, Ser. No. 889,143 for "Probability Sort in a Storage Minimized Optimum Processor," each filed on Dec. 30, 1969, and assigned to the assignee of the present invention, and in co-pending patent application, Ser. No. 732,152, filed May 27, 1968 for "Feedback Minimized Optimum Filters and Predictors."

A trainable processor is a device or system capable of receiving and digesting information in a training mode of operation and subsequently operating on additional information in an execution mode of operation in the manner determined or learned during training.

The processes of receiving and digesting information comprise the training mode of operation. Training is accomplished by subjecting the processor to typical input signals together with the desired output or responses to those signals. The combined input and desired output signals used to train the processor are called training functions. During training the processor determines and stores cause-effect relationships between input signals and corresponding desired output. The cause-effect relationships determined during training are called trained responses.

The post training process of receiving additional information via input signals and operating on it in some desired manner to perform useful tasks is called execution. More explicitly, for the processors considered herein, the purpose of execution is to produce from the input signal an output, which is the best, or optimal, estimate of the desired output signal.

Such processors have a wide variety of application. In general, they are applicable to any problem in which the cause-effect relationship can be determined in training. In co-pending patent application, Ser. No. 889,241, filed Dec. 30, 1969, for "Expanded Search Method and System in Trained processors," provisions were described to accommodate untrained points during the execution phase of the processor. The untrained point is encountered when a set of execution signals is encountered that differs in at least one member from any set encountered during training and for which a trained response has been stored. There is no trained response for the untrained point. The Expanded Search patent application described provisions for the Expanded Search in response to an untrained point (set of input signals) to locate the trained response which most nearly corresponds with the input set for the untrained point in the sense that the most appropriate trained response for the untrained point is obtained.

For a more complete understanding of the present invention and for further objects and advantages thereof, reference may now be had to the following description taken in conjunction with the accompanying drawings in which:

FIG. 20 is a chart illustrating the contents of various registers of the computer during search operation in an execution operation;

Figure 1:
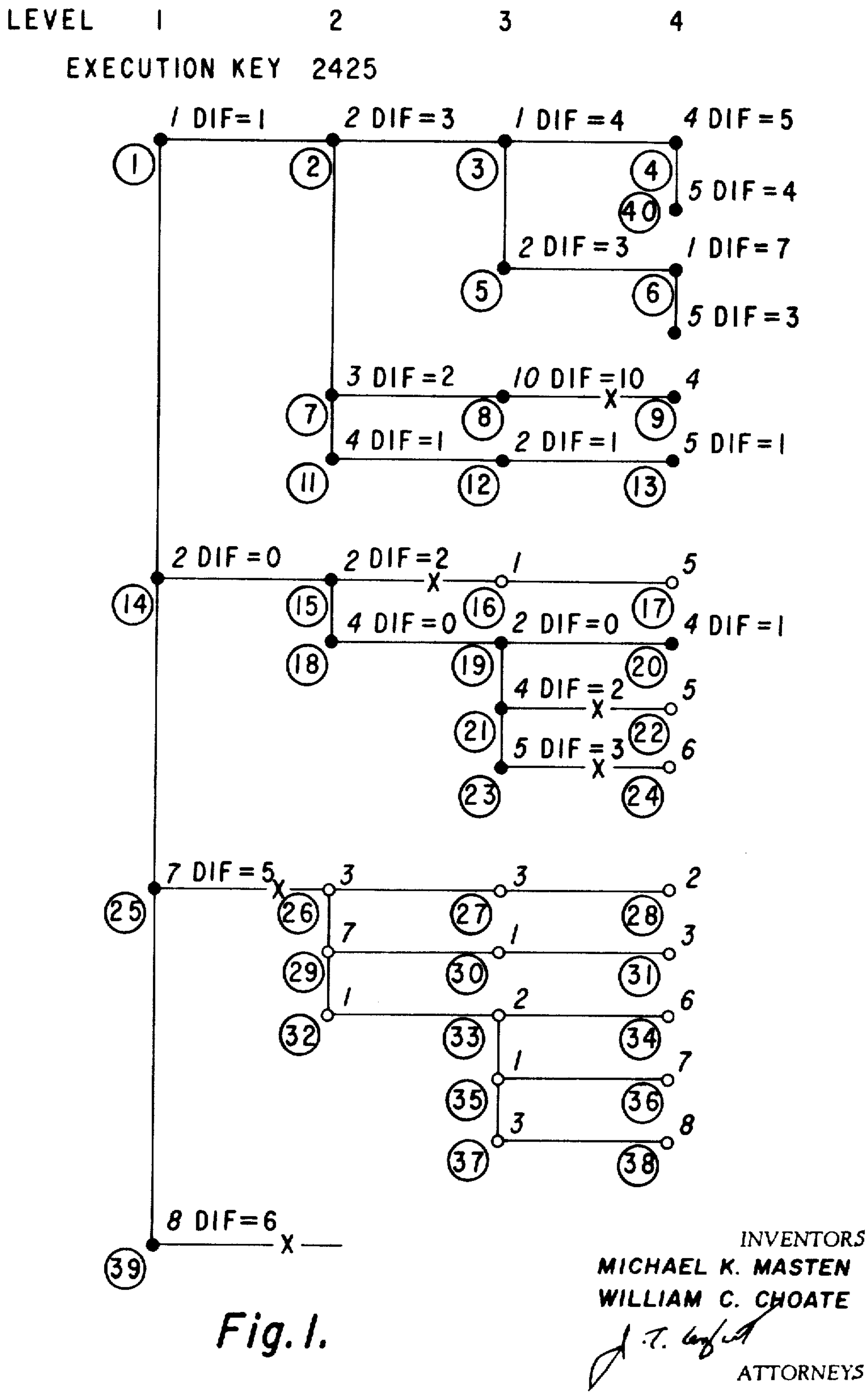
FIG. 1 illustrates schematically a computer representation of a tree with information stored therein.

Optimal, nonlinear processors may be of the type disclosed in Bose, U.S. Pat. No. 3,265,870. Such processors have a wide variety of applications. In general, they are applicable to any problem in which the cause-effect relationship can be determined via training. While the present invention may be employed in connection with processors of the Bose type, the processors disclosed and claimed in patent applications, Ser. No. 889,240, Ser. No. 889,241, Ser. No. 889,143, and Ser. No. 732,152 referred to above, will be briefly described forthwith to provide a setting for the description of the present invention.

The trained responses can be stored in a random access memory at locations specified by the keys, that is, the key can be used as the address of the memory at which the appropriate trained response is stored. Such a storage procedure is called direct addressing since the trained response is directly accessed. Such direct addressing, however, often makes very poor use of the memory because a sufficient number of storage registers must be reserved for all possible keys, whereas only a few of such keys may be generated in a specific problem. For example, the number of registers required to store all English words of 10 letters or less, using direct addressing, is $26^{10}$ > 100,000,000,000,000. Yet *Webster's New Collegiate Dictionary* contains fewer than 100,000 entries. Therefore, less than 0.000 000 1 percent of the storage that must be allocated for direct addressing would be utilized. In practice, it is found that this phenomenon carries over to many applications of trainable processors and much of the storage dedicated to training is never used. Furthermore, the mere necessity of allocating storage on a priori basis precludes a number of important applications because the memory required greatly exceeds that which is practical.

In order to avoid the problems created by direct addressing, tree structures are employed for the allocation and processing of information files. Generally, an operation based upon a tree structure is described by Sussenguth, Jr., Communications of the ACM, Vol. 6, No. V, May 1963, page 272, et seq. A tree-allocated array which is more closely related to the present invention is described in co-pending patent application, Ser. No. 889,240 referred to above. Training functions are generated for the purpose of training the processor. From such training functions are derived a set of key functions and for each unique value thereof a trained response is determined. The key functions and associated trained responses are stored as information in a memory array as a tree allocated file. Since key functions which do not occur are not allocated, storage is employed only on an "as needed" basis.

More particularly, the set of information comprising the input signal $u$ is utilized to define the key function. For the purpose of the tree allocation, the key is decomposed into components called key components. A natural decomposition is to associate one key component with each component of the input signal $u$, although this choice is not fundamental. Further, it will be seen that the definition of key component places it in association with a level in the tree structure. Therefore, all levels of the tree are essential to represent a key. The term "level" and other needed terminology will be introduced hereafter.

A graph comprises a set of nodes and a set of unilateral associations specified between pairs of nodes. If node $i$ is associated with node $j$, the association is called a branch from initial node $i$ to terminal node $j$. A path is a sequence of branches such that the terminal node of each branch coincides with the initial node of the succeeding branch. Node $j$ is reachable from node $i$ if there is a path from node $i$ to node $j$. The number of branches in a path is the length of the path. A circuit is a path in which the initial node coincides with the terminal node.

A tree is a graph which contains no circuits and has at most one branch entering each node. A root of a tree is a node which has no branches entering it, and a leaf is a node which has no branches leaving it. A root is said to lie on the first level of the tree, and a node which lies at the end of a path of length $(j-1)$ from a root is on the $j^{th}$ level. When all leaves of a tree lie at only one level, it is meaningful to speak of this as the leaf level. Such uniform trees have been found widely useful and, for simplicity, are solely considered herein. It should be noted, however, that nonuniform trees may be accommodated as they have important applications in optimum nonlinear processing. The set of nodes which lie at the end of a path of length one from node $x$ comprises the filial set of node $x$, and $x$ is the parent node of that set. A set of nodes reachable from node $x$ is said to be governed by $x$ and comprises the nodes of the subtree rooted at $x$. A chain is a tree, or subtree, which has at most one branch leaving each node.

In the present system, a node is realized by a portion of storage consisting of at least two components, a node value designated VAL and an address component designated ADP. The node value serves to distinguish a node from all other nodes of the filial set of which it is a member and corresponds externally to the key component which is associated with the level of the node. The ADP component serves to identify the location in memory of another node belonging to the same filial set. Thus, all nodes of a filial set are linked together by means of their ADP components. These linkages commonly take the form of a "chain" of nodes constituting the filial set, and it is therefore meaningful to consider the first member of the chain the entry node and the last member the terminal node. The terminal node may be identified by a distinctive property provided to its ADP. In addition, a node may commonly contain an address component ADF plus other information. The ADF links a given node to the entry node of its filial set. Since in some applications the ADF can be computed, it is not found in all tree structures.

In operation, the nodes of the tree are processed in a sequential manner with each operation in the sequence defining in part a path through the three which defines the key and provides access to the appropriate trained response. This sequence of operations, in effect, searches the tree allocated file to determine if an item corresponding to the particular key function is contained therein. If during training the item cannot be located, the existing tree structure is augmented so as to incorporate the missing item into the file. Every time such a sequence is initiated and completed, the processor is said to have undergone a training cycle.

Figure 5:
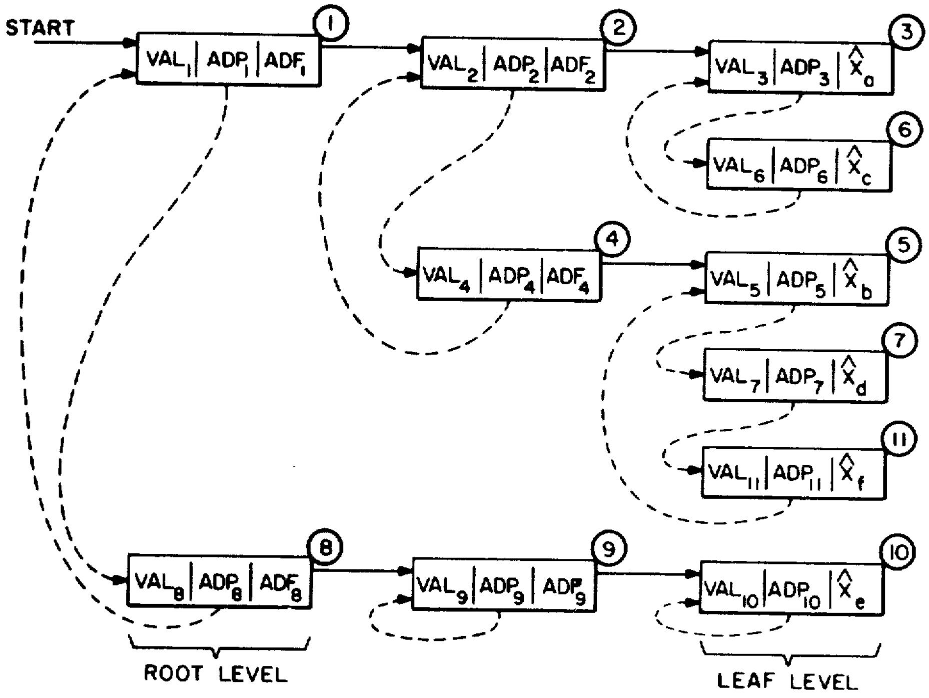
FIG. 5 illustrates schematically a computer representation of a doubly chained tree.

The operations of the training cycle can be made more concrete by considering a specific example. Consider FIG. 5 wherein a tree structure such as could result from training a processor is depicted. The blocks represent the nodes stored in memory. They are partitioned into their VAL, ADP, and ADF components. The circled number associated with each block identifies the node and corresponds to the location (or locations) of the node in memory. As discussed, the ADF of node $x$ links $x$ to the entry node of its filial set and the ADP links $x$ to another node in the set containing $x$ provided such an unlinked nodes exists. For example, in FIG. 5, $ADP_1$ links node 1 to node 8 and $ADF_1$ links node 1 to node 2. In FIG. 5 the trained responses are stored in lieu of ADF components at the leaf nodes. ADF components are absent in leaves since they have no progeny. Alternatively, the ADF component of the leaves may contain the address at which the trained response is stored. In this setting the system inputs determine key components and are compared successively with node values at appropriate levels of the tree.

When the node value matches a key component, the node is said to be selected and operation progresses via the ADF to the next level of the tree. If the value and key component do not match, the node is tested, generally by testing the ADP, to determine if other nodes exist within the set which have not been considered in the current training cycle. If an additional node exists, transfer is effected to that node as specified by the ADP and the value of that node is compared with the key component. Otherwise, a node is created and linked to the set by the ADP of what previously was the terminal node. The created node, which becomes the new terminal node, is given a value equal to the key component, an ADP indicating termination, and and ADF initiating a chain of nodes through the leaf node.

When transfer is effected to the succeeding level, the operations performed are identical to those just described provided a leaf has not been reached. At the leaf level if a match is obtained, the trained response is accessed either as a node component or from the address derived from this component. For simplicity it will be assumed in the following that the trained response is stored as a node component.

Operations within a single level whereby a node is selected or added is termed a level iteration. Thus, the first level iteration is completed when either a node of the first level is selected or a new one added.

Note in FIG. 5 that the node location specified by the ADF is always one greater than the location containing the ADF. Clearly, in this situation the ADF is superfluous and may be omitted to conserve storage. However, all situations do not admit to this or any other simple relationship, whence the ADF component is essential. By way of example for such necessity, the co-pending application, Ser. No. 889,143, filed Dec. 30, 1967, and entitled "Probability Sort In A Storage Minimized Optimum Processor," discloses such a need. The ADF is used in some of the following discussions and not used in other discussions. The probability sort is described in more detail later in this description.

Training progresses in the above manner with each new key function generating a path through the tree defining a leaf node at which the trained response is stored. All subsequent repeated keys serve to locate and update the appropriate trained response. During training the failure to match a node value with the output of the corresponding key component serves to instigate the allocation of new tree storage to accommodate the new information.

Figure 2:
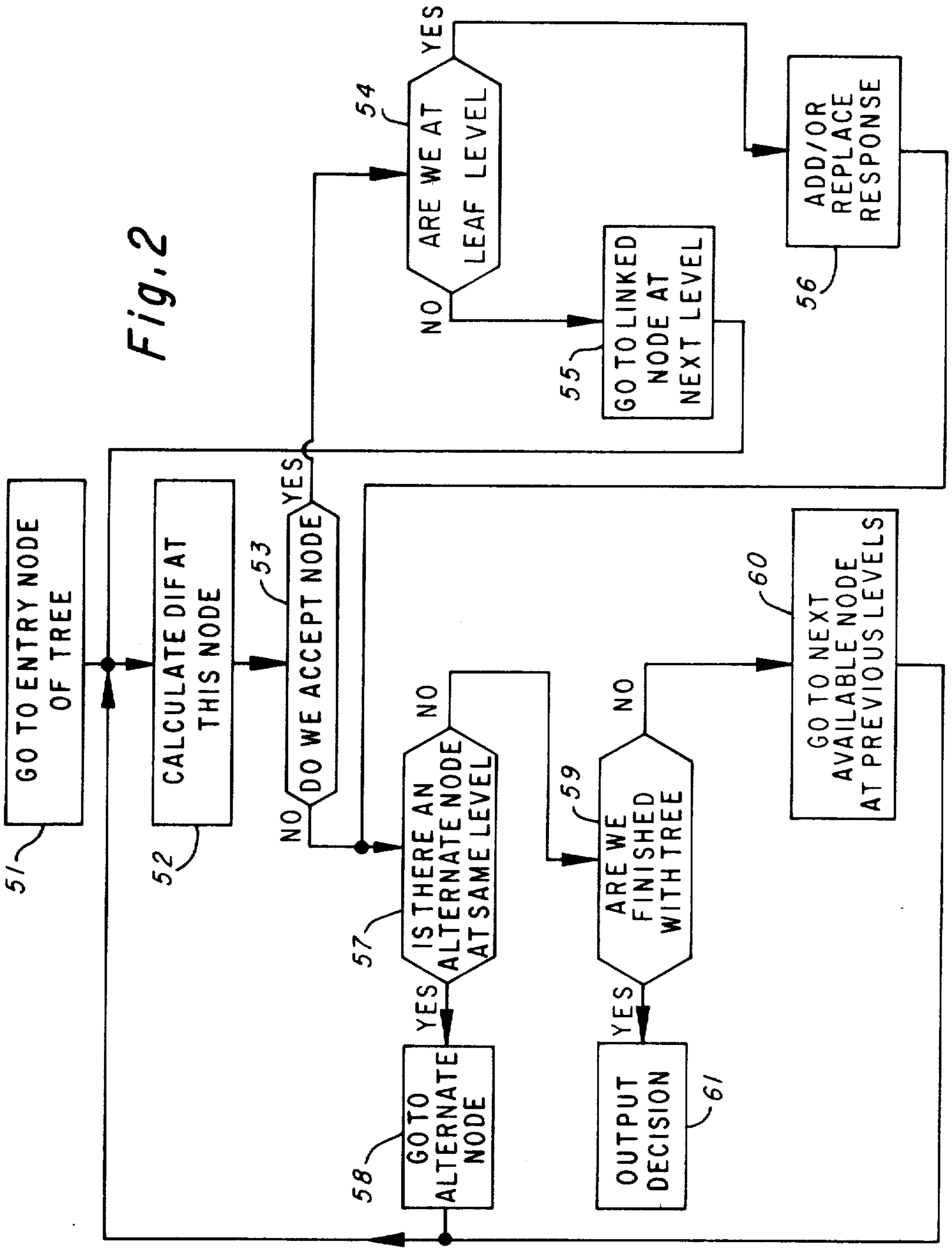
FIG. 2 is a generalized flow diagram illustrating an optimum processor in which when an untrained point is encountered, expanded search provides a trained response for the untrained point, and waiver of search occurs during the search operation under certain conditions.

Referring now to FIGS. 1 and 2 for a general description of trainable processor constructed according to this invention, some general definitions are given first before describing the processor. Following this general description is a more detailed description.

DEFINITIONS

Trainable Processor

A trainable processor is a device or system capable of receiving and digesting information in a training mode of operation and subsequently operating on additional information in an execution mode of operation in a manner learned in accordance with training.

The process of receiving information and digesting it constitutes training. Training is accomplished by subjecting the processor to typical input signals together with the desired outputs or responses to these signals. The input/desired output signals used to train the processor are called training functions. During training the processor determines and stores cause/effect relationships between input and desired output. The cause-effect relationships determined during training are called trained responses.

The post training process of receiving additional input signals and operating on them in some desired manner to perform useful tasks, is called execution. More particularly, for the processors considered herein, the purpose of execution is to produce from the input signal an output, called the actual output, which is the best, or optimal, estimate of the desired output signal.

Processor Tree Storage

A tree structure as shown in FIG. 1 is used for the allocation and processing of information. The construction of a tree is described in detail later in this description. For the purposes of this immediate description assume that a plurality of keys with their trained responses have been stored in the tree as shown in FIG. 1. The training key was divided into four key components as shown in FIG. 1. Each of the four key components is stored as a value of a node of the tree. Each node is a register in a memory which is capable of storing information. A uniform tree such as the tree described and shown with relation to FIG. 1, has the same number of levels as the number of components constituting the key. For instance with a four component key there will be four levels. The nodes at the first level will have stored as values numbers representative of the first component of the key. The nodes at the second level will have stored as values numbers representative of the second component of the key. The third level nodes will have values representative of the third key component and the fourth level nodes will have values representative of the fourth key component. Each of the nodes contain address information locating other nodes to be searched during a training or execution cycle.

These linkages are described later in the description. For the immediate purposes of this description, lines are drawn showing the manner in which the nodes are linked together.

The nodes in FIG. 1 are indicated by a solid dot. The node numbers themselves are indicated by a number with a circle around it to the left of the node. The value in the node is indicated by a number to the upper right of the node.

Expanded Search

An untrained point is defined as an execution key for which no corresponding item is contained in the file during an execution cycle. Since the processor was not trained on such a key, there is no trained response for that key. Expanded search which is referred to in the following description is the operation wherein after an untrained point has been encountered, action is taken in the processor to find the most appropriate trained response for that untrained point.

Entry Node and Leaf Level

The entry node of a tree is the root node first examined during execution or training. The leaf level is the last level of the tree. In a uniform four level tree such as that shown in FIG. 1 the fourth level is the leaf level.

Node Rejection

The objective of expanded search is to examine the keys stored during training to locate the one most appropriate to the untrained point. All stored keys need not be completely examined during this search. The operation termed node rejection is a procedure whereby expanded search is carried out more efficiently. In node rejection the expanded search is carried out without completely examining each key. During expanded search conditions may arise that indicate a given group of keys (hence the associated trained responses) cannot be an appropriate response for an untrained point. In this event further examination of such keys is waived. In this specific description such a waiver of further examination is carried out by node rejection. There may be several criteria or combinations of criteria by which a node is rejected or a group of responses not examined.

DIF

DIF is a function which operates on a node value in the tree and the corresponding query key component to yield a value having the properties of a distance metric and which is employed in determining the response in the expanded search. The properties of the DIF function and some examples are given below.

The notation, DIF (I,X,Y) implies DIF is a function of three arguments:

I — Level of the tree where node value X is stored
X — Value of a node in the tree
Y — Query key component corresponding to X The query key components and node values may be either scalar or vector. The level of the tree, I, provides a means for defining alternate DIF functions as a function of tree level. In general, the value returned by DIF is a scalar having the properties of a distance metric relating X and Y. These properties are given below:

PROPERTIES OF DIF

1. $DIF(I,X,Y) \geq 0$
2. $DIF(I,X,Y) = 0$ if and only if $X = Y$
3. $DIF(I,X,Y) = DIF(I,Y,X)$
4. $DIF(I,X,Y) \leq DIF(I,X,Z) + DIF(I,Z,Y)$ It will be noticed that these properties hold for the several DIF functions considered in the following.

EXAMPLES

1. $DIF(I,X,Y) = |X-Y|$

This simple example is applicable to cases where X and Y are scalars. DIF returns the absolute value of the numeric difference between scalars X and Y without regard to the level in the tree. That is, for every level, DIF returns the absolute value of the difference between a node value and the corresponding key component. This simple DIF is employed in the several examples of expanded search in this application.

2. $DIF(I,X,Y) = (X-Y)^2$

This example, also applicable to scalar X and Y values, uses as a measure of similarity the square of the difference between X and Y.

3. $DIF(I,\underline{X},\underline{Y}) = \|X-Y\|^2$

This is an analog of the DIF of Example (1) but which applies to the case where $\underline{X}$ and $\underline{Y}$ are vectors. For example, suppose $\underline{X}$ and $\underline{Y}$ are n dimension vectors, $\underline{X} = [X_1 X_2 ... X_n]$, $\underline{Y} = [Y_1 Y_2 ... Y_n]$, then the value for this DIF is $$DIF(I,X,Y) = (X_1-Y_1)^2 + (X_2-Y_2)^2 + ... (X_n-Y_n)^2$$

and the operation is identical for all levels.

4. $DIF(I,X,Y) = W(I)|X-Y|$

This is analogous to (1) with the exception that the absolute differences at different levels are given varying amounts of importance or weight by multiplication by a weighting factor W(I) which is a function of the tree level. The weights W(I) are predetermined, possibly through a training or other optimization procedure.

5. $DIF(I,X,Y) = \|X-Y\|^2 W(I)$

This is the weighted version of (3) and for the case where $\underline{X}$ and $\underline{Y}$ are n dimensioned vectors, $$DIF(I,X,Y) = W_1(I)(X_1-Y_1)^2 + W_2(I)(X_2-Y_2)^2 + ... W_n(I)(X_n-Y_n)^2$$

Other DIF functions can easily be added to these examples the most general of which can be provided by table lookup involving addresses I, X, and Y.

EXAMPLES OF WAIVER OF EXAMINATION OR NODE REJECTION

1. The first example employs a DIF such that the reference key selected by the search has minimum Hamming Distance (i.e., signal distance) to the query key. Hamming distance is the number of bits which are not the same in two binary words of equal length. In this example the DIF of example 3 above can be employed, and X and Y are vectors whose elements are O or 1. Thus the Hamming distance is the accumulation of DIF(I,X,Y) for I = 1,2, ... N for a N level tree. Node rejection occurs in this procedure whenever the partial Hamming distance defined up to any node exceeds the best previous total Hamming distance between the query key and a trained key. This is based on the property that the partial Hamming distance is monotonic positive.
2. The second example is where a given node contribution to the total Hamming distance as determined by DIF exceeds a preassigned threshold. This threshold can vary during the search operation in a way which may relate to a physical property of the input and the particular dichotomy of the key into key components.
3. The third example is where a majority rule is employed in node rejection:
   a. In an application where the key components are in binary form, binary 1 and binary zeros of the node value are counted and the binary ones and binary zeros of the key component are counted, and counts compared. If both the node values and the key components have the same majority, that is a predominance of 1's or a predominance of 0s, search operation is continued. Otherwise, further search of that node is discontinued.

b. In (a) the majority rule applies to each node individually, i.e., a node is rejected if its majority does not agree with the query majority. A modification of this is the process by which a node, say node X, is rejected if the majority of the key components through the level of node X do not agree with the majority of the node values for the nodes lying on a path from a root through X. Thus at the first level rejection can occur based on majority rule at the first level. At the second level rejection can occur based on majority rule through two levels of comparison. This continues until the final level at which rejection occurs based on total majority comparison.

BROAD DESCRIPTION OF NODE REJECTION

Refer now first to FIG. 1 and FIG. 2 for the general description of the processor. In the following description, the tree has been established in Training as shown in FIG. 1 and the following description is concerned with an execution. The execution key is 2-4-2-5. The tree is a four level uniform tree.

Using the flow chart of FIG. 2 starting with instruction 51, the entry node of the tree is node 1. The DIF between the key component 2 and the value 1 is calculated in step 52, the decision is made in step 53 to accept the DIF calculation for node 1, and continue to decision point 54. The search is not at the leaf level, but at the first level. Therefore the search continues following instruction 55 to the next linked node at the next level which is node 2 at level 2. The search branches back to instruction 52 wherein the DIF between key component 4 and the value 2 at node 2 is calculated, and accepted. The search is not at the leaf level. The search continues to the next linked node at the next level which is node 3 at level 3, and the search branches back to step 52 where the DIF is calculated for node 3. This node is accepted. The search is not at the leaf level. The search branches to the next linked node of the next level, which is node 4 at the fourth level where the DIF at node 4 is calculated for a total DIF of 5 for trained key 1-2-1-4. This DIF calculation is accepted and the search is at the leaf level. Node 4 is at the leaf level so instruction 56 stores the trained response for the execution key 2-4-2-5 in storage since this is the first search. The trained response stored at this point is the trained response corresponding to the key having the best DIF found to this point in the search which is the trained response corresponding to trained key 1-2-1-4.

Instruction 57 asks if there is an alternate node at the same level. There is an alternate node 40 also in level 4, and the DIF for node 40 is calculated.

The DIF at node 40 is calculated for a total DIF of 4 for trained key 1-2-1-5. Decision point 53 asks if the total DIF for trained key 1-2-1-5 is equal to or better than the total DIF for the previously accepted key. The total DIF of 4 is better than the total DIF of 5 so this node comparison is accepted. The search is at the leaf level, and as the trained response for trained key 1-2-1-5 is better than the trained response for trained key 1-2-1-4, the trained response for trained key 1-2-1-5 replaces the trained response for key 1-2-1-4 in storage. There is no alternate node at the fourth level, and in decision point 59 the search has not finished the tree. In decision point 60 the search continues at the next available node at previous levels.

The next available node at a previous level is node 5 at level 3. The total DIF to node 5 is calculated as 3. According to decision point 53 the total DIF of 3 at node 5, level 3, is less than the total DIF of 4 for trained key 1-2-1-5 and is accepted. The search is not at the leaf level, so the search continues at the next linked node, node 6 and the DIF is calculated for node 6. The total DIF is 7 and this DIF of 7 is greater than the best previous total DIF of 4 and this node is rejected. There is an alternate node 10 at the fourth level so the DIF is calculated for node 10. The total DIF is 3. The DIF of 3 is better than the previous best DIF of 4, so the search of node 10 is accepted. According to decision point 54 the search is at the leaf level, and as the DIF of 3 is better than the best previous DIF of 4, the trained response for the trained key 1-2-2-5, with a DIF of 3, has the best DIF so far in the search. Therefore, the trained response for this trained key 1-2-2-5 replaces the response for the key with the best previous DIF. Following the flow diagram to decision point 57 there is not an alternate node at the same level. The search is not finished with the tree, and the next available node at the previous levels is node 7 at level two.

Following the flow diagram to instruction 52 a total DIF of 2 is calculated at node 7. This DIF of 2 is better than the best previous total DIF of 3 at this level so that node 7 is accepted according to decision point 53. The search is not at the leaf level so the search continues to the next linked node at the next level which is node 8 at level 3. A total DIF of 10 is calculated for node 8. This total DIF of 10 is worse than the best previous total DIF of 3 so this node is not accepted. This node rejection is shown by an X marked across the linkage between node 8 and node 9. There is no alternate node at this third level and as search has not completed the tree, the search continues at the next available node at the previous levels which is node 11 at level 2. The total DIF at node 11 is calculated as 1. This total DIF of 1 is better than the previous best DIF of 3 so node 11 is accepted. The search is not at the leaf level so the search extends to the linked node at the next level which is node 12 at the third level. The total DIF of 1 is calculated at node 12 which is better than the best previous DIF of 3 and node 12 is accepted. The search is not at the leaf level according to decision point 54 so that the search extends to the linked node at the next level which is node 13 at the fourth level. According to the instruction 52, the total DIF is calculated at node 13 as 1. This total DIF of 1 is better than the best previous DIF of 3 so that node 13 is accepted and the search is at the leaf level. The total DIF of 1 for the trained key of 1-4-2-5 is better than the best previous DIF so that the trained response for this trained key 1-4-2-5 is stored and replaces the trained response for trained key 1-2-2-5.

Following the flow diagram, decision point 57 asks if there is an alternate node at the same level. There is not an alternate node to level 4 at node 13 and the search has not finished the tree. The search continues at the next available node 14 at level 1. The DIF is calculated for node 14, according to instruction 52, as 0 so that node 14 is accepted. The search is not at the leaf level so that the search continues at the next linked node 15 at the next level 2 according to instruction 55. The total DIF is calculated for node 15 of 2. The DIF of 2 is not better than the best previous DIF of 1 so that node 15 is not accepted and no further search continues along that linkage. There is no alternate node available at the same level according to decision point 57 and the search has not finished the tree. Therefore the search goes to the next available node 18 at level 2. The DIF is calculated as 0. This DIF of 0 is better than the best previous DIF so the node 18 is accepted. The search is not at the leaf level so the search proceeds to the linked node of the next level which is node 19 at the third level. The total DIF is calculated for node 19 as 0 which is better than the best previous DIF so that this node is accepted. The search is not at the leaf level so according to decision point 54 the search proceeds to the linked node at the next level which is node 20 at the fourth level. The total DIF is calculated at node 20 as 1. This total DIF is the same DIF as previously calculated at node 13 so this node calculation is accepted. The search is at the leaf level. Therefore the trained response for the trained key 2-4-2-4 is added to the trained response already stored according to the instruction 56. Following the flow diagram there is not an alternate node at the same level, and the search has not finished the tree. The next available node at the previous levels is node 21 at level 3 and the total DIF is calculated at this node as 2. This DIF of 2 is greater than the best previous total DIF of 1 so this node is rejected as shown with the X across the linkage between nodes 21 and 22. There is an alternate node 23 at the level 3 so the DIF is calculated at node 23. This total DIF of 3 is not equal to or better than the best previous DIF so that node 23 is rejected.

There is not an alternate node in the same filial set at the third level and the search has not finished the tree. The next available node at the previous levels is node 25 at the first level. The DIF is calculated for node 25 as 5. This DIF of 5 is worse than the best previous total DIF of 1 so that node 25 is not accepted. There is an alternate node 39 at the same level. The DIF is calculated for node 39 as 6 and this DIF is worse than the best previous total DIF of 1 so this node is not accepted. This is signified by an X across the linkage between node 39 and any subsequent node. There is no alternate node at that level. The search is finished in the tree and the flow diagram continues to the output decision step 61. The output decision decides which of the trained responses corresponding to the trained keys 1-4-2-5 and/or 2-4-2-4 is to be used as a trained response for the execution key 2-4-2-5. The output decision is described in detail later in the description.

TRAINING PHASE

Following is a detailed description of the training phase of the processor with reference to the feedback system.

In the following description, the use of a bar under a given symbol, e.g., $u$, signifies that the signal so designated is a multicomponent signal, i.e., a vector. For example, $u = [u_1(t)\ u_2(t)]^T$, where $u_1(t) = u(t)$, and $u_2(t) = [u(t) - u(t-T]$. The improvement in the processor disclosed in Ser. No. 732,152 is accomplished through the use of a feedback component derived from the delayed output signal, $x(t - T)$. This component serves as a supplemental input which typically conveys far more information than a supplemental input vector derived from the input sequence $u(t - kT)$, $k = 1, 2,$ of the same dimensionality. Thus the storage requirements for a given level of performance are materially reduced. As in the Bose patent, the processor is trained in dependence upon some known or assumed function $z$ which is a desired output such that the actual output function $x$ is made to correspond to $z$ for inputs which have statistics similar to $u$. Thereafter, the processor will respond to signals $u'$, $u''$, etc., which are of the generic class of $u$ in a manner which is optimum in the sense that the average error squared between $z$ and $x$ is minimized. In the following description, the training phase will first be discussed following which the changes to carry out operations during execution on signals other than those used for training will be described.

Figure 3:
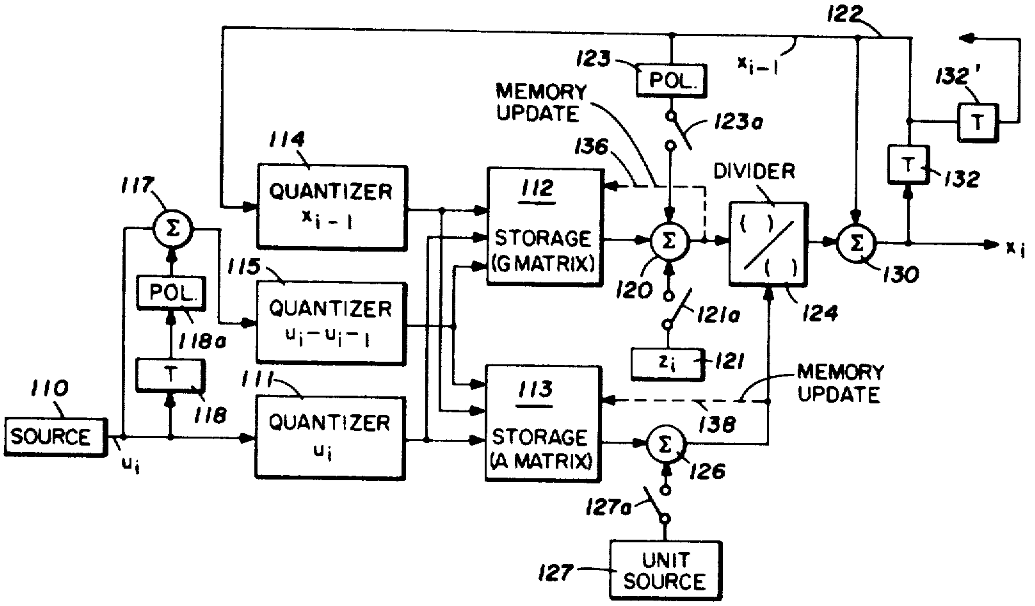
FIG. 3 is a block diagram of one embodiment in applicant's prior system.

In FIG. 3 the first component of signal $u$ from a source 110 forms the input to a quantizer 111. The output of quantizer 111 is connected to each of a pair of storage units 112 and 113. The storage units 112 and 113 will in general have like capabilities and will both be jointly addressed by signals in the output circuits of the quantizer 111 and quantizers 114 and 115 and may indeed be a simple storage unit with additional word storage capacity. The storage units 112 and 113 are multielement storage units capable of storing different electrical quantities at a plurality of different addressable storage locations, either digital or analog, but preferably digital. Unit 112 has been given a generic designation in FIG. 3 of G MATRIX and unit 113 has been designated as an A MATRIX. As in application, Ser. No. 732,152, the trained responses of the processor are obtained by dividing G values stored in unit 112 by corresponding A values stored in unit 113.

The third quantizer 115 has been illustrated also addressing both storage units 112 and 113 in accordance with the second component of the signal $u$ derived from source 110, the delay 118 and the inversion unit 118*a*. More particularly, if the signal sample $u_t$ is the contemporary value of the signal from source 110, then the input applied to quantizer 115 is $u_t - u_{t-1}$. This input is produced by applying to a summing unit 117 $u_t$ and the negative of the same signal delayed by one sample increment by the delay unit 118. For such an input, the storage units 112 and 113 may be regarded as three dimensional matrices of storage elements. In the description of FIG. 3 which immediately follows, the quantizer 115 will be ignored and will be referred to later.

The output of storage unit 112 is connected to an adder 120 along with the output of a unit 121 which is a signal $z_t$, the contemporary value of the desired output signal. A third input is connected to the adder 120 from a feedback channel 122, the latter being connected through an inverting unit 123 which changes the sign of the signal.

The output of adder 120 is connected to a divider 124 to apply a dividend signal thereto.

The divisor is derived from storage unit 113 whose output is connected to an adder 126. A unit amplitude source 127 is also connected at its output to adder 126.

The output of adder 126 is connected to the divider 124 to apply the divisor signal thereto. A signal representative of the quotient is then connected to an adder 130, the output of which is contemporary value $x_i$ the processor output. The adder 130 also has a second input derived from the feedback channel 122. The feedback channel 122 transmits the processor output signal $x_i$ delayed by one unit time interval in the delay unit 132, i.e., $x_{i-1}$. This feedback channel is also connected to the input of the quantizer 114 to supply the input signal thereto.

A storage input channel 136 leading from the output of adder 120 to the storage unit 112 is provided to update the storage unit 112. Similarly, a second storage input channel 138 leading from the output of adder 126 is connected to storage unit 113 and employed to update memory 113.

During the training phase, neglecting the presence of quantizer 115, the system operates as will now be described. The contemporary value $u_i$ of the signal $u$ from source 110 is quantized in unit 11 simultaneously with quantization of the preceding output signal $x_{i-1}$ (which may initially be zero) by quantizer 114. The latter signal is provided at the output of delay unit 132 whose input-output functions may be related as follows:

$T$ is the delay in seconds, $x_i = x(iT + t_o)$, and $x_{i-1} = x[(i-1)T + t_o]$, where $i$ is an integer, T is the sampling interval, and $t_o$ is the time of the initial sample. The two signals thus produced by quantizers 111 and 114 are applied to both storage units 112 and 113 to select in each unit a given storage cell. Stored in the selected cell in unit 112 is a signal representative of previous value of the output of adder 120 as applied to this cell by channel 136. Stored in the corresponding cell in unit 113 is a condition representative of the number of times that that cell has previously been addressed, the contents being supplied by way of channel 138. Initially all signals stored in both units 112 and 113 will be zero. The selected stored signals derived from storage array 112 are applied synchronously to adder 120 along with $z_i$ and $-x_{i-1}$ signals.

The contemporary output of adder 120 is divided by the output of adder 126 and the quotient is summed with $x_{i-1}$ in adder 130 to produce the contemporary processor response $x_i$. The contemporary value $x_i$ is dependent on the contemporary value $u_i$ of $u$, the contemporary value $z_i$ of the desired output $z$ and negative of $x_{i-1}$, i.e.: $(-x_{i-1})$ as well as the signals from the addressed storage cells.

FIG. 3 — EXECUTION PHASE

The system shown in FIG. 3 establishes conditions which represent the optimum nonlinear processor for treating signals having the same statistics as the training functions $[u(t), z(t)]$ upon which the training is based.

After the system has been trained based upon the desired output $z$ over a statistically significant sequence of $u$ and $z$, the switches 121*a*, 123*a*, and 127*a* may then be opened and a new input signal $u'$ employed whereupon the processor operates optimally on the signal $u'$ in the same manner as above described but with the three signals $z_i$, $x_{i-1}$ and unity no longer employed within the update channels. Accordingly, storage units 112 and 113 are not updated.

In the system as shown in FIG. 3, quantizer 115 provides an output dependent upon the differences between sequential samples $u_i$ and $u_{i-1}$, employing a delay unit 118 and a polarity reversal unit 118*a*. In this system a single delay unit 118 is provided at the input and a single delay unit 132 is provided at the output. In general, more delays could be employed on both input and output suggested by 132' shown in FIG. 3. In use of the system with quantizer 115, storage units 112 and 113 may conveniently be regarded as three dimensional. Of course, elements of the input vector and output vector are, in general, not constrained to be related by simple time delays, as for this example and, more generally, the feedback component may relate to the state of the system at $t_{i-1}$ rather than to a physical output derived therefrom. The approach used in FIG. 3 effectively reduces the number of inputs required through the utilization of the feedback signal, hence generally affords a drastic reduction in complexity for comparable performance. Despite this fact, information storage and retrieval can remain a critical obstacle in the practical employment of processors in many applications.

The trained responses can be stored in random access memory at locations specified by the keys, that is, the key can be used as the address in the memory at which the appropriate trained response is stored. Such a storage procedure is called direct addressing since the trained response is directly accessed.

In an effort to implement direct addressing, the number of key combinations can be reduced by restricting the dynamic range of the quantizers or decreasing the quantizer resolution as used in FIG. 3. For a fixed input range increasing resolution produces more possible distinct keys and likewise for a fixed resolution increased dynamic range produces more keys. Thus with direct addressing these considerations make some applications operable only with sacrificed performance due to coarse quantization, restricted dynamic range, or both. However, when using tree allocation procedure, memory is used only as needed. Therefore, quantizer dynamic range and resolution are no longer predominated by storage considerations.

In practice quantization can be made as fine as desired subject to the constraints that as resolution becomes finer more training is required to achieve an adequate representation of the training functions and more memory is required to store the trained responses. Thus, resolution is made consistent with the amount of training one wishes or has the means to employ and the memory available.

Figure 4:
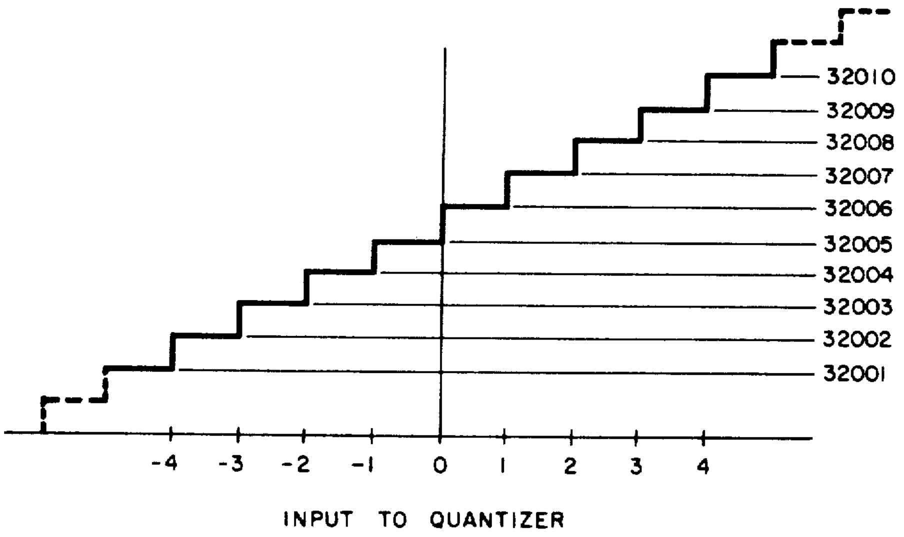
FIG. 4 illustrates a technique of "infinite quantization;"

As discussed previously, when the tree allocation procedure is used, the numerical magnitude of a particular node value is independent of the location or locations in memory at which the node is stored. This provides a good deal of flexibility in assigning convenient numerical magnitudes to the quantizer outputs. As is shown in FIG. 4, the numbers in the region of 32,000 were selected as quantizer outputs to emphasize the independence of the actual magnitude of quantizer outputs and because they corresponded to half of the dynamic range provided by the number of bits of storage of the ADP field of the nodes. Thus, as seen in FIG. 4, if the input to a quantizer is between 0 and 1, the output of said quantizer is 32,006. Any other magnitude would have served equally well. The resolution can be increased or decreased by changing the horizontal scale so that the input range which corresponds to a given quantizer value is changed. For example, if the scale is doubled, any input between 0 and 2 would produce 32,006, any input between 2 and 4 would yield 32,007, etc., so that resolution has been halved. Likewise, the quantizer ranges can be nonuniform as evidenced by nonuniform spacing on the horizontal scale thus achieving variable resolution as might be desirable for some applications.

Another benefit to be realized from the latitude of the quantizations of FIG. 4 is that the range of the input variables does not need to be known a priori since a wide range of node values can be accommodated by the storage afforded by the VAL field. If the input signal has wide variations, the appropriate output values will be generated. The dashed lines in FIG. 4 imply that the input signal can assume large positive and negative values without changing the operating principle. In effect, the quantizers behave as though they have infinite range. This arrangement is referred to as "infinite quantizing." While the numerical value from the quantizer is not critical, it still must be considered because the larger the number, the more bits of memory will be required to represent it. Therefore, in applications where storage is limited, the output scales of FIG. 4 might be altered.

TRAINING AND EXECUTION

Following is a specific description of the growth of a tree during training and a search during execution. For this description the ADF is not specifically described nor used, since it is calculatable from the structure. That is the ADF linkage from node X is to node X+1.

FIRST TRAINING CYCLE

Figure 6:
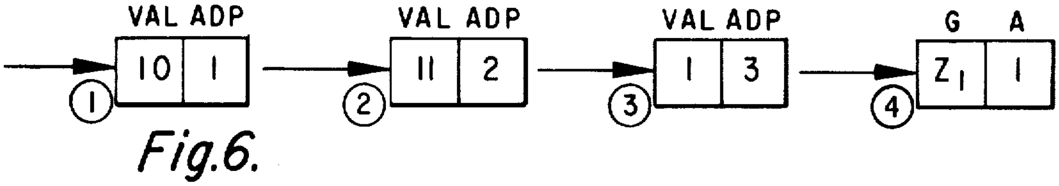
FIGS. 6 through 9 illustrate schematically the growth of a tree in a computer during a training operation.

Refer first to FIG. 6 for a description of the growth of a typical tree during training. For this example, the tree has four levels. Each node is divided into two storage registers or components. The first register of the first three nodes contains the node value. The ADP is the second register of each of the first three nodes. In the fourth node the G is stored in the first register and the A in the second register. Note that the 4th level contains the particular G and A for a specific key combination as described by the values of the nodes in the first 3 levels. Therefore the 4th level nodes do not require ADP linkages.

For a first training cycle assume a training key 10-11-1 and a desired output of 2. During a first level iteration the first key component 10 is entered in the value register of node 1 and the ADP of node 1 remains 1 indicating that there are no more nodes in that filial set. The second key component 11 is entered in the value register of node 2 with an ADP of 2 in the ADP register of node 2. The third key component 1 is entered in the value register of node 3 with an ADP of 3 in the ADP register of node 3. A G of $Z_1(=Z)$, which is the desired output, is stored in the G register of node 4 and a 1 is stored in the A register of node 4 indicating that $Z_1 = Z$ has been stored once in the G register. At this point in training the trained response for the key 10-11-1 is equal to $G/A = 2$.

SECOND TRAINING CYCLE

Figure 7:
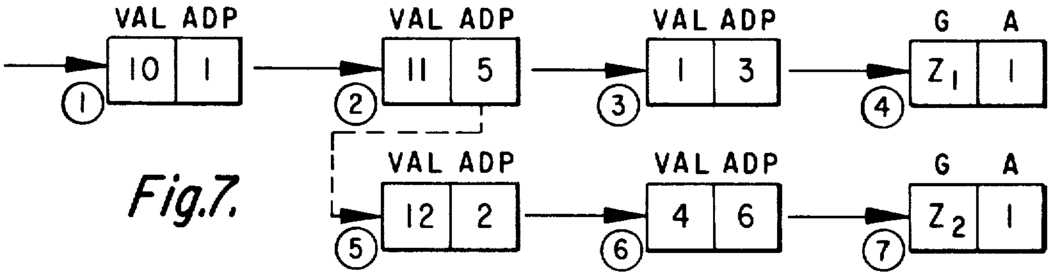

Referring to FIG. 7, the second key is 10-12-4 with desired output of Z. The first key component 10 of the second key is compared with the value 10 stored in the value register of node 1. They are equal so there is no need to create another node at the first level. The second key component 12 is compared with the value 11 stored in the value register of node 2. The value 11 is not equal to 12.

The ADP=2 in node 2 is not greater than the node number, indicating that there are no further nodes in the second level so that a new node must be created. The next available node location is node 5 so that node 5 is created with a value 12 put in the value register of node 5. The ADP in node 2 is changed to a 5 to locate the next node in that filial set and the ADP of node 5 is 2 indicating that it is the terminal node and also locating the first node in that filial set. The next key component 4 is stored in the value register of a new node 6, an ADP of 6 is stored in its ADP register. Node 7 provides a G and an A register for the trained response for key 10-12-4. In the G register a $Z_2$ is stored and a 1 stored in the A register.

THIRD TRAINING CYCLE

Figure 8:
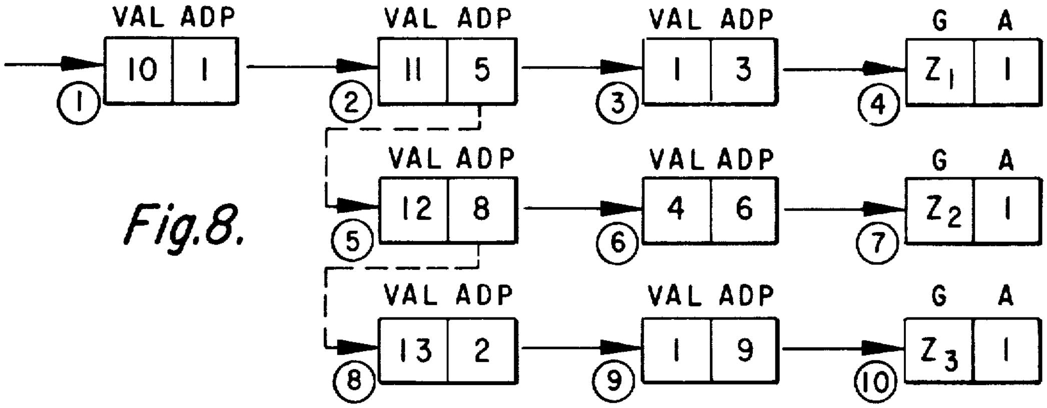

Referring now to FIG. 8, the key for the third training cycle is 10-13-1 with a desired output of 3. During the first level iteration value 10 in the value register of node 1 is equal to the first key component 10. The second key component 13 is then compared with the value 11 in the value register of node 2. The key component 13 is not equal to 11. The ADP=5 of node 2 is greater than the node number 2 indicating that there is another node in that filial set. The next node in the second level is node 5 and the key component 13 is compared with the value 12 in the value register of node 5. The key component 13 does not equal the value 12 and the ADP of 2 in the ADP register of node 5 indicates that there are no further nodes in that filial set to be examined. Therefore, a new node 8 is created as node 8 is the next available node. The ADP of 2 in node 5 is changed to an ADP of 8 locating the next node in the filial set and the ADP of node 8 is set at 2. The value of 13 is entered into the value register of node 8. The next key component of the key in the third level iteration is 1 and the next available node is node 9. The value 1 is entered in the value register of node 9 and an ADP of 9 is entered into the ADP register. A G of $Z_3$ is entered and an A of 1 is entered in node 10.

FOURTH TRAINING CYCLE

Figure 9:
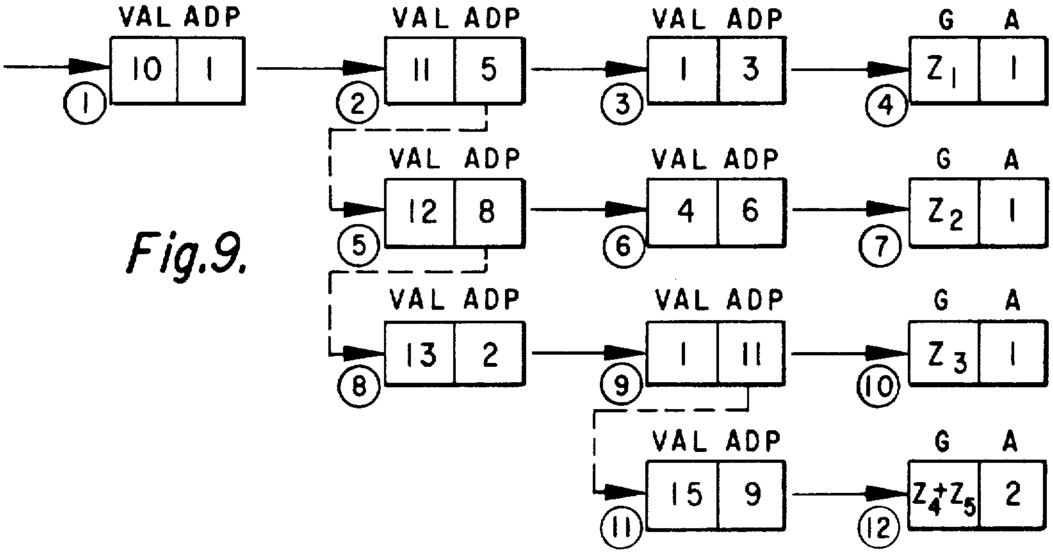

Referring now to FIG. 9, assume a key of 10-13-15 for the fourth training cycle. The key component 10 is compared with the value 10 in the value register of node 1 and they are equal. The second key component 13 is compared with the value 11 in the value register of node 2 and no match is found. The ADP of node 2 indicates that node 5 is the next node to be searched so that in node 8 the value of 13 is compared with the second key component 13. A match is found and the third level search iteration starts at node 9. In node 9 the third key component 15 is compared with the value 1 in the value register of node 9 and no match is found. ADP=9 in the node 9 is not greater than the node number 9 so there is no further node to be examined in that filial set. Therefore a node must be created; the next available node is 11. The value 15 is entered in the value register and the ADP becomes 9. The ADP of node 9 is changed to 11, thus, locating the next node in the set. A G and an A is entered into node 12 with a G of $Z_4$, the desired output for the key 10-13-15, and an A of 1. this completes the fourth training cycle.

FIFTH TRAINING CYCLE

For the fifth training cycle assume a key of 10-13-15. The desired output for this key is $Z_5$. The key component of 10 is compared with the value 10 in the value register of node 1 and a match is found. In the second level search iteration the second key component 13 is compared with the value 11 in the value register of node 2. There is no match and the ADP=5 of node 2 indicates node 5 is next to be examined. The key component of 13 is compared with the value 12 in the value register of node 5. Again there is no match and the ADP=8 of node 5 indicates node 8 is available for search. The key component 13 is compared with the value 13 in the value register of node 8. A match is found so that the third level search iteration is started with the key component 15 compared with the value 1 in the value register of node 9. The key component 15 does not match the value 1 in the value register of node 1 and the ADP of node 9 is 11 indicating that node 11 is next to be searched. Therefore the value 15 in the value register of node 11 is compared with the third key component 15. A match is found so that in node 12 the desired output $Z_5$ is added to the G register. The contents of the G register are now $Z_4 + Z_5$. This key has been selected twice so that the A register is changed from 1 to 2 in node 12. At this point in training the trained response for the key 10-13-15 is $(Z_4 + Z_5)/2$. For purposes of illustration assume training is terminated at this point.

EXECUTION

First Execution Cycle

Referring now to the tree in FIG. 9, assume a key of 10-13-15 for the first execution cycle. With a key of 10-13-15 the first key component 10 is compared with the value 10 in the value register of node 1 and a match is found. The second key component 13 is compared with the value 11 in the value register of node 2. No match is found and as the ADP=5 of node 2 is greater than the node number 2, node 5 is the next node searched. The key component 13 is compared with the value 12 in the value register of node 5. They are not equal and the ADP 8 of node 5 is greater than the node number so that the value register of node 8 is examined next. The key component 13 is compared with the value 13 in the value register of node 8. A match is found. For the third level search iteration the value 1 of node 9 is compared with the key component 15. No match is found and as the ADP=11 of node 9 is greater than the node number 9, the value 15 of the value register of node 11 is compared with the third key component 15. A match is found so that to find the trained response for the key 10-13-15 the G of node 12 is divided by the A of node 12. Thus the G, which is $Z_4 + Z_5$, is divided by the A, which is 2, of node 12 to find the answer for the key 10-13-15. The trained response for the key 10-13-15 is $Z_4 + Z_5/2$.

Second Execution Cycle

In this execution cycle assume a key 10-2-2. The first key component 10 is compared with the value 10 in the value register of node 1. For the second key component the value 2 is compared with the value in the second node, then in the fifth node and then in the eighth node. There is no match in any of these three nodes and as we are now in the execution cycle, not in the training cycle, no further nodes can be created. Thus an untrained point has been encountered. The object here is to find a trained response most appropriate to the key of the untrained point, 10-2-2. The procedure with an untrained point is described later in this description.

Probability Sort

The allocation of information in particular registers representing a node of the tree array is determined by key components derived from the input signal to the processor. Initially, information is stored in a next available set of registers representing a node position. During the formation of the tree array, however, information stored at a particular node position is rearranged so that the node position selected most often during the entire training cycle appears earliest in a filial set. Such rearrangement significantly reduces the time required during an execution cycle to find a trained response, as the node most likely to be selected becomes the entry node and the node least likely to be selected becomes the terminal node of the filial set. In the illustrated embodiment, each node position is comprised of four registers or segments. The first of such registers is the value register, in which the value of the key component is stored.

The second register is designated the ADP register. If the number stored in the ADP register is equal to or less than the node number, there are no further nodes in that level. If the number stored in the ADP is greater than the node number, this indicates that there are other nodes in the set and the number stored in the ADP register then indicates the location of one such node. This procedure whereby the number stored in the ADP register being equal or less than the node number signifies that there are no other nodes in that filial set is but one of several procedures that could be employed.

The third register is designated the ADF register. The number stored in the ADF register indicates a node to go to in the next level if the key component matches the node VAL. The third register of a node at the last level of the tree, however, is designated as the trained response register.

Lastly, the N-designated register contains a number indicating the number of times that the number stored in the value register at a particular node position has equaled a corresponding key component during training.

Figure 11:
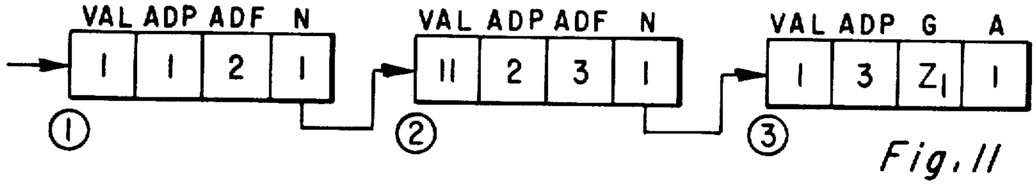
FIGS. 11 through 18 illustrate schematically computer representations of a growth of a tree in which the rearrangement of the information stored in the node is rearranged so that the value selected the largest number of times appears earliest in that filial set.

Referring now to FIG. 11, the key for the first training cycle is, for example, 1-11-1 with an associated desired output of $Z_1$. In the first training cycle all node registers are blank. In the first level iteration the first key component 1 is stored in the value register of the first node. Since there are no other nodes in the first level, ADP is set to 1, the next node position corresponding to the next level is the second node so ADF is set to 2, and N is set to 1 corresponding to a first time the node has been selected. For the second level iteration the VAL of the second node becomes 11, the ADP is set at 2 since there are no other nodes in that level of the filial set, ADF is set to 3, and N is set to 1. After the third level iteration in the third node the value is 1, the ADP is 3, G is $Z_1$, and the A is 1.

Figure 12:
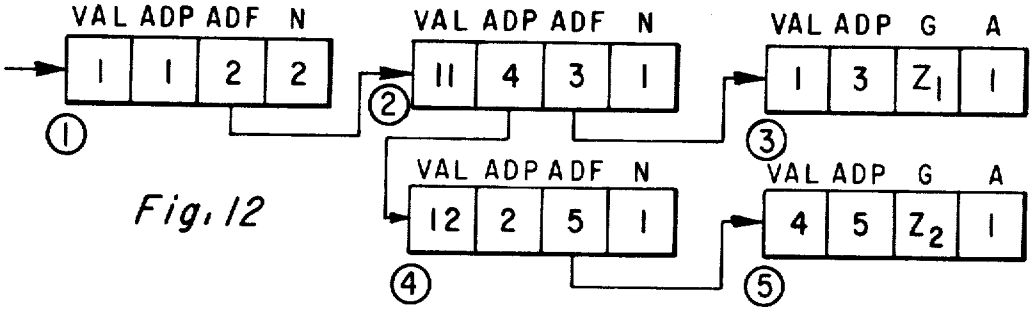

The key for the second training cycle is 1-12-4. Referring now to FIG. 12 the first key component 1 is compared in the first level iteration with the valve stored in the value register of node 1. The key component 1 matches the value 1 stored in the value register, so that the number 2 stored in the ADF register tells us to go to node 2. Node 1 has been selected twice so that the number in the N register of node 1 is changed from 1 to 2. In the second level iteration, the key component 12 is compared with the value 11 stored in the value register of node 2. The key component 12 is not equal to the value 11 so another node is created. Since node 4 is the next available node, the ADP of 2 in node 2 is changed to a 4 and the key component 12 is entered in the value register of node 4. The ADP is set to 2 indicating the node from which that filial set has started. The ADF is set to 5 and the N register is set to 1 indicating that node 4 has been selected once. For the third level iteration node 5 is the next available node and is so used. The key component 4 is stored in the value register of node 5. The ADP register is set at 5 as there are no additional nodes in that filial set. A desired response, $Z_2$, is then added to the G register (initially zero) and the A register of node 5 is set to 1, indicating that the node has been selected once.

Figure 13:
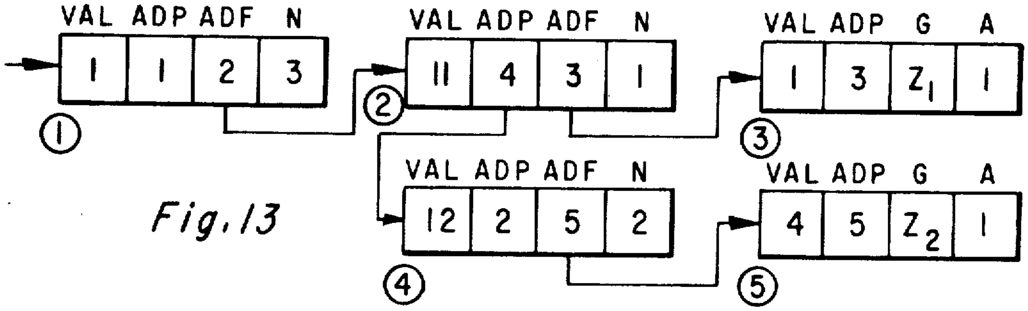

Referring now to FIG. 13 the key for the third training cycle is 1-12-5. For the first level iteration of the third training cycle the value 1 in the value register of node 1 is compared with the key component 1 of the third key. There is a match. The ADP remains the same, the ADF remains the same and the number in the N register is changed to 3 indicating that the value 1 in the value register of node 1 has been selected 3 times. In the second level iteration the value 11 in the value register of node 2 is not equal to the key component 12 as shown in FIG. 13 and the 4 in the ADP register is greater than the node number 2 indicating that there is a node 4 to be examined. The fact that there is another node in this filial set is an indication that the information in the nodes may be rearranged. This means that since there is another node in that filial set there may be a node lower in this filial set which after this level iteration may have been selected a larger number of times than another node presently higher in the filial set.

Therefore at this point in time when there is no match in the first node and there is an indication that there is another node in that filial set, the number in the N register and the node number itself are stored in temporary storage registers. The node number is stored and indicated as K and the N number is stored as N max.

After the node number of node 2 has been stored as K and the N number has been stored as N max, then the value in the VAL register of node 4 is compared with the second key component 12. These two numbers match so that the number 1 in the N register of node 4 is changed to 2 indicating that the value 12 in the value register of node 4 has been selected twice.

At this point the number stored in the N register of node 4 is compared with the number stored in N max. N max is 1 and is the number of times that the value 11 had been selected in the value register of node 2. The 1 stored in N max is less than the 2 stored in the N register of node 4. The contents of registers comprising nodes 2 and 4 should be rearranged because node 4 has been selected a larger number of times than node 2. The ADPs of both nodes 2 and 4 remain the same, however the ADFs are exchanged. The 12 that was in the value register of node 4 is put into the value register of node 2 and the 11 that was in the value register of node 2 is put into the value register of node 4. The number 1 which was in the N register of node 2 is put into the N register of node 4 and the 2 that was in the N register of node 4 is put into the N register of node 2.

As a result of the operation just described, the value which was in the value register of node 4 will now be examined first rather than the previous contents of the value register of node 2.

Note that the ADFs are exchanged in the nodes because the ADFs link a node with its filial set at the next level. As the values were exchanged it is thus necessary that the ADFs be changed. Only the ADP registers of the nodes remain unchanged.

Figure 14:
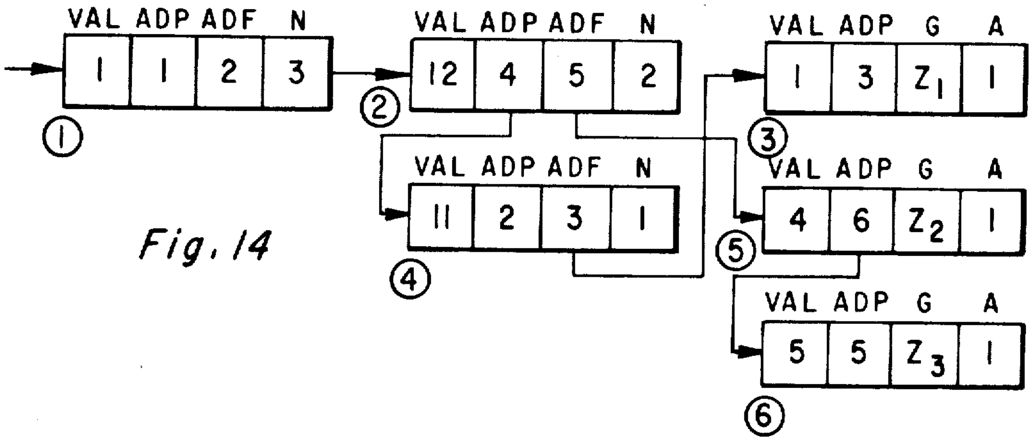

The third level iteration is directed to node 5 by the ADF of the reconstituted node 2 as shown in FIG. 14. The third level component is compared with the value 4 in the value register of node 5. They do not match and the ADP of node 5 is equal to the node number indicating that there is no further node in that filial set. The next available node is node 6 so that the key component 5 is stored in the value register of node 6 as value 5. The ADP of node 5 is changed to 6 to indicate that there is a node 6. The ADP of node 6 is 5, the G is $Z_3$ and the A is 1. This completes the third training cycle.

This description has illustrated the requirement for the ADF. The contents of the nodes are continually rearranged during the different level iterations so that next node to be The ADP of node 4 has been changed to 7 linking node 7. Node 7 is given value 13 equal to the second key component. The ADP of node 7 is 2 indicating that the original node of that filial set is node 2 and the contents of the N register becomes 1 indicating that node 2 has been selected once. For the third level iteration, the ADF automatically selects the next available node which is 8. The ADF of node 7 therefore becomes 8.

The N of node 7 is compared with N max. The N of node 7 is not greater than N max so that there is no rearrangement of the contents of the nodes. This operation is not needed in this example but is convenient for logic design.

In the third level iteration, the third key component 8 goes into the VAL register of node 8. The ADP is 8, the G is $Z_4$ and the A is 1.

Figure 16:
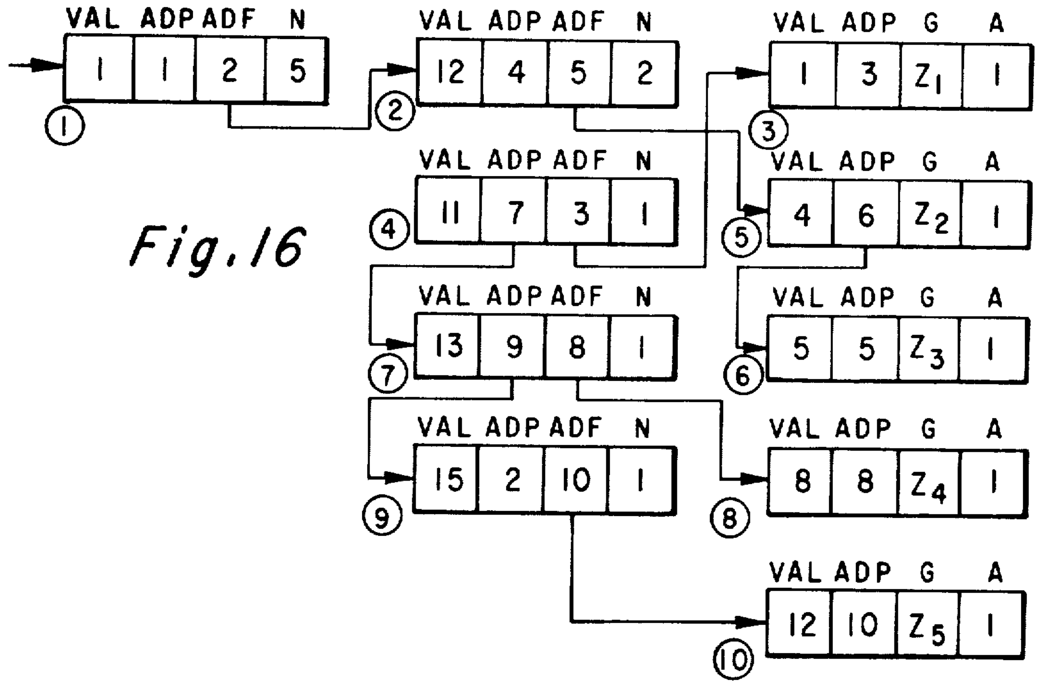

Referring now to FIG. 16, the key for the fifth training cycle is 1-15-12. During the first level iteration the first key component 1 is compared with the value 1 in the value register of node 1. There is a match and N becomes 5 indicating that the value 1 in the value register of node 1 has been selected 5 times.

For the second level iteration the ADF of node 1 indicates that node 2 should be examined. The second key component 15 does not match the value 12 in the value register of node 2. Therefore the contents of the N register of node 2 are stored as N max and the node number 2 is stored as K. The ADP of node 2 indicates that there is another node in that filial set, so node 4 is examined. The second key component 15 does not match the value 11 in the value register of node 4, and the N of node 4 remains 1. N max = 2 is compared with N = 1 of node 4 and the N of node 4 is less than N max, so that there is no rearrangement of information between nodes. Therefore, N max and K are redefined. N max becomes the N of node 4 which is 1 and K becomes the node number 4. The ADP of node 4 indicates that node 7 is to be examined next so that the key component 15 is compared with the value 13. There is no match and the N of node 7 remains 1. The N = 1 of node 7 is compared with N max and since N = 1 of node 7 is not greater than N max = 1, there is no rearrangement between nodes 4 and 7. Furthermore, since N of node 7 is equal to N max, then K and N max are not redefined.

Figure 15:
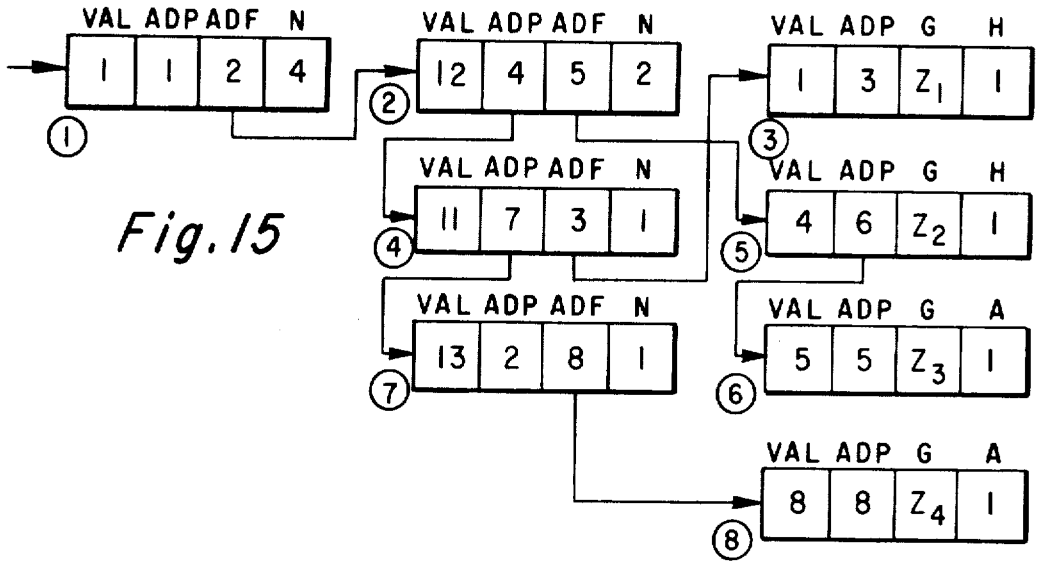

The ADP of node 7 was 2 in FIG. 15 indicating that there are no further nodes in that filial set. Therefore, the next available node selected is node 9 and the ADP of node 7 becomes 9 as shown in FIG. 16. New node 9 is assigned VAL = 15 the contemporary key component value. The ADP is 2 and N is 1. At this time N max of 1 is compared with the N = 1 of node 9. N is not greater than N max so there is no rearrangement between nodes 7 and 9. For the third level iteration as node 9 has been a newly generated node the next available node selected is node 10. The ADF of node 9 becomes 10 and for node 10 the value in the value register becomes 12. The ADP becomes 10, the G is $Z_5$ and the A is 1.

Now, referring to FIG. 17, the sixth key is again 1-15-12, but is associated with a desired output of $Z_6$. During the first level iteration the key component 1 equals the value 1 at the first node so that the N of node 1 is changed to 6. During the second level iteration the key component 15 is compared with the value 12 in the value register of node 2. There is no match so that the N = 2 of node 2 is stored as N max = 2. N max becomes 2 and K becomes the node number 2. The key component 15 is then compared with the value 11 stored in the value register of node 4. There is no match, and N remains 1. N is less than N max of 2 so that N max is redefined as 1 and K is redefined as 4. The key component 15 is then compared with the value 13 in the value register of node 7 and there is no match so that N remains at 1. The N of 1 is not less than N max so that N max remains 1 and K is 4.

The key component 15 is then compared with the value 15 stored in the value register of node 9. There is a match so that the N of node 9 becomes 2.

Figure 17:
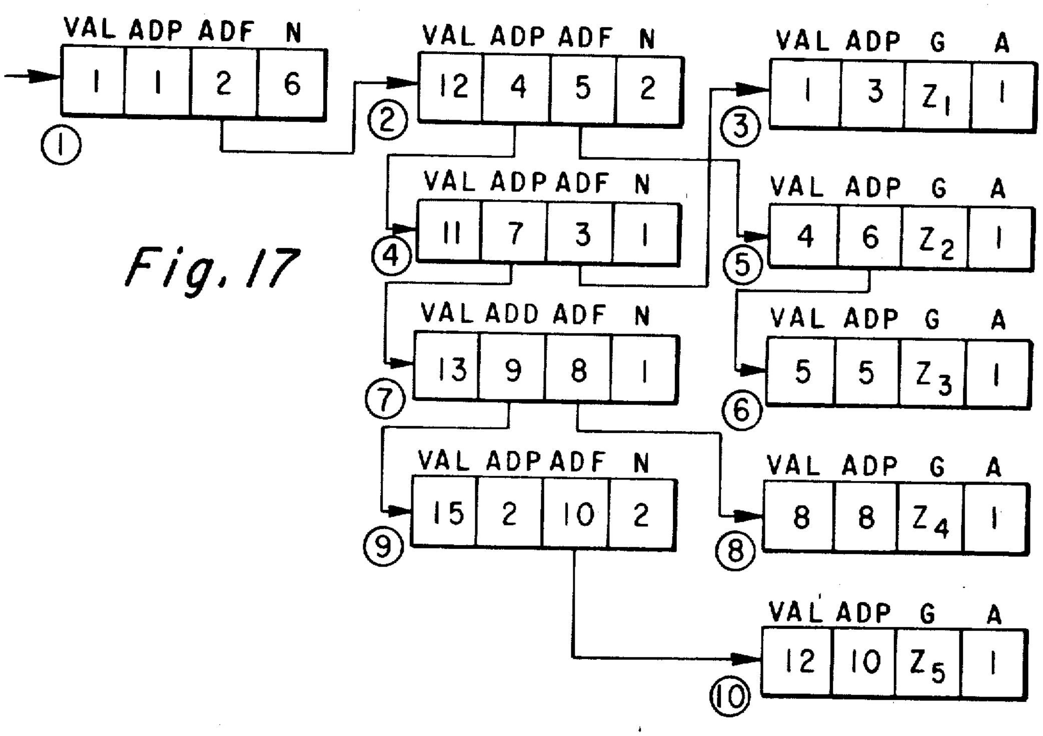

At this point in time before the rearrangement, the ADP remains 2, the ADF remains 10 and the N in the N register is changed from 1 to 2 as shown in FIG. 17.

Figure 18:
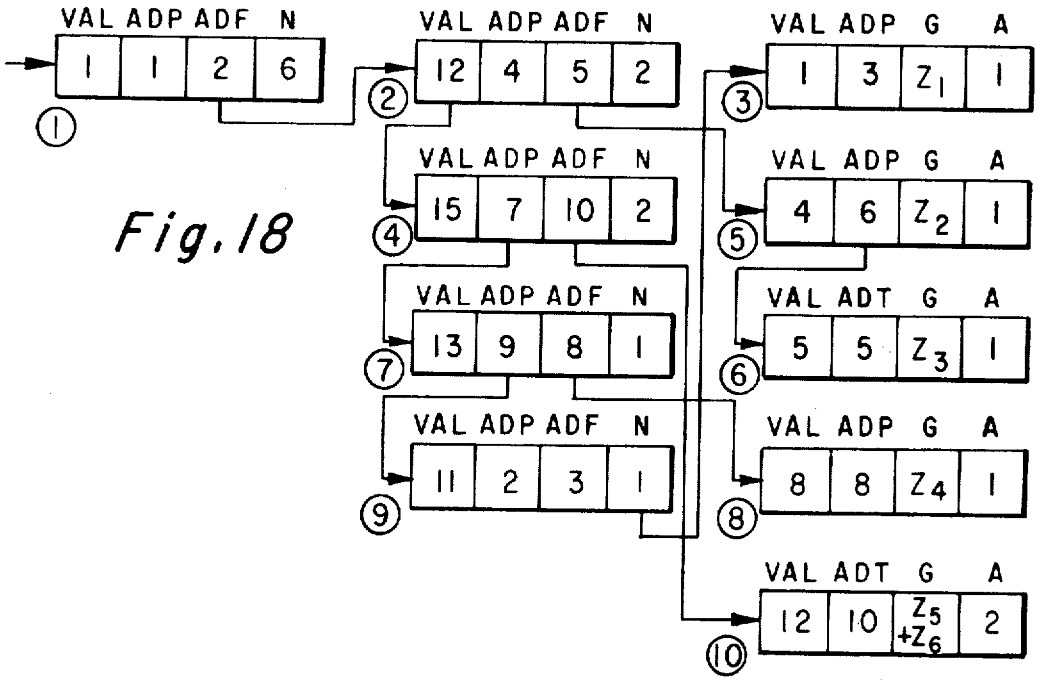

N max is 1 and K is 4. The N max of 1 is compared with the 2 in the N register of node 9. N is greater than N max so that the contents, except ADP, of the node identified by K (node 4) are exchanged with the contents of the present node 9. The results are shown in FIG. 18 with node 4 now having a value of 15 stored in its value register, an ADF of 10 and an N of 2. Node 9 now has a value of 11 stored in its VAL register, an ADF of 3 and an N of 1. This indicates that the value 15 (which is now in Node 4) has been selected more times than value 11 or value 13. After this rearrangement the third level iteration is carried out and the ADF of node 4(10) indicates that node 10 is the node to be examined for the third level iteration. The third key component 12 is compared with the value 12 in the tenth node.

The rearrangement of the information in the nodes 4 and 9 is shown in FIG. 18.

EXPANDED SEARCH — ESP

The following description describes in detail Expanded Search and Node Rejection. The Expanded Search is used in executions when an untrained point is reached. An untrained point is defined as an execution key for which no corresponding reference key was stored in the file during training. Since the system was not trained on such a key, there can be no trained response by direct identification.

Figure 19:
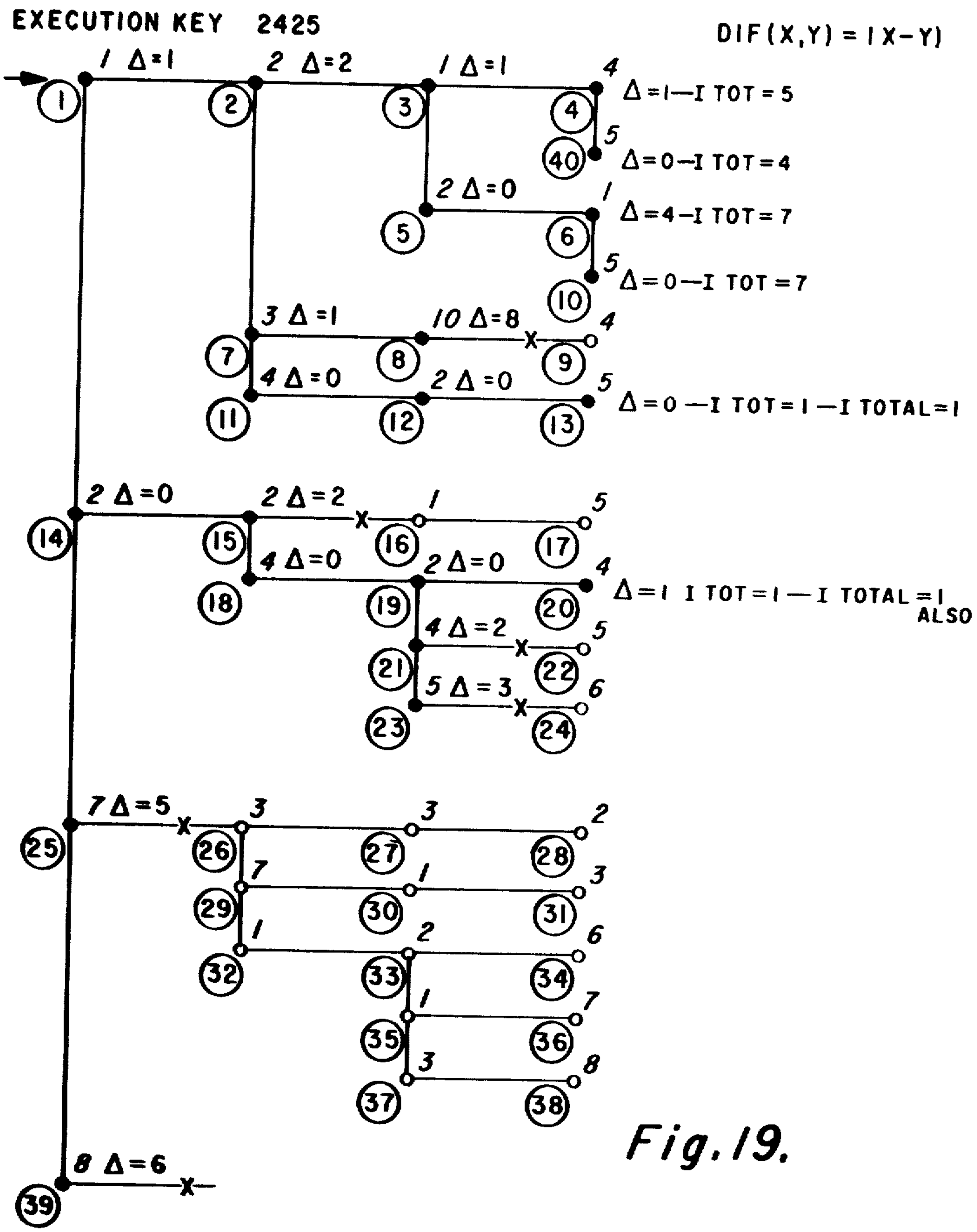
FIG. 19 illustrates schematically a computer representation of a tree.

Referring now to FIG. 19 a sample execution key for the following description is 2-4-2-5 (dashes indicating decomposition into key components). For the purposes of this following description, assume that this execution key is already an untrained point. Also for the immediate purposes of this description, the term DIF will be referred to in the following description. DIF is defined here as the absolute difference between X−Y where X is the execution key and Y is the reference key being compared. In other words, DIF [X,Y] equals [X−Y]. DIF may be defined in other ways as previously disclosed. The criterion for node rejection is to reject further search past a node when the partial difference accumulated between the corresponding key components and values exceeds the smallest DIF encountered between the untrained execution key and reference key.

Referring now to FIGS. 19 and 20, for the purposes of this description assume an executive key of 2-4-2-5. The key component 2 is compared with the values in the first level, the key component 4 is compared in the second level, the key component 2 is compared in the third level and the key component 5 is compared in the fourth level to determine the DIF between the executive key and the reference key.

Each node as shown in FIG. 19 is divided into three segments or registers as described previously. The first segment contains the value, the second the ADP, and the third segment the ADF segment. The growth of a tree during training has been previously described. Referring again to FIG. 19 the circled member is the number of the node. The number which is not circled to the upper right of the dot indicates the value stored in that node. The ADPs and the ADFs are not shown in FIG. 19, the lines connecting the nodes indicating the direction that the search may take.

In FIG. 20, a first line labeled ITOTAL, indicates the smallest accumulated DIF so far encountered between the untrained execution key and a reference key. The next line is labeled ITOT and is a running total of the error between the key component and the value at each node. The contents of the ITOT register will indicate the cumulative error between the key components and the values. This will become more apparent during the following description.

The IE(1) line indicates the error of a node for level 1 after comparison with the first key component. IE(2) shows the error of a node in the second level after comparison with the second keys component. The IE(3) line indicates the error in a third level node after comparison with the third key component. IE(4) indicates the error in a fourth level node after comparison with the fourth key component of the execution key. The IGI and IAI lines in FIG. 20 contain the trained response for the reference key found to be closest to the untrained execution key according to the best DIF. The last line is labeled JC and indicates the number of reference keys found closest to the execution key by the best DIF, if more than one reference key satisfies the same DIF.

The following description describes the search iterations that are carried out. These search iterations may be carried out either in the special digital computer described in the specification or in a general purpose computer following the flow diagram. A search iteration as used in the following description is a comparison of the key components of an execution key and the values of a reference key.

FIRST SEARCH ITERATION

For the first level search iteration the first key component 2 of the execution key is compared with the value 1 of node 1. The difference is taken between these two numbers, yielding 1. This DIF is stored in the ITOT register as 1 and in the IE(1) register as 1. For the second level search iteration, the second key component 4 of the execution key is compared with the value 2 of node 2. 2 is stored in the IE(2) register and 2 is added to the ITOT register so that the contents of the ITOT register are changed from 1 to 3.

For the third level search iteration the third key component 2 of the execution key is compared with the value 1 of node 3. The difference is 1 so that 1 is entered into register IE(3) and ITOT becomes 4, indicating the the partial difference between the execution key and the trained key at this point is 4. For the fourth level search iteration the fourth key component 5 of the execution key is compared with the value 4 of node 4. The difference is 1 and is entered into the IE(4) register and added to the contents of the ITOT register so that the ITOT register now is set at 5. At this point the leaf level has been reached at node 4. ITOT is at 5 and ITOTAL is at 5. A four level search iteration has been completed.

A second search iteration will be started again to determine if a better reference key can be found for the execution key 2-4-2-5.

The G and the A of reference key 1-2-1-4 in node 4 is stored in the IGI and the IAI register because at this time the G and A corresponding to the trained key 1-2-1-4 has the best accumulated DIF as indicated in the ITOTAL register. This is obviously true since this is the only complete reference key which has had a search iteration completed. In the JC register the number 1 is stored to indicate that at this point the best DIF has been found once and one update of the ITOTAL register has been completed. For the purposes of this description the terminology G1214 and A1214 are used since we have not specified trained responses for the keys.

SECOND SEARCH ITERATION

Continuing on, the next node in the fourth level to be searched is node 40 since it is the next available node in that filial set. This is carried out by subtracting from ITOT the difference of the previous fourth level search iteration which is 1. This difference of 1 is subtracted from the ITOT total so that ITOT is now 4. The fourth key component 5 of the execution key is compared with the value 5 in node 40. They are equal so that there is no difference between the fourth key component of 5 and the value 5 of node 40. This yield is 0 as shown in the IE(4) register and this yield of 0 is added to the 4 in the ITOT register so that the ITOT register is now set at 4 for a DIF of 4 from reference key 1-2-1-5.

At this point the DIF of 4 in the ITOT register for reference key of 1-2-1-5 is compared with the contents of the ITOTAL register of 5 which is the DIF for the reference key of 1-2-1-4. If the accumulated DIF stored in the ITOT register is less than the accumulated DIF stored in the ITOTAL register then we will change the ITOTAL register to the new ITOT and store in the IAI and IGI registers, the G and the A corresponding to the better ITOT. The ITOT is defined as being better when it is smaller than a DIF in ITOTAL.

At this time we have finished a second search iteration and node 40 is at the leaf level. The best answer is the trained response represented by the G for key 1-2-1-5. We have stored the G and the A. Since what we are trying to find is the best trained response for the execution key 2-4-2-5, we do not actually need to store the address of the G and the A because only the value is required for subsequent operations. However, another way of identifying the G and the A would be to store the address where they are, rather than the G and the A itself, and then go back to that address to get the G and the A after the search iterations are completed.

THIRD SEARCH ITERATION

The third search iteration starts at the third level at node 5. The fourth lever difference of 0 is subtracted from ITOT leaving ITOT at 4. The third lever difference of 1 is subtracted from ITOT leaving ITOT at 3. Then for the search iteration at the third level the third key component 2 of the execution key is compared with the value 2 of node 5. The difference is 0 and stored in IE(3) register. When this difference of 0 is added to the ITOT of 3, ITOT remains at 3. For the search iteration at the fourth level the fourth key component 5 of the execution key is compared with the value 1 of node 6. The difference is 4 and is entered into the IE(4) register and added to ITOT to make ITOT=7.

The third search iteration has been completed and the ITOT of 7 is compared with the ITOTAL of 4. Since the ITOT DIF of 7 is worse than the ITOTAL of 4 the contents of the IGI and IAI register are not changed.

FOURTH SEARCH ITERATION

Before the fourth search iteration is made at a new node, the prior difference at node 6 is subtracted from ITOT. Thus the difference of 4 at node 6 is subtracted from ITOT so that ITOT is 3 before the fourth iteration begins. Then the fourth key component 5 of the execution key is compared with the value 5 of node 10. 0 is entered into the IE(4) register, and added to the number stored in the ITOT register so that the total DIF in the ITOT register is 3. This completes the fourth search iteration for reference key 1-2-2-5 with an indicated DIF of 3. This DIF of 3 is better than (less than according to this definition of best DIF) the ITOTAL of 4 so that upon exchanging the contents of ITOT and ITOTAL, the new ITOTAL shows 3. The corresponding Q and A for the training key of 1-2-2-5 is entered into the IGI and IAI registers in place of the G and A for the training key 1-2-1-5. JC remains set at 1.

FIFTH SEARCH ITERATION

For the fifth search iteration there are no filial sets in the fourth and third levels which have not been searched, so that the difference of 0 for node 10 (stored in IE(4)) is subtracted from the DIF in the ITOT register, the difference of 0 for node 5 stored in IE(3) is subtracted from the value in the ITOT register, and the difference of 2 for node 2 stored in IE(2) in the second level is subtracted from the ITOT register, to give an indicated ITOT of 1. There are other nodes in the second level filial set so that the search continues at the second level with node 7 the next node to be searched. ITOT is 1. The second key component 4 is compared with the value 3 of node 7. The difference of 1 is entered into the IE(2) register and added to the ITOT register so that the ITOT register now is set at 2. For the third level search iteration the third key component 2 of the execution key is compared with the value 10 of node 8 with a difference of 8. The difference 8 is entered into the IE(3) register and added to the ITOT register so that the ITOT register is set at 10.

NODE REJECTION

After each addition to the ITOT register the contents of the ITOT register is compared with the ITOTAL register. If the contents of the ITOT register is greater than the ITOTAL register node rejection takes place. Node rejection is used since the accumulated yield or DIF at this point exceeds the best DIF in ITOTAL and a better match to the query cannot exist at a leaf leaf governed by the rejected node. This can be understood by the specific example herein, wherein after the third level search iteration of node 8 the ITOT is 10. This is worse than the ITOTAL of 3 which has been identified for training key 1-2-2-5. This means that continuation of the search iteration at the fourth level (e.g., at node 9,) would only waste effort since ITOTAL is less than the ITOT already registered. Node rejection can be based on other criteria, and these are discussed separately.

SIXTH SEARCH ITERATION

The difference of 8 for node 8 stored in IE(3), is subtracted from the 10 in the ITOT register and the difference of 1 for node 7 stored in IE(2) is subtracted from the ITOT register so that the ITOT register is set at 1. The search iteration continues at level 2 with a comparison at node 11 of the second key component 4 of execution key with the value 4 of node 11. The difference 0 is entered into the IE(2) register and added to the ITOT register, setting the ITOT register at 1. The third key component 2 of the execution key is compared with the value 2 of node 12. The difference of 0 is entered into the IE(3) register, and is added to the ITOT register so that the ITOT register after node 12 is set at 1. The fourth key component 5 of the execution key is compared with the value 5 of node 13, the difference 0 is entered into the IE(4) register, and added to the ITOT register so that the ITOT register is set at 1. The cumulative DIF between the execution key 2-4-2-5 and the trained key of 1-4-2-5 is 1. This ITOT of 1 is compared with the ITOTAL DIF of 3. Since this implies a better match than for the previous best reference key, 1 is stored in the ITOTAL register and the corresponding G and A trained responses of key 1-4-2-5 are entered into the IGI and the IAI registers. The counter JC remains set at 1 to indicate that only one trained response corresponding to the minimum accumulated DIF has been selected.

SEVENTH SEARCH ITERATION

There are no further nodes in this filial set so that the expanded search is started back at the first level at node 1. This is done by subtracting the difference for the the nodes at the first, second, third and fourth levels which are stored in IE(1), IE(2), IE(3), and IE(4). The ITOT register is now set at 0. The first key component 2 is compared with the value 2 of node 14. The difference of 0 is stored in the IE(1) register and added to the ITOT register so that ITOT register is set at 0. For the second level search iteration, the second key component 4 of the execution key is compared with the value 2 of node 15. The difference of 2 is entered into the IE(2) register and added to the difference in the ITOT register. The 2 of ITOT is greater than the DIF of 1 in the ITOTAL register so that node 15 is rejected and there is no search of the subtree rooted at node 15. Therefore nodes 16 and 17 are not examined in this search.

EIGHTH SEARCH ITERATION

The difference of 2 for node 15 is then subtracted from ITOT so that ITOT is set at 0. The second key component 4 is compared with the value 4 of node 18 for the second level search iteration. The difference of 0 (between key component 4 in value 4) is entered into the IE(2) register and added to ITOT so that ITOT is 0. The third key component 2 is compared with the value 2 of node 19. The difference is 0, which is entered into the IE(3) register and added to the ITOT register, setting the ITOT register to 0. The fourth key component 5 is compared with the value 4 of node 20. The difference is 1 which is entered into the IE(4) register and added to ITOT, setting ITOT at 1. Therefore the accumulated DIF between the training key 2-4-2-4 and the execution key 2-4-2-5 is 1. The DIF in ITOT is compared with the DIF of ITOTAL. They are the same. Therefore under the conditions of this example the G and A for the key component 2-4-2-4 is also entered into the IGI and IAI registers since they both have the same DIF. The counter JC is set at 2 to indicate that there are two different training keys which have minimum accumulated DIF.

FURTHER SEARCH ITERATIONS

For further search iterations the search continues at the third level with the difference of 1 for node 20 and the difference of 0 for node 19 being subtracted from the ITOT register. For a search at the third level the third key component 2 is compared with the value 4 of node 21 to give a 2. This 2 is added to the ITOT register and compared with the ITOTAL of 1. The ITOT of 2 is greater than the ITOTAL of 1 so node 21 is rejected and no further searching of the subtree rooted at node 21 proceeds.

2 is subtracted from ITOT and a search continues at node 23 in the third level. The third key component 2 is compared with the value 5 of node 23 to give 3. This 3 is added to the ITOT register. Since the sum is greater than the DIF in the ITOTAL node 23 is rejected and no further search from the node is conducted.

3 is subtracted from ITOT for node 23, the 0 for node 18 is subtracted and the error of 0 for node 14 in the first level is also subtracted from ITOT. Another search iteration starts at the first level. The first key component 2 is compared with the value 7 in node 25 to give a 5. This 5 is entered into the ITOT register and compared with ITOTAL of 1. The accumulated DIF is already worse than the DIF in the ITOTAL so there is node rejection and consequently no search of the subtree beyond node 25.

5 is subtracted from the ITOT register to get 0 and search iteration continues at the first level with a comparison of the key component 2 with the value 8 of node 39. The difference is 6. This 6 is entered into ITOT register and is again greater than ITOTAL so that there is no further search beyond node 39.

Thus complete search of the tree shown in FIG. 19 has been completed with no further structure to be examined. The two reference keys having the minimum accumulated DIF are 1-4-2-5 and 2-4-2-4. The trained responses for these keys have been entered into the IGI and IAI registers.

MULTI-CRITERIA SEARCH

Figure 28A:
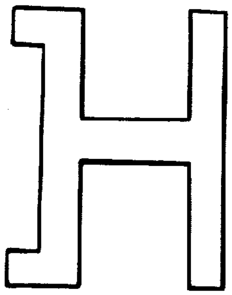
FIGS. 28A–28D illustrate a multi-criteria search.
Figure 28B:
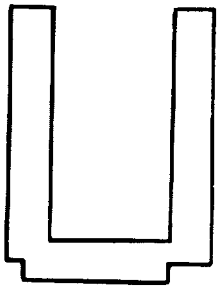
Figure 28C:
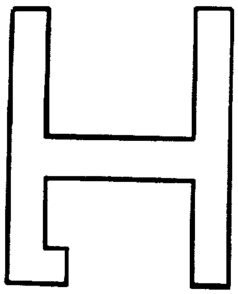
Figure 28D:
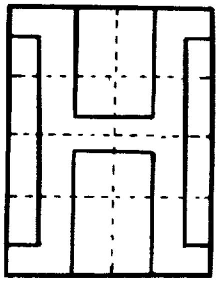

In the expanded search (with node rejection) procedure discussed previously the tree-allocated file was examined systematically to find reference keys most like the query keys. Whereas the search with node rejection avoided searching the entire tree-allocated file, still a great number of possible key components had to be examined in order to determine the reference key components having a minimum metric distance from the query key components. Thus the search procedure consumes a considerable time for each pattern examined. Furthermore, fine distinctions between patterns examined may carry equal weight with gross patterns. A reference to FIG. 28 illustrates this example where a fine distinction carries equal weight with a gross distinction. FIG. 28A illustrates the capital letter H stored in the tree-allocated file and FIG. 28B illustrates a capital U stored as a reference in the tree-allocated file. FIG. 28C illustrates a query capital H. The human eye would have little difficulty in matching the reference capital H with the query capital H. However, the computer, using the tree-allocated file and using a Hamming distance as the error metric, would say that the reference capital U is closer to the query capital H than the reference H since the Hamming error between the reference U is 22 while the Hamming error between the query H and the reference H is twenty-three. By first requiring some gross measure of similarity to be satisfied and the expanded search such errors can be reduced. Multi-criteria search specifically addresses itself to these two problems.

The operation of multi-criteria search occurs in two stages. The first stage is to apply a first criterion to the expanded search and to select in general several items from the tree-allocated file which satisfies the criterion. This first criterion would be a gross criterion. The second stage in the criterion search would be to apply a second criterion. The second criterion would reduce the number of items selected by the search in the first criterion. Criterion two would be more discriminating than the first criterion.

Stage K would be the final stage. In the final stage criterion K which is the finest criterion would be applied to evaluate each of the items selected by stage (K-1). This assumes, of course, that there could be other stages between stage two and stage K. The best items are items within the output of the multi-criteria search.

All but the last stage operate in the binary fashion. An item either satisfies the criterion or is rejected from further consideration. In implementation it may be efficient to apply the criteria in an interleaved fashion for greater efficiency as will be illustrated by the example which is described with reference to FIG. 28C. In this example consider a pattern resolved on a 12 to 12 array for an H pattern as shown in FIG. 28C. The dashed lines indicate a further sub-division in the four by four (of three by three's). A multi-criteria search which has been used effectively based upon dual criteria is to consider only those paths through the tree such that within the dashed boundaries the query key and the reference key differ by less than an assigned threshold. Thus a pattern would be rejected if there were poor match in any of the sixteen three by three arrays. This greatly reduces the number of patterns that need be considered, if in the second stage those patterns selected by the first criteria choose the pattern having the minimum Hamming distance. It has been found desirable to begin with a threshold of four and if the query key components are not accepted within this threshold, to relax it to five. Again if the query key component is not accepted, the threshold is relaxed to six and so forth. It appears that the initial threshold of less than three or a final one of greater than six is not advantageous.

Another coarse criterion that could be used is to determine the number of bits in each of the 16 three by three arrays. If this number is less than some threshold, the three by three array is "quantitized" as 0. Otherwise as 1. A comparable operation is performed with the query key. If the quantitized values match (for example, if the exclusive or of the quantized values is 0) then the node is selected, otherwise it is rejected. If desired, the threshold determining quantization states could be adjusted from a three by three array to a three by three sub-array to achieve better pattern representation. This kind of procedure could prevent the sort of error evidenced by the FIGS. 28A through 28C.

MULTIMODAL SEARCH

Multimodal Search consists of several search modes through a tree-allocated file, each search further defining the item being sought. In other words, the function retrieved from mode one during the mode one search is a factor in conducting the search of mode two. The result of the final mode is the ultimate output of the search operation.

An economy of storage can be had by employing a single tree structure for all modes. This requires adding an additional $k$ bits to the node values to designate relevance to any of the two to $k-1$ combinations of the search modes, where $k$ is the maximum number of modes. Further economy can be achieved by using the fact that commonality to multiple modes cannot increase by level. However, this requires more complicated software and is generally not used nor warranted.

The operational details of multimodal search can be disclosed by the following example: Assume that it is contemplated to accurately locate a specific pattern in a 100 by 100 binary matrix, $A = (a_{ij})$ where the pattern consists of a relatively few bits. For example, assume that the pattern (termed the "target pattern" shown in TABLE A) is the desired pattern to locate in the 100 by 100 binary matrix.

Note that this target pattern can be contained in any binary matrix which exceeds seven by seven in dimension.

The processor could solve this problem in a 100 by 100 binary matrix in one operation using A as input. However, in a 100 by 100 binary matrix this would require an input of 10,000 bits and enormous memory and training for the processor.

TABLE A

Target Pattern

```
   x
   x
   xx  x
xxxxxxx
   xx  x
   x
   x
```

These problems can be alleviated by a multimodal search. In such a multimodal search the first mode of search would consist of eight independent operations with eight subarrays derived from A. Each subarray $B_i$ ($i = 1, \ldots 8$), is computed from a sample of 50 by 50 elements of A.

$B_i$ is represented spacially as a 10 by 10 array of elements each assigned four bits. The four bits "quantized" density of the original pattern is within the area covered by the subarray element. Table B gives an illustrative quantization rule.

TABLE B

| Number of 1-State Bits Covered by Element Area | Quantized Value |
|---|---|
| 0, 13 | 0, 8 |
| 1, 14 | 0, 9 |
| 2, 15 | 0, 10 |
| 3, 16 | 1, 11 |
| 4, 17 | 1, 12 |
| 5, 18 | 2, 12 |
| 6, 19 | 2, 13 |
| 7, 20 | 3, 13 |
| 8, 21 | 3, 14 |
| 9, 22 | 4, 14 |
| 10, 23 | 5, 15 |
| 11, 24 | 6, 15 |
| 12, 25 | 7, 15 |

To train the processor for a mode 1 search the 400 bits corresponding to $B_i$ are synthesized by inserting a target pattern in all translations and rotations which are uniquely resolved. Also included is the situation in which the target is absent. Noise may be added in training but for simplicity of this description it will not be described in this example. Note that no distinction is made as to the subarray index, one is typical of all the others. Desired output/input is zero if the target pattern is not wholly in the area covered by the subarray. Otherwise it is the coordinate pair specifying the centroid of the target pattern. The coordinate pair will be approximate to the ambiguity resulting from course quantization.

These operations as described constitute training for mode 1. All nodes generated by training through this point are designated by 1 placed in the first of two mode locations. Training for mode 2 search would be conducted next, however, for purposes of this description the execution for mode 1 is described first.

In a mode 1 execution the arrays $b_i$, $i = 1, \ldots 8$, are processed in sequential order. Due to noise it is generally necessary to search the tree for each array input. However, a perfect match on the mode tag bit is mandatory. Result of the search execution will yield either a zero or a coordinate pair. A coordinate pair having minimum error distance is selected as a parameter governing input in mode 2. Specifically, the coordinate pair serves to determine a 20 by 20 binary subarray of A as the input.

Let the coordinate pair be $(r, s)$ and the mode 2 input array be designated $C = (C_{ij})$, then, unless element $a_{ij}$ falls outside of array A, the algorithm is Equation (1) $c_{ij} = a_{r-11+i,s-11+j}, i,j=1,\ldots 20$. If $a_{ij}$ falls outside of $A_1$, the minimum bias required to correct the trouble is added in example 1.

To train for a mode 2 search the procedure is identical to mode 1 except that a different input is used requiring more translation and rotation perturbations. The nodes generated in a mode 1 training are designated by a 1 placed in the second tag bit location.

Now consider the complete execution operation. A match is required on mode tag bit 1. $B_i$ ($i=1, \ldots 8$) are inputted sequentially and the coordinate pair associated with the minimum error distance is used to determine the input for mode 1 according to Equation 1. Next this input is provided and the tree searched while referring a match on mode tag bit 2. If the output is zero, an error is indicated in mode 1 and the coordinate pair associated with the next smallest error distance is selected for a second mode 2 execution. Normally, however the output of mode 2 is a coordinate pair which is the estimate of the target pattern location.

MULTIMODAL SEARCH

Multimodal may be defined as changing the criteria for node rejection during the expanded search operation as a function of the operating parameters. This necessitates that the parameters be stored during the expanded search operation which have caused node rejection to occur and then based upon operating results changing the criteria.

For another example of multimodal search, assume that expanded search operation is underway with node rejection based upon multicriteria. The first criteria for node rejection is the criteria that if the total accumulation of DIF at that particular point in the search exceeds the best possible DIF which is previously been established, node rejection occurs. The second criteria is if any individual error exceeds a predetermined threshold, node rejection occurs. This means that during the expanded search operation any time an individual contribution for a specific node exceeds ten that node is rejected and further search along that leaf is rejected. Also, if the accumulation of DIF to that point exceeds the best possible accumulation of DIF further search is also waived and that node is rejected.

Under this multicriteria search if the best possible DIF which has been stored previously is less than ten, then effectively you have lost the use of the second criteria. This specifically means that as the best possible DIF which has been recorded is less than ten that the rejection of nodes of expanded search will always be determined by the second criteria of the best previous possible DIF rather than the threshold for individual contributions of 10.

Therefore in one, a multimodal search adaptability adjusts the individual threshold depending upon the status or size of the best possible DIF stored. This is the first example of multimodal search.

Another example of multimodal search is using a multicriteria search as described in the preceding example with the first criteria being the best possible DIF previously found and the second criteria being a predetermined threshold. If the threshold is set to a predetermined value and an answer is found then it is possible to use criteria 1 alone and the answer may be accepted using criteria 1 without using the necessity of using criteria 2. However, if criteria 1 and 2 is used and there is a rejection, then it is possible to raise the threshold and get a rejection. If the threshold is raised for criteria 2 eventually it is possible to get an answer and it is best to use that answer using the multi-criteria search. In another manner of speaking, if the right answer satisfies both tests, then some leaves of the three have low individual contributions to DIF so that it is best to use the first criteria which is the comparison of the total accumulation of DIF to that point in the search with the best possible DIF stored. However, if there is no answer with the multicriteria search then it is best to use both criteria because this is indication that some leaves have high individual contributions to errors.

Another example of multimodal search is where two searches run simultaneously. In the first search both criteria are used and in the second search only one criteria is used which is the comparison of the total accumulation of DIF to that point in the search with the best possible DIF previously stored. During this operation if both searches give an answer then the answer is used which was based on the single criteria of the comparison of the total accumulation of DIF to that point in the search with the best possible DIF previously stored. However, if both searches do not give an answer then the answers are ignored. This means that even after there is one answer from the second search which results from the accumulation of DIF compared with the best possible DIF previously stored, this answer is ignored. Therefore in this mode of search the threshold is raised and the second search is ignored. The second search which is ignored is the one which is based upon the comparison of the total accumulation of DIF with the best possible DIF previously stored. Thus the search relied upon is the first search which is using both criteria including the threshold and the total accumulation with the previously stored best possible DIF. Then the answer based upon the first search is the one used.

Another example of multimodal search is to take a tree allocated file having P leaves and S leaves in it with the S leaves being secondary leaves to the P leaves This type of layout is used for a single identification where you can use a coarse search using the primary leaves only and if you do not get a proper answer with coarse search then you can use a finer search by using the secondary leaves. In this manner a P leaf is a leaf which is defined by a course pattern with only some of the nodes being used. For instance, using a primary search, suppose that there is an optical character recognition pattern. Suppose that the A is the letter being examined, therefore $n$ number of nodes are examined in the primary search of primary leaves only and the letter A is identified by the coarse pattern alone. Suppose however, in an optical character recognition search that the letter being looked at was either an O or a Q or other similar letters. Thus the coarse search through the primary leaves would not sufficiently distinguish between such number of letters and it would be necessary to search through the secondary leaves.

Another example of multimodal search is a course and fine search distributed in a different manner. In this type of tree for example, there are 15 levels with the coarse search using the first five levels and the fine search the last ten levels. The search proceeds through the first five levels which is the coarse portion of the tree. If there is a result that looks good through the first five levels than the search proceeds on to and through the other 10 levels to complete the fine search. The search only proceeds however to the fine search if after the coarse search, the results at that point look good. In other words, you must satisfy the coarse segment of the search before you go into the fine search.

SPECIAL PURPOSE COMPUTER

Figure 10:
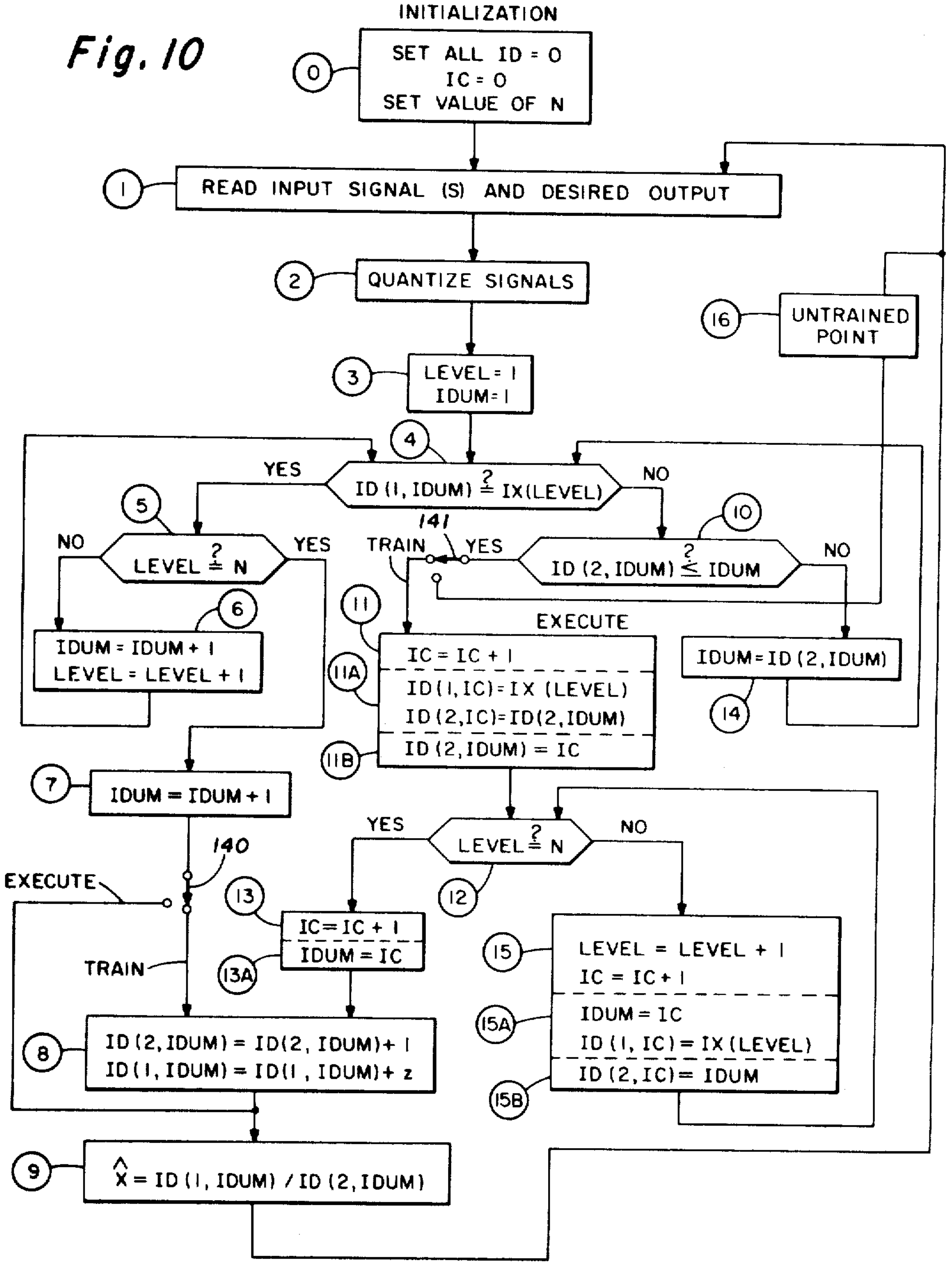
FIG. 10 is a generalized flow diagram illustrating the optimum processor in which a tree is grown during training.
Figure 21:
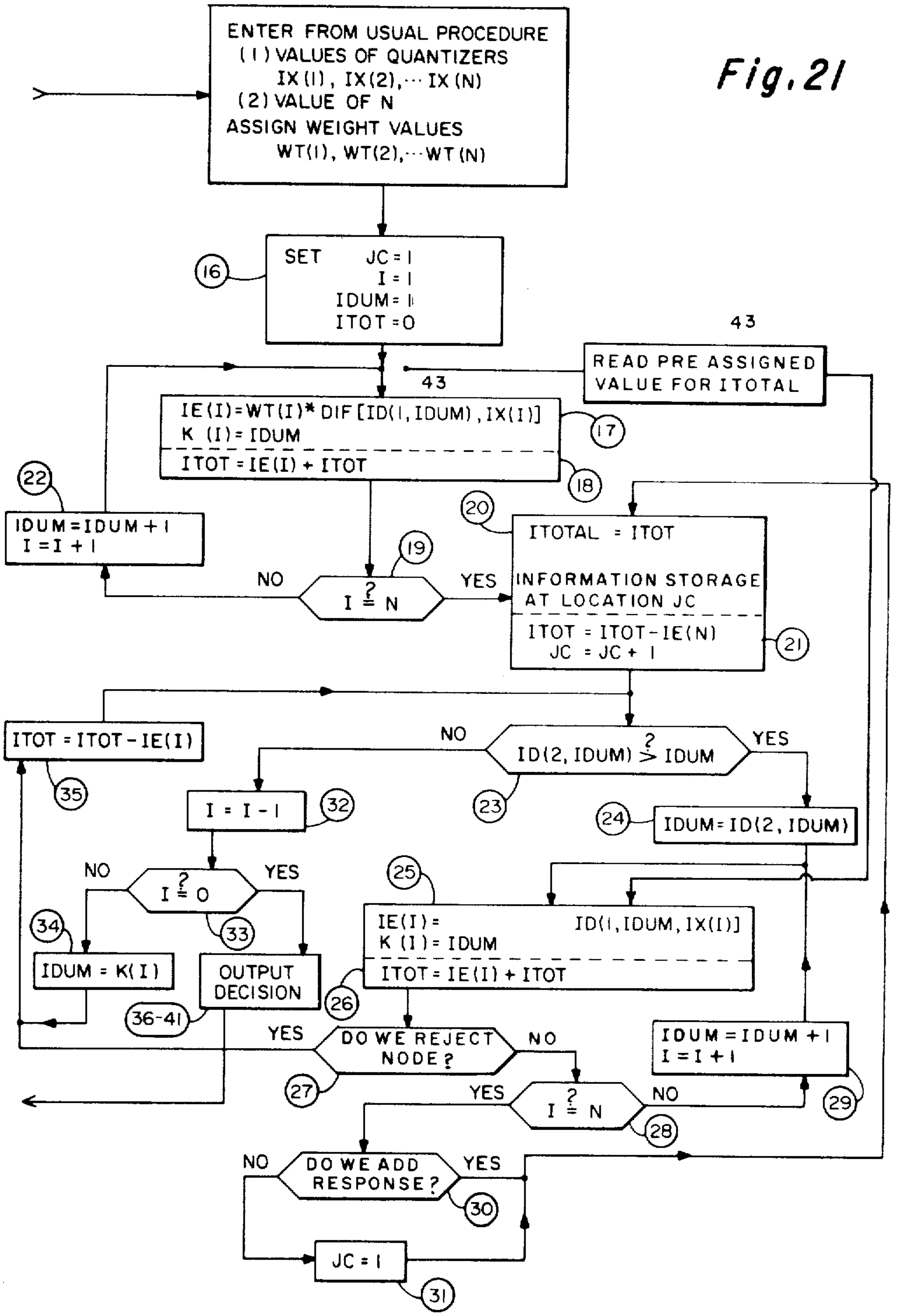
FIGS. 21 and 21A are generalized flow diagrams illustrating the optimum processor during expanded search operations.

The following description is of a special purpose computer designed to perform these operations described. The flow diagrams apply both to operations on a general purpose digital computer or on a special purpose computer illustrated in FIGS. 22–27. In FIGS. 10 and 21, control states 0–41 are assigned to the operations required in the flow diagram.

The legends set out in FIGS. 10 and 21 will best be understood by reference to the specific two input feedback example illustrated in FIGS. 22–27. Briefly, however, the following legends used in FIGS. 10 and 21 are employed in FIGS. 22–27.

Signal $u_i$ is the input signal which is a signal valued function of time and is used for training purposes. Subsequent signals $u_t$ may then be used in execution after training is completed.

Signal $z_t$ is the desired output of the processor to the input signal $u_t$ and is used only during training. Signal $x_{t-1}$ is a response of the processor at time $t_{t-1}$, to $u_{t-1}$ and $x_{t-2}$, etc. Signal $I_{x_1}$ is the quantized value of the input $u_t$ and signal $I_{x_2}$ is the quantized value of the feedback component $x_{t-1}$, and so constitute the key components for this example. ID1 is a term by which a register 184, FIG. 23, will be identified herein. ID1 register 184 will serve for separate storage of key components as well as elements of a G matrix. The address in register 184 will be specified by the legend ID(1,_) where information represented by the blank will be provided during the operation and is the node identification (number). Node values are key component IX values then stored in the nodes and form part of the information represented each node in the storage tree.

The other part of the information representing a node is the ADP signal which is a word in storage indicating whether or not there is an address previously established in the tree to which the search shall proceed if the storage node value does not match the corresponding key component at that node. The ADP signal is the address of the next node to which the search should continue.

Figure 22:
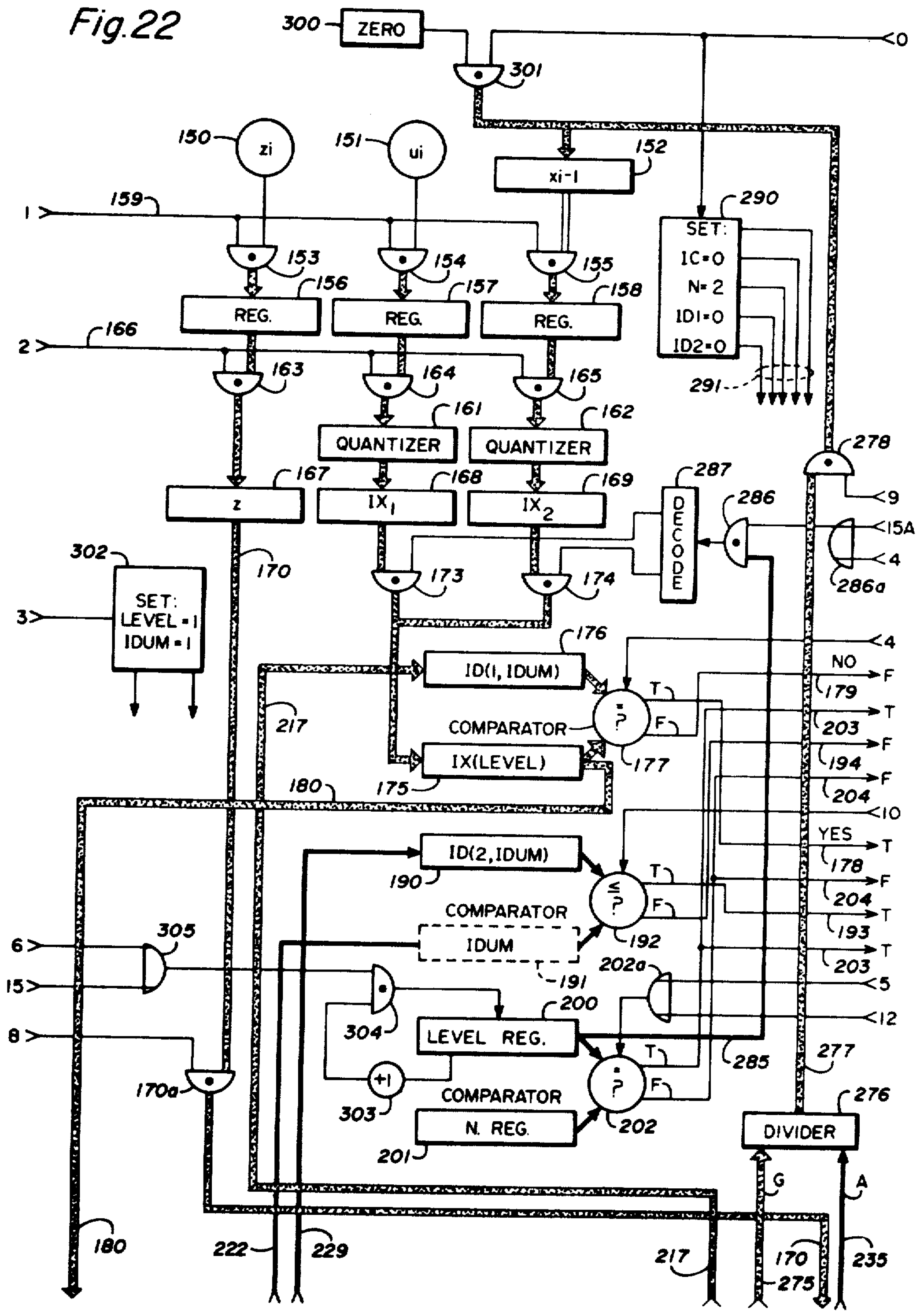
FIGS. 22 through 27 illustrate a special purpose tree structured digital processor for use during training and execution operations.
Figure 23:
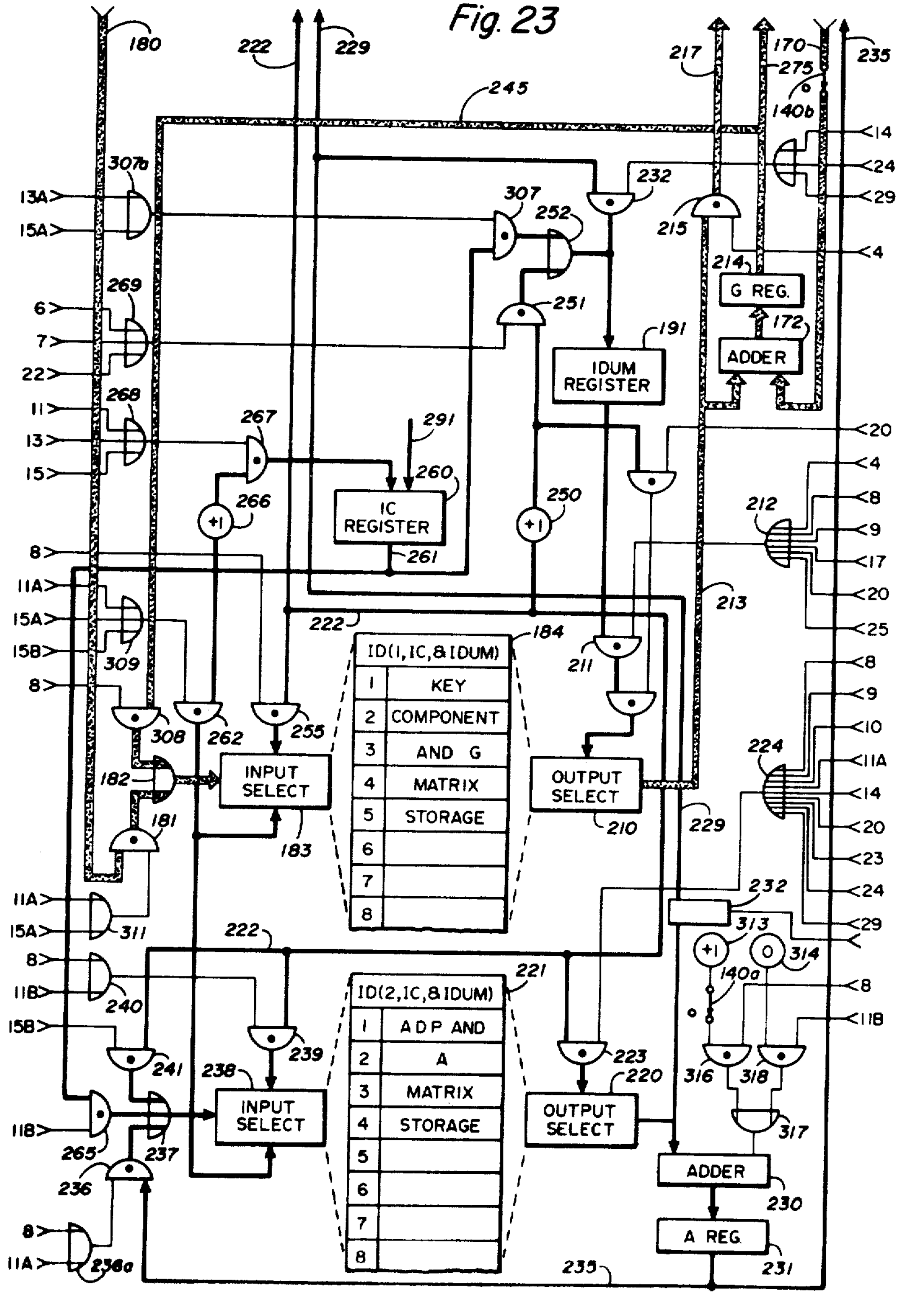

An ID2 register 221, FIG. 23, will serve for storage of the ADP signals as well as elements of the A matrix. The address in register 221 will be specified by the legend ID(2,_) where information represented by the blank is the node identification (number). Thus, ID2 is a term by which storage register 221 will be identified. IDUM refers to the contents stored in an incrementing dummy register 191 and is used to signify the node identification at any instant during operation. N register 201 is a register preset to the number of inputs. In the specific example of FIGS. 22–27, this is set to 2 since there are two inputs, $u_t$ and $x_{t-1}$. LEVEL is a numerical indication of the level in the tree structure. LEVEL register is a register which stores different values during operation, the value indicating the level of operation within the tree structure at any given time. IC register 260 is a register corresponding to the address of the storage locations in IDI and ID2. G is the trained value of the processor response. A is the number of times a given input set has been encountered in training.

Figure 26:
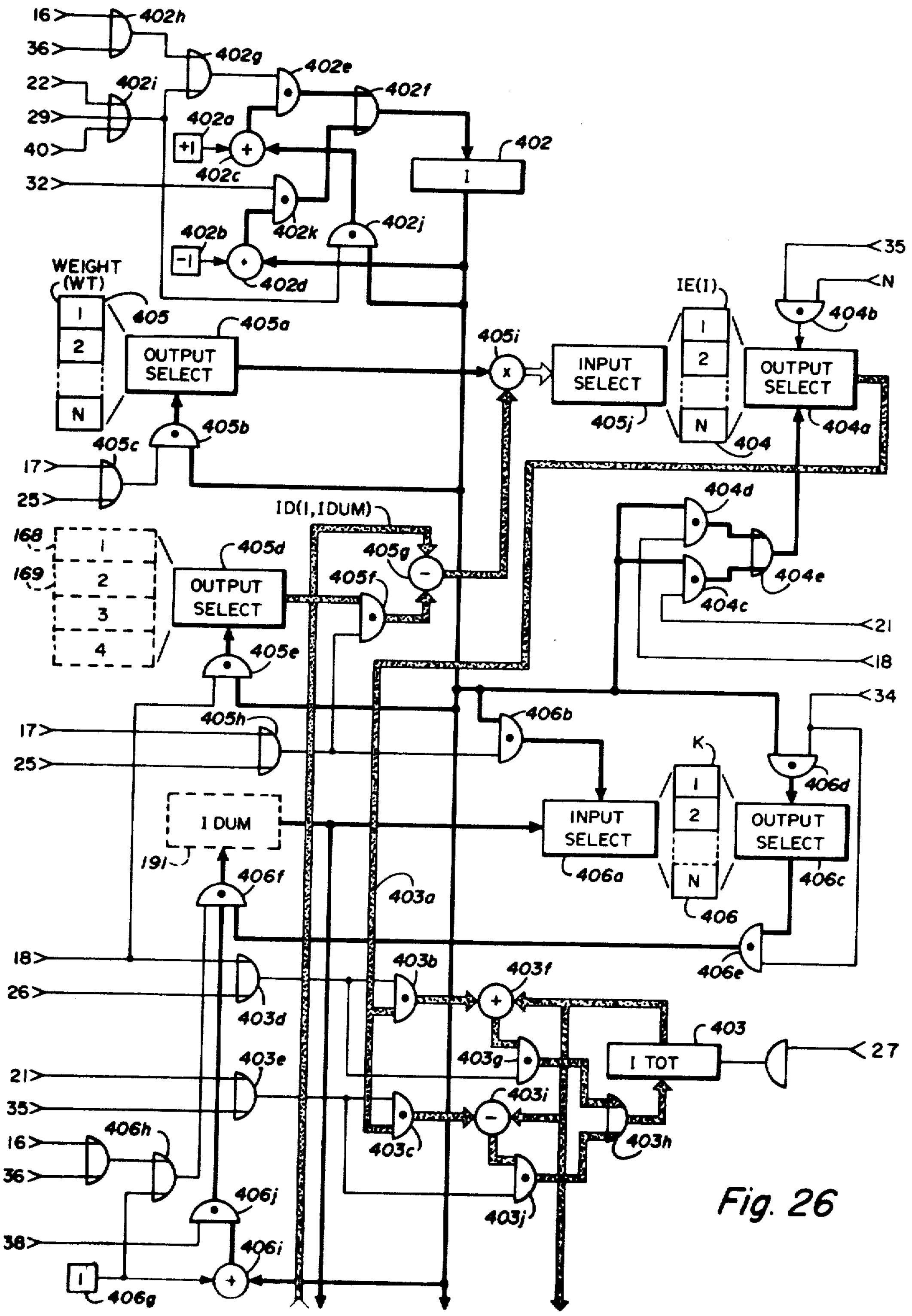
Figure 27:
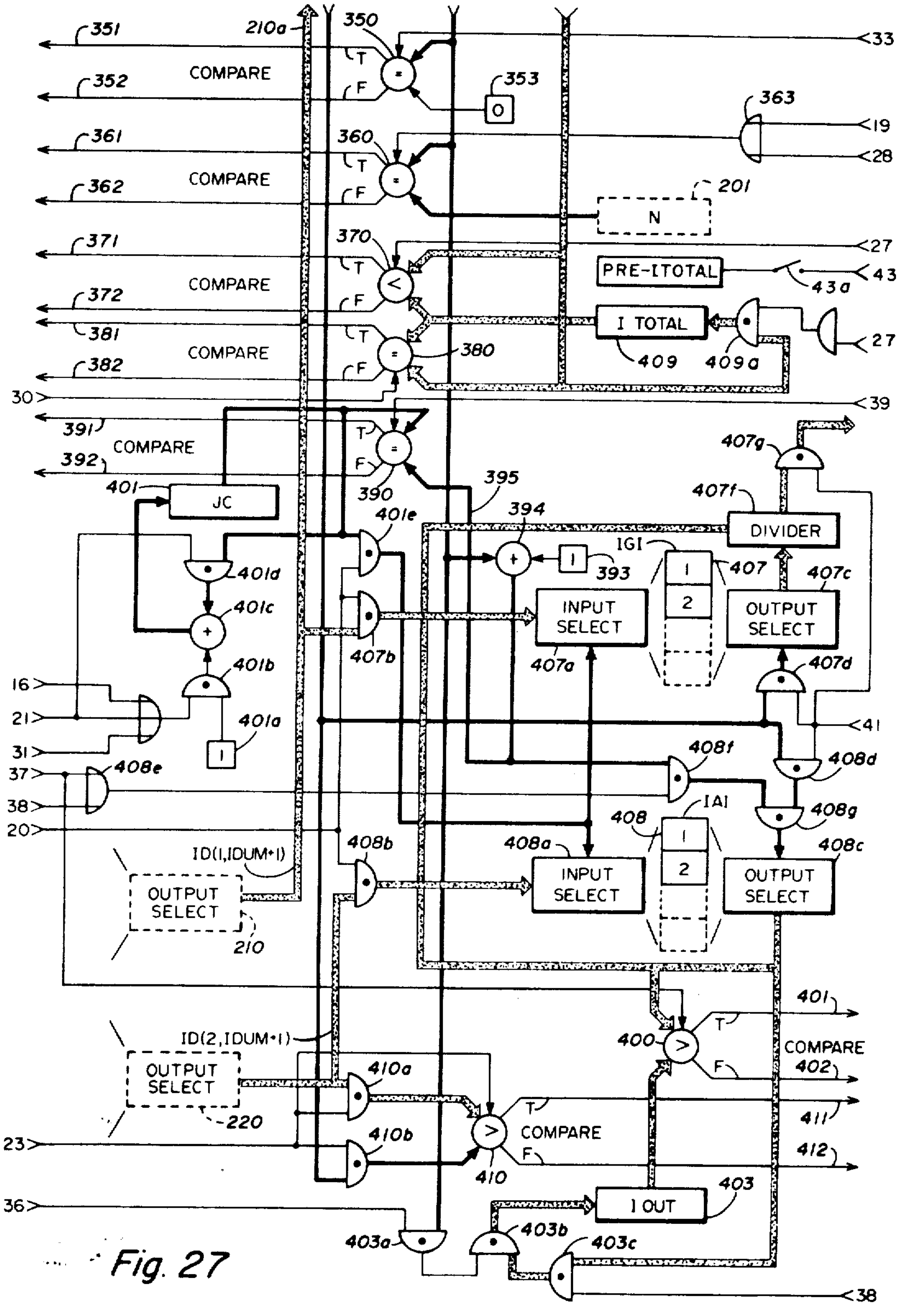

Similarly, in FIGS. 26 and 27 JC register 401, I register 402, ITOT register 403, and ITOTAL register 409 serve to store digital representations of states or controls involved in the operation depicted by the flow chart of FIG. 21, the data being stored therein being in general whole numbers. A set of WT registers 405 store weighting functions which may be preset and which are employed in connection with the operation of FIG. 21. K registers 406 similarly are provided for storing, for selection therefrom, representations related to the information stored in IDUM register 191, FIG. 22. IGI register 407 and IAI register 408 serve to store selected values of the G and A values and other information employed in the Expanded Search operation of FIG. 21. Comparators 350, 360, 370, 380, 390, 400 and 410 are also basic elements in the circuit of FIGS. 26 and 27 for carrying out the comparisons set forth in FIG. 21.

FIGS. 22 and 23

Refer first for FIGS. 22 and 23 which are a part of a special purpose computer comprised of FIGS. 22–27. The computer is a special purpose digital computer provided to be trained and then to operate on input signal $u_t$ from source 151. The desired response of the system to the source $u_t$ is signified as signal $z_t$ from source 150. The second signal input to the system $x_{t-1}$, is supplied by way of register 152 which is in a feedback path.

Samples of the signals from sources 150 and 151 are gated, along with the value in register 152, into registers 156–158, respectively, by way of gates 153–155 in response to a gate signal on control line 159. Line 159 leads from the control unit of FIG. 24 later to be described and is identified as involving control state 1. Digital representations of the input signals $u_t$ and $x_{t-1}$ are stored in registers 157 and 158 and are then gated into quantizers 161 and 162 by way of gates 164 and 165 in response to a gate signal on control line 166. The quantized signals $Ix_1$ and $Ix_2$ are then stored in registers 168 and 169. The desired output signal $z_t$ is transferred from register 156 through gate 163 and is stored in register 167.

The signal $z_t$ from register 167 is applied by way of line 170, gate 170*a*, and switch 140*b* to one input of an adder 172. Switch 140*b* is in position shown during training. The key component signals stored in registers 168 and 169 are selectively gated by way of AND gates 173 and 174 to an IX(LEVEL) register 175. A register 176 is connected along with register 175 to the inputs of a comparator 177. The TRUE output of comparator 177 appears on line 178. The FALSE output of comparator 177 appears on line 179, both of which are connected to gates in the control unit of FIG. 25. The output of the IX(LEVEL) register 175 is connected by way of line 180, gate 181, and circuit 182 to an input select unit 183. Unit 183 serves to store a signal from OR circuit 182 at an address in register 184 specified by the output of gates 255 or 262, as the case may be. A register 190 and an IDUM register 191 are connected at their outputs to a comparator 192. It will be noted that register 191 is shown in FIG. 23 and is indicated in dotted lines in FIG. 22. The TRUE output of comparator 192 is connected by way of line 193 to FIG. 25. The FALSE output is connected by way of line 194 to FIG. 25.

A LEVEL register 200 and N register 201 are connected to a comparator 202. The TRUE output of comparator 202 is connected by way of line 203 to FIG. 25 and the FALSE output of comparator 202 is connected by way of line 204 to FIG. 25. An output select unit 210 actuated by gate 211 from IDUM register 191 and from OR gate 212 serves to read the G matrix signal (or the key component signals) from the address in ID1 register 184 specified by the output of AND gate 211. Output signals read from register 184 are then applied by way of line 213 to the adder 172 at which point the signal extracted from register 184 is added to the desired output signal and the result is then stored in G register 214. The signal on channel 213 is also transmitted by way of gate 215 and line 217 to the input to the comparator register 176. The G stored in G register 214 is transmitted through AND gate 308, and OR gate 182 to the input select unit 183 for storage in the ID1 register 184.

An output selector unit 220 serves to read signals stored at addresses in the ID2 register 221 specified by an address signal from register 191 appearing on a line 222. An address gate 223 for output select unit 220 is controlled by an OR gate 224. The A matrix values (or the ADP signals) selected by output selector 220 are then transmitted to an adder 230, the output of which is stored in an A register storage unit 231. The output on line 229 leading from select unit 220 is also transmitted by way of gate 232 to the input of the comparator register 190. Gate 232 is controlled by a signal on a control line leading from FIG. 25.

The ADP and A stored in the A register 231 is transmitted by way of line 235, AND gate 236, and OR gate 237 to an input selector unit 238 for storage in the ID2 register 221 under control of OR gate 236a. The storage address in input select unit 238 is controlled by way of gate 239 in response to the output of IDUM register 191 as it appears on line 222. Gate 239 is controlled by way of OR gate 240 by control lines leading to FIG. 25. Line 222 also extends to gate 241 which feeds OR gate 237 leading to select unit 238. Line 222 leading from register 191 also is connected by way of an incrementer 250, AND gate 251 and OR gate 252 back to the input of register 191. Line 222 also extends to gate 255 leading to a second address input of the select unit 183. Line 222 also extends to the comparator 191 of FIG. 22.

An IC register 260 is connected by way of its output line 261 and by way of gate 262 to the control input of select units 183 and 238. Line 261 is also connected by way of gate 265 and an OR gate 237 to the data input of the select unit 238. Line 261 is also connected by way of an incrementer 266, AND gate 267 to the input of the register 260 to increment the same under the control of OR gate 268. Incrementing of IDUM register 191 is similarly controlled by OR gate 269.

The G value outputs from register 214 and the A value output from register 231 are transmitted by way of lines 235 and 275 to a divider 276, the output of which is transmitted by way of channel 277 and AND gate 278 to register 152 to provide feedback signal $x_{i-1}$.

The signal in the LEVEL register 200 is transmitted by way of the channel 285 and the gate 286 to a decoder 287 for selective control of gates 173 and 174.

An initializing unit 290 under suitable control is connected by way of channels 291 to registers IC 260, N 201, ID1 184 and ID2 221 to provide initial settings, the actual connections of channels 291, to IC. N, ID1 and ID2 not being shown. A zero state input from a source 300 is applied by way of AND gate 301 under suitable control to register 152 initially to set the count in register 152 to zero.

A second initializing unit 302 is provided to preset LEVEL register 200 and IDUM register 191.

LEVEL register 200 is connected by way of an incrementer 303 and AND gate 304 to increment the storage in register 200 in response to suitable control applied by way of OR gate 305.

The output of the IC register 260 is also connected by way of gate 307 and OR gate 252 to the input of IDUM register 191, gate 307 being actuated under suitable control voltage applied to OR gate 307*a*.

G register 214 in addition to being connected to divider 276 is also connected by way of line 275 to gate 308 and OR gate 182 to the data input of the select unit 183, gate 308 being actuated under suitable control. Similarly, gate 262 is actuated under suitable control applied by way of OR gate 309. Similarly, gate 181 is actuated under suitable control applied by way of OR gate 311.

It will be noted that the input of adder 230, FIG. 23, is controlled from a unit source 313 or a zero state source 314. The unit source 313 is connected by way of a switch 140a and a gate 316 to OR gate 317 which leads to the second input of the adder 230. The gate 316 is actuated under suitable control. The zero state source 314 is connected by way of gate 318 leading by way of OR gate 317 to the adder 230. Gate 318 similarly is actuated under suitable control. Switch 140a is in position shown during training.

Referring again to FIG. 10, it will be seen that control states 0–16 have been designated. The control states labeled in FIG. 10 correspond with the controls to which reference has been made heretofore relative to FIGS. 22 and 23. The control lines upon which the control state voltages appear are labeled on the margins of the drawings of FIGS. 22 and 23 to conform with the control states noted on FIG. 10.

GENERATION OF CONTROL SIGNALS — FIGS. 24 AND 25

Figure 24:
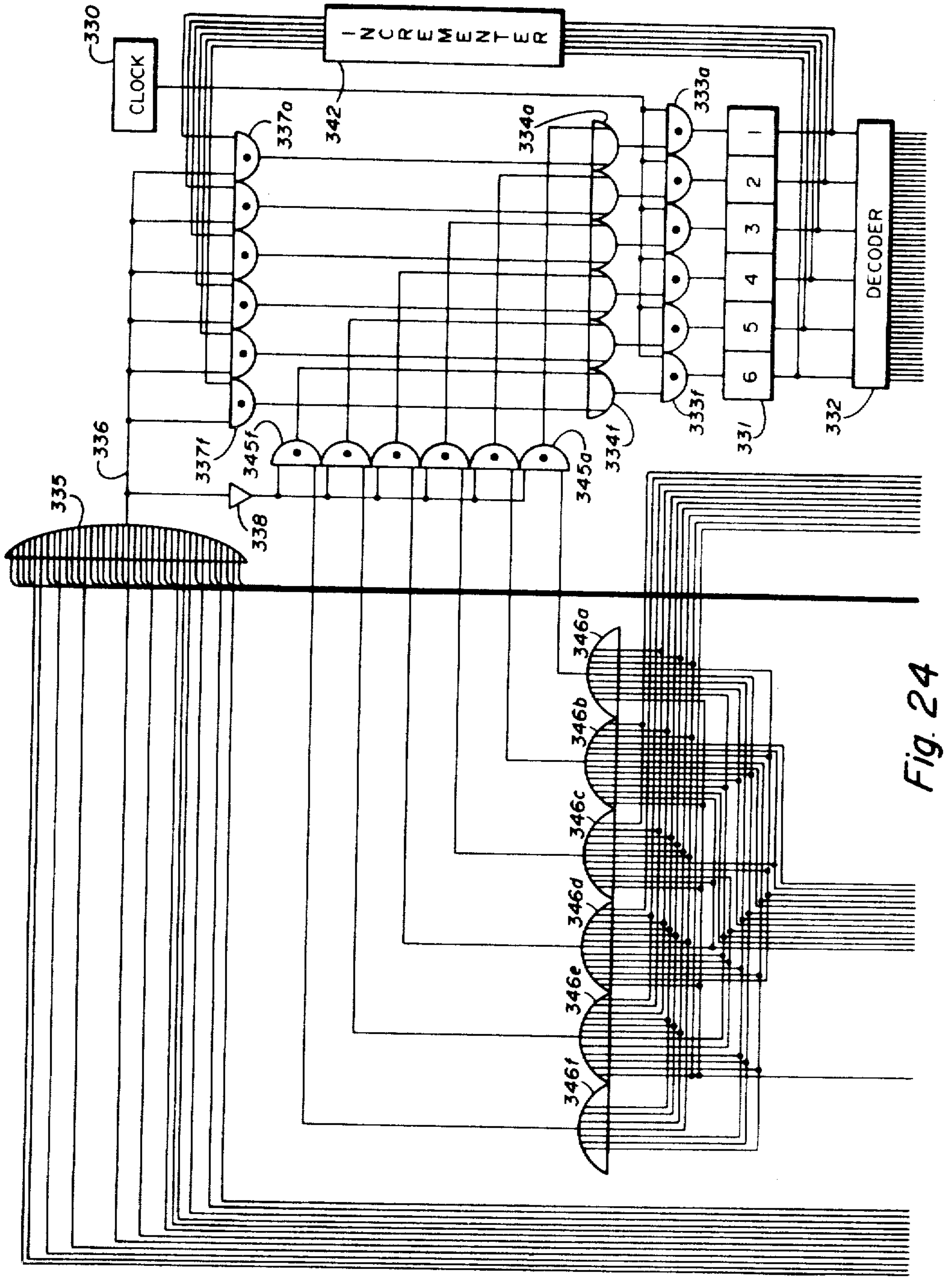

The control state voltages employed in FIGS. 22, 23, 26 and 27 are produced in response to a clock 330, FIG. 24, which is coupled to a counter 331 by way of AND gates 333*a* – 333*f*. Counter 331 is connected to a decoder 332 which has an output line for each of the states 0–41. The control states are then applied by way of the lines labeled at the lower right hand portion of FIG. 25 to the various input terminals correspondingly labeled on FIGS. 22 and 23 as well as FIGS. 26 and 27 yet to be described.

It will be noted that the counter 331 is connected to and incremented by clock 330 by way of a bank of AND gates 333*a–f*, one input of each of gates 333*a–f* being connected directly to the clock 330. The other input to each of gates 333*a–f* is connected to an output of a gate in the bank of OR gates 334*a–f*. OR gates 334*a–f* controlled by AND gates 337*a–f* or by AND gates 345*a–f*. The incrementer together with the output of OR gate 335 jointly serve to increment the counter 331 one step at a time. The AND gates 345*a–f* are employed wherein a change in the count in counter 331 other than an increment is called for by the operation set forth in FIGS. 10 and 21.

Counter 331 is decoded in well known manner by decoder 332. By this means, the control states 0–41 normally would appear in sequence at the output of decoder 332. Control lines for 0, 1, 2, 3, 7, 8, 11, 11A, 11B, 13, 15, 15A, 16–18, 20–22, 24–26, 32, 34, 36, 38 and 40 are connected to OR gate 335. The output of OR gate 335 is connected by way of line 336 to each of gates 337*a–f*. As above noted, the second input to gates 337*a–f* are supplied by way of an incrementer 342.

The output of gate 335 is also connected by an inverter unit 338 to one input of each of gates 345*a–f*. The second input of the gates 345*a–f* are supplied from logic leading from the comparators of FIGS. 22 and 27 and from the decode unit 332.

Gates 345*a–f* have one input each by way of a line leading from inverter 338 which is ANDed with the outputs from OR gates 346*a–f*. Gates 346*a–f* are provided under suitable control such that the required divergences from a uniform sequence in generation of control states 0–41 is accommodated. It will be noted that control states 6, 9, 13A, 14, 15B, 29, 31, 35 and 41 are connected directly to selected ones of gates 346*a–f*.

By reference to FIGS. 10 and 21 it will be noted that on the latter control states there is an unconditional jump. In contrast, it will be noted that control states 4, 5, 10, 12, 19, 23, 27, 28, 30, 33, 37 and 39 are applied to logic means whose outputs are selectively applied to OR gates 346*a–f* and to OR gate 335. More particularly, control state 4 is applied to gates 347*a* and 348*a;* control state 5 is applied to gates 347*b* and 348*b;* control state 10 is applied to AND gates 347*c* and 348*c;* control state 12 is applied to AND gates 347*d* and 348*d;* control state 19 is applied to AND gates 347*e* and 348*e;* control state 23 is applied to AND gates 347*f* and 348*f;* control state 27 is applied to AND gates 347*g* and 348*g;* control state 28 is applied to AND gates 347*h* and 348*h;* control state 30 is applied to AND gates 347*i* and 348*i;* control state 33 is applied to AND gates 347*j* and 348*j;* control state 37 is applied to AND gates 347*k* and 348*k;* and control state 39 is applied to AND gates 347*m* and 348*m*.

The outputs of AND gates 347*a–m* are selectively connected to OR gates 346*a–f* in accordance with the Schedule A (below) whereas AND gates 348*a–m* are connected to OR gate 335. The second input to each of gates 347*a–m* and to gates 348*a–m* are derived from comparators of FIGS. 22, 26 and 27 as will later be described, all consistent with Schedule A.

SCHEDULE A (Schedule of Logic Connections to OR Gates 346*a–f* and 335.)

| Present Control State | Condition | Next Control State | Bit Changed For Shift |
|---|---|---|---|
| 4 | yes | 5 | |
| | no | 10 | 2,3,4 |
| 5 | yes | 7 | 2 |
| | no | 6 | |
| 6 | — | 4 | 2,3 |
| 9 | — | 1 | 4 |
| 10 | yes | 11 | |
| | no | 14 | 1,2,4,5 |
| 12 | yes | 13 | 3,4,5 |
| | no | 15 | |
| 13A | — | 8 | 4,5 |
| 14 | — | 4 | 1,3,5 |
| 15B | — | 12 | 2,4,5 |
| 10 | yes | 16 | 1,2,3,4,5 |
| 19 | yes | 20 | |
| | no | 22 | 1,2 |
| 23 | yes | 24 | |
| | no | 32 | 1,4,5,6 |
| 27 | yes | 35 | 1,2,5,6 |
| | no | 28 | |
| 28 | yes | 30 | 2 |
| | no | 29 | |
| 29 | — | 25 | 3,4,5,6 |
| 30 | yes | 20 | 2,4,5,6 |
| | no | 31 | |
| 31 | — | 20 | 1,3,4,5,6 |
| 33 | yes | 36 | 1,2,3,4 |
| | no | 34 | |
| 35 | — | 23 | 3,5,6 |
| | yes | 38 | |
| | no | 39 | 2,3 |
| 39 | yes | 41 | 2 |
| | no | 40 | |
| 41 | — | 1 | 1,2,3,4,6 |

It will be noted that control state 10 is applied to gate 348*c* by way of switch 141. In the position shown in FIG. 25 switch 141*a* is set for a training operation. Thus, on control state 10 if the comparison is true, then the operation increments from control state 10 to control state 11. However, in execution of the comparison in control state 10 is true, then the operation skips from control state 10 to control state 16. This signifies, in execution, that all of the stored values have been interrogated and it has been found that the contemporary set of execution input signals were not encountered during training so that the system is attempting to execute on an untrained point. It is at this point that the system of FIGS. 26 and 27 are considered to permit continued operation in a preferred manner when an untrained point is encountered during execution as will later be described.

Figure 25:
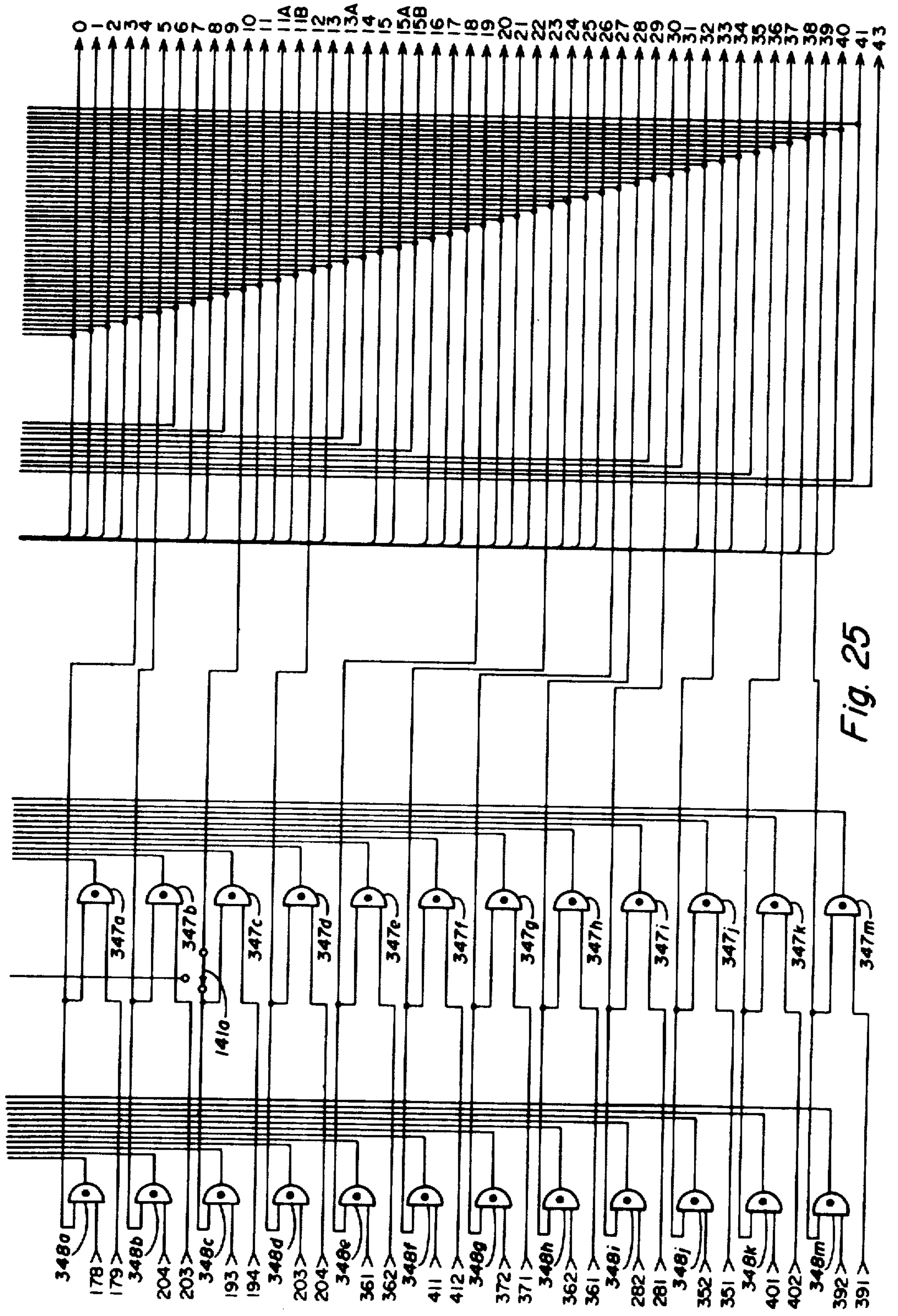

It will be noted that lines 178, 179, 204, 203, 193 and 194 are output lines leading from comparators 177, 192, and 202, FIG. 22. Lines 361, 362, 411, 412, 372, 371, 282, 281, 352, 351, 501, 502, 392, 391 appearing at the lower left side of FIG. 25 are output lines leading from the comparators 350, 360, 370, 380, 390, 400 and 410 of FIG. 27. The comparisons of Schedule A together with the connections indicated in FIGS. 24 and 25 will make clear the manner in which the sequences required in FIGS. 10 and 21 are accomplished through the operation of the system of FIG. 24.

By way of example, it will be noted that, in FIG. 10, on control state 4 comparison is made to see if the quantity ID(1,IDUM) is equal to the quantity IX(LEVEL). If the comparison is true, then the counter 331 increments so that the next control state 5 is produced. If the comparison is false, then the count in counter 331 must shift from 4 to 10. This is accomplished by applying the outputs of comparator 177 to AND gates 348*a* and 347*a*. The true output appearing on line 178 is applied to AND gate 348*a* whose output is connected by way of OR gate 335 and line 336 to the bank of AND gates 347*a–f*. As a result, the count from clock 330 applied to AND gates 333*a–f* is merely incremented to a count of 5. However, if the comparison is false, then there is a control state on line 179 leading to AND gate 347*a*. The output of AND gate 347*a* is connected to OR gates 346*b*, 346*c*, and 346*d*. This causes AND gates 345*b*, 345*c* and 345*d* to be enabled whereby the count in counter 331 rather than shifting from a count of 4 to a count of 5 shifts from a count of 4 to a count of 10. This is accomplished by altering the second, third and fourth bits of the counter 331 through AND gates 345*b*, 345*c* and 345*d*. Because of the presence of the inverter 338, only one of the two sets of AND gates 337*a–f* or 345*a–f* will be effective in control of gates 333*a–f* through OR gates 334*a–f*.

OPERATION — TRAINING — SPECIAL PURPOSE COMPUTER

In the following example of the operation of the system of FIGS. 22–25, thus far described the values of the input signal *u* and the desired output signal *z* that will be employed are set forth in Table I along with a sequence of values of the signal 7 to be used in post-training operations.

TABLE I

| Training Sequence | $u$ | $z$ (Desired Output) | Execution Sequence | $u$ |
|---|---|---|---|---|
| 1 | 2.5 | 2 | 1 | 2.3 |
| 2 | 1.5 | 2 | 2 | 1.2 |
| 3 | 1.6 | 1 | 3 | 1.8 |
| 4 | 1.0 | 1 | 4 | 3.5 |
| 5 | 2.3 | 1 | | |
| 6 | 1.0 | 1 | | |
| 7 | 2.3 | 2 | | |

It will be noted that the values of $u$ vary from one sample to another. Operation is such that key components are stored along with G and A values at addresses in the G matrix and in the A matrix such that in execution mode an output corresponding with the desired output will be produced. For example, in execution, it will be desired that every time an input signal sample $u = 2.5$ appears in the unit 151 and a feedback sample $x_{i-1} = 0$ appears in unit 152, FIG. 22, the output of the system will be the optimum output for this input key. Similarly, a desired response will be extracted from the processor for every other input upon which the processor has been trained.

In considering further details of the operation of the system of FIGS. 22–25, it was noted above that the processor may include digitizers in units 156 and 157 which may themselves be termed quantizers. However, in the present system, units 161 and 162, each labeled "quantizer," are used. Quantizers 161 and 162 in this setting serve to change the digitized sample values in registers 157 and 158 to coded values indicated in FIG. 11. Quantizers 161 and 162 thus serve as coarser digitizers and could be eliminated, depending upon system design. By using quantizers 161 and 162, a high or infinite range of signal sample values may be accommodated. As shown in FIG. 4, the quantizers provide output values which are related to input values in accordance with the function illustrated in the graph. In Table I when the discrete time sample of the signal $u = 2.5$, the function stored in the register 168 would be the value 32,008. The signal from units 150 and 151 may be analog signals in which case an analog-to-digital converter may be employed so that the digital representation of the signal in any case will be stored in registers 156 and 157. The signal in register 158 is the value of the signal in register 152. The signals in registers 157 and 158 are then applied to the quantizers 161 and 162 to provide output functions in accordance with the graph of FIG. 4.

The operations now to be described will involve the system of FIGS. 22–25 wherein one input signal $u_i$, one delayed feedback signal $x_{i-1}$ and the desired output signal $z$ are employed. The signals $u_i$ and $z$ have the values set out in Tables I and II.

TABLE II

| Control state | 0 | 1 | 2 | 3 | 4 | 10 | 11 | 11A | 11B | 12 | 15 | 15A | 15T | 12 | 13 | 13A | 8 | 9 | 1 | 2 |
|---|---|---|---|---|---|---|---|---|---|---|---|---|---|---|---|---|---|---|---|---|
| u | | 2.5 | | | Test | Test | | | | Test | | | | Test | | | | | 1.5 | |
| $x_{i-1}$ | 0 | 0 | | | | | | | | | | | | | | | | 2/1 | | |
| $z_i$ | | 2.0 | | | | | | | | | | | | | | | | | 2 | |
| z | | | 2 | | Answer | Answer | | | | Answer | | | | Answer | | | | | | |
| Level | | | | 1 | | | | | | | 2 | | | | | | | | | |
| IDUM | | | | 1 | | | | | | | | 2 | | | | 3 | | | | |
| IC | 0 | | | | False | True | 1 | | | False | 2 | | | True | 3 | | | | | |
| N | 2 | | | | | | | | | | | | | | | | | | | |
| $IX_1$ | | | 32008 | | | | | | | | | | | | | | | | | 32008 |
| $IX_2$ | | | 32006 | | | | | | | | | | | | | | | | | 32006 |
| ID(1,1) | 0 | | | | | | | 32008 | | | | | | | | | | | | |
| ID(1,2) | 0 | | | | | | | | | | | 32006 | | | | | | | | |
| ID(1,3) | 0 | | | | | | | | | | | | | | | | 2 | | | |
| ID(1,4) | 0 | | | | | | | | | | | | | | | | | | | |
| ID(1,5) | 0 | | | | | | | | | | | | | | | | | | | |
| ID(1,6) | 0 | | | | | | | | | | | | | | | | | | | |
| . . . | | | | | | | | | | | | | | | | | | | | |
| ID(2,1) | 0 | | | | | | | 0 | 1 | | | | | | | | | | | |
| ID(2,2) | 0 | | | | | | | | | | | | 2 | | | | | | | |
| ID(2,3) | 0 | | | | | | | | | | | | | | | | 1 | | | |
| ID(2,4) | 0 | | | | | | | | | | | | | | | | | | | |
| ID(2,5) | 0 | | | | | | | | | | | | | | | | | | | |
| . . . | | | | | | | | | | | | | | | | | | | | |

It will be understood that the initial feedback signal $x_{i-1}$ is zero both during training and execution.

For such case, the operations will be described in terms of the successive control states noted in Table II.

Control state 0: In this state, the decoder 332 applies a control voltage state on the control line designated by 0 which leads from FIG. 25 to FIG. 22. The term "control voltage" will be used to mean that a "1" state is present on the control line. This control voltage is applied to AND gate 301 to load a 0 into the register 152. This control voltage is also applied to the SET unit 290. Unit 290 loads IC register 260 with a zero, loads a register 201 with the digital representation of the number 2. It also sets all of the storage registers in the ID1 unit 184 and ID2 unit 221 to 0.

It will be noted that the control voltage on the 0 control line is applied by way of OR gate 335 and line 336 to each of AND gates **337*a–f*. AND gates 337*a–f*, because of the output of the incrementer 342, provide voltages on the lines leading to AND gates 334*a–f* such that on the next clock pulse from clock 330 applied to AND Agate 333*a–f* from clock 330, a control voltage appears on the control line 1 with zero voltage on all of the rest of the control lines 0–41, FIG. 23**.

Control state 1: In this state, the control voltage on line 159 of FIG. 22 is applied to AND gates 153–155 to load registers 156–158 with the digital representations shown in Table II. Register 156 is loaded with 2.0. Register 157 is loaded with 2.5. Register 158 is loaded with 0.

Control state 2: The control voltage on control line 2 causes the signals in registers 156–158 to be loaded into register 167–169. More particularly, the value of $z = 2$ is loaded on register 167. The value of 32008 is loaded into register 168 and the value 32006 is loaded into the register 169.

Control state 3: The control voltage appearing on control line 3 serves to load LEVEL register 200 with a digital representation of the number 1, and loads the same number into the register 191. This initializing operation has been shown in FIG. 4 as involving the set unit 302 operating in a well known manner.

Control state 4: The control voltage on control line 4 is applied to comparator 177. At the same time, the control voltage is applied to AND gate 215 and through OR gate 212 to AND gate 211. This loads the contents of the register ID(1,IDUM) into register 176 and produces on lines 178 and 179 output signals representative of the results of the comparisons. Comparator 177 may be of the well-known type employed in computer systems. It produces a control voltage on line 178 if the contents of As ID(1,IDUM) register 176 equals the contents of register the Ix (LEVEL) 175. If the comparison is false, a control voltage appears on line 179. Register 175 is loaded by the application of the control voltage to AND gate 286 by way of OR gate **286*a* whereupon decoder 287 enables gate 173 or gate 174 to load register 175. In the example of Table II, the LEVEL register has a 1 stored therein so that the contents of register 168 are loaded into register 175. This test results in a control voltage appearing on line 179 and no voltage on line 178, because the signals in registers 175 and 176 do not coincide as there has been no prior information stored in the ID(1,1**) register.

As above explained, when the comparison in unit 177 is false, the operation skips from control state 4 to control state 10 as shown in FIG. 10, the counter 331 being actuated to skip the sequence from 5–9. As a result the next control line on which a control voltage appears at the output of the decoder is control line 10.

Control state 10: Control line 10 is connected to the comparator 192 to determine whether or not the contents of register 190 ID(2,IDUM) is equal to or less than the contents of IDUM register 191. This is accomplished by applying the control voltage on control line 10 through OR gate 224 to AND gate 223 by which means the contents of the register ID(2,IDUM) 221 appear on line 229 which leads to register 190. The IDUM register 191 shown in FIG. 23 is shown dotted in FIG. 22. The output of register 191 is connected by way of line 222 to comparator 192. Thus, there is produced on lines 193 and 194 voltage states which are indicative of the results of the comparison in comparator 192. From Table II, the contents of ID(2,IDUM) register 190 is 0 and the contents of IDUM register 191 is 1, thus the comparison is true. A resultant control voltage appears on line 193 with zero voltage on line 194. The control voltage on line 193 acting through AND gate **348*c* causes the counter 331 to increment by a count of 1 to the next control state 11**.

Control state 11: The control voltage appearing on line 11 is applied to AND gate 267 by way of OR gate 268 to increment the count from 0 to 1 in IC register 260.

Control state 11A: The control voltage on control line 11A is applied to AND gate 181, through OR gate 311, to apply the contents of register 175 to the input select unit 183. The address at which such contents are stored is determined by the application of control voltage on control line 11A to AND gate 262, by way of OR gate 309, so that the contents of register 175 are stored in ID(1,1). Control line 11A is also connected to AND gate 236 by way of OR gate 236a to apply to the input select unit 238 the contents of the A register 231. Contents of A register 231 correspond with the value stored at the ID(2,IDUM) by connecting control line 11A to AND gate 223, through OR gate 224. The contents of ID(2,1) was 0 so that such a value is now stored in ID(2,1).

Control state 11B: The control voltage on control line 11B is applied to AND gates 265 and 239 to store, at address ID(2,1) the voltage representative of the contents of register 260, i.e., a 1 which is the ADP for the value stored in ID(1,1). Node 1 at the tree is identified by ID(1,1) and ID(2,1) has the value 32,008 stored in ID(1,1) and an ADP of 1 stored in ID(2,1).

Control state 12: The control voltage on control line 12 is applied by way of OR gate **202*a* to comparator 202. The comparison is to determine whether or not the contents of register 200 equals the contents of register 201. At this time, register 200 contains a 1 and register 201 contains a 2. Thus, the comparison is false so that a control voltage appears on line 204 with a 0 voltage on line 203. Line 204 operates through AND gate 347*d* to set the counter 331 to skip to the control state 15**.

Control state 15: The control voltage on control line 15 is applied to AND gate 304, through OR gate 305, to increment the value in register 200 from a 1 to a 2. Similarly, line 15 is connected to AND gate 267, through OR gate 268, to increment register 260 from a 1 to a 2 to search the second level.

Control state 15A: The control voltage on control line 15A is applied to AND gate 307, through OR gate **307*a*, to load the contents of register 260 into the register 191. Control line 15A is also connected to AND gates 181 and 286 to select the second key component and apply the contents of register 169 via register 175 to the input select unit 183. Control line 15A is also connected to AND gate 262, through OR gate 309, to control the location of the storage of the contents of register 175 in the ID1 register, namely at the location ID(1,2**).

Control state 15B: The control voltage on control line 15B is applied to AND gate 241 to apply the contents of register 191 to the input select unit 238. The control line 15B is also connected to AND gate 262, through OR gate 309, to control location of storage by using the contents of register 260 to address the input select unit 238. As a result there will be stored at the location ID(2,2) the contents of register 191, namely, a 2. The completion of the operations of a control state 15B lead back to the comparison control state 12. The second key component IX2 has been stored in the second node with the value 32,006 stored in ID(1,2) and the ADP of 2 stored in ID(2,2).

Control state 12: Upon this comparison, through application of the control voltage on control line 12 to comparator 202, it is found that the contents of register 200 equal the contents of register 201. Thus, on control state 12, the counter 331 is incremented to control state 13.

Control state 13: The control voltage on control line 13 is applied to AND gate 267, through OR gate 268, to increment the contents of register 260 from a 2 to a 3 to the third level.

Control state 13A: The control voltage on control line 13A is applied to AND gate 307, through OR gate 307*a*, to load the contents of register 260 into register 191. Control line 13A, FIG. 25, is connected to OR gates 346*d* and 346*e* to reset the counter 331 to control state 8.

Control state 8: In control state 8, the contents of the ID2 register 221 at the address corresponding with the contents of register 191, is to be incremented. The corresponding address in the ID1 register 184 is to be increased by the amount of the desired output $z$.

Thus, the control line 8 is connected to AND gate 223, by way of OR gate 224, to place onto line 229 the contents of the register ID(2,IDUM). Control line 8 is also connected to AND gate 316 whereby a 1 from source 313 is applied to the adder 230. The sum is then stored in A register 231 and is applied, by way of AND gate 236 and OR gate 237, to the input select unit 238. Control line 8 is connected to AND gate 236 by way of OR gate 236*a* and to AND gate 239 by way of OR gate 240 so that the contents of register 231 are stored in register 221 at the location ID(2,IDUM).

Control line 8 is also connected to AND gate 211, by way of OR gate 212, to select from register 184 the value stored at ID(1,IDUM). This value is then applied to adder 172 along with the current value of the desired output $z$. The sum then appears in register 214. This sum is then applied, by way of channel 245, to AND gate 308 and then by way of OR gate 182 to unit 183. This value is stored in unit 184 at the address controlled by the output of the register 191 under the control of the voltage on control line 8 as connected to AND gate 255. Thus, a 2 is stored at the location ID(1,3). A 1 is stored at location ID(2,3). The $z$ of 2 has been stored in the G register ID(1,3) at the third level and the A of 1 stored in the A register ID(1,3).

Control state 9: In response to the control 9, the quantities ID(1,IDUM) and ID(2,IDUM) are applied to the divider 276 so that the quotient will be provided on line 277. The quantity stored at ID(1,IDUM) represents one value of a G matrix. The ratio of these two values represents the present state of the training that the unit has undergone to provide a trained response of 2.0 when the input is 2.5.

More particularly, control line 9 is connected to AND gate 211, by way of OR gate 212, to produce on line 213 the output ID(1,IDUM). This is a 2. At the same time, the control line 9 is connected to AND gate 223, through OR gate 224, to provide on line 235 the voltage representative of ID(2,IDUM). This is a 1. Thus, the output on line 277 is a 2. This value is then applied by way of AND gate 278 for storage in register 152. Thus, there has been completed one cycle of the training operation.

It will be noted that in FIG. 25, the control line 9 is connected to OR gate 346*d* to reset the counter 331 to control state 1. Further the control states shift backwards on each of control states 6, 9, 13A, 14, and 15B. The control states shift forward on each of control states 4, 5, 10 and 12, depending upon conditions encountered. The shifts backward are unconditional. The necessary logic arrangement for shifting forward or backwards in accordance with FIG. 10 is implemented through OR gates 346*a–f* and AND gates 347*a–d*.

Just as the operations indicated on the flow diagram of FIG. 21 have been implemented in the special purpose computer of FIGS. 22–25, the same may also be implemented through use of software for the control and actuation of a general purpose digital computer. The system, however, implemented, provides for an infinite quantization with minimization of the storage required, the storage in the registers 184 and 221 being allocated on a first-come, first-served basis with values stored to provide for retrieval of any desired information either during the training or during the execution mode of operation.

From Table I it will now be noted that the second training sequence involves an input $u$ having a value of 1.5 and a desired output $z$ equal to 2.0. A series of operations then is performed similar to those above described. Without describing the subsequent operations in the detail above noted, the following represents the operations in response to the control states in the second training sequence.

Control state 1: Register 156 is loaded with 2.0. Register 157 is loaded with 1.5.

Control state 2: By reference to FIG. 3, it will be noted that register 168 is loaded with 32007. Register 169 is loaded with 32,008.

Control state 4: On this test ID(1,IDUM) equals 32,008 and IX(LEVEL) equals 32,007 and, therefore, the test is false. Thus, the control is shifted to control state 10.

Control state 10: On this test, ID(2,IDUM) = 1 and IDUM = 1, therefore, the answer is true. Therefore, the operation shifts to control state 11.

Control state 11: IC register 260 is incremented to 4.

Control state 11A: The number 32,007 is loaded into ID(1,4). A 1 is loaded into ID(2,4).

Control state 11B: The contents of register 260, namely, a 4, is loaded into ID(2,1).

Control state 12: On this test the answer is false. Therefore, the operation shifts to control state 15.

Control state 15: LEVEL register 200 is incremented from 1 to 2. The IC register 260 is incremented from 4 to 5.

control state 15A: The contents of IC register 260 are loaded into IDUM register 191. The value 32,008 is loaded into ID(1,5).

Control state 15B: The contents of IDUM register 191 are loaded into ID(2,5). The operation then returns to control state 12.

Control state 12: This test now is true. Therefore, the operation shifts to control state 13.

Control state 13: Register 260 is incremented from 5 to 6.

Control state 13A: Contents of register 260 are loaded into register 191. Note the operation results in the shift to control state 8.

Control state 8: A 2 is loaded into ID(1,6). A 1 is loaded into ID(2,6).

Control state 9: A 2 is produced at the output of divider 276, being representative of the ratio ID(1,6)/ID(2,6. This returns the operation to control state 1.

The pattern of operation as outlined on the flow diagram of FIG. 3 may be followed by further reference to the control states noted on FIGS. 22–27 and the values which flow from the sequency found in Table I.

If the sequence set out in Table I is followed further in the detail above enumerated for samples 1 and 2, it will be found that there will be an expansion of the use of the computer components, particularly memory, in accordance with the successive values listed in Table III.

TABLE III

| Sequence | | 1 | 2 | 3 | 4 | 5 | 6 | 7 | 8 |
|---|---|---|---|---|---|---|---|---|---|
| $u$ | = | 2.5 | 1.5 | 1.6 | 1.0 | 2.3 | 1.0 | 2.3 | |
| $z$ | = | 2 | 2 | 1 | 1 | 1 | 1 | 2 | |
| $x$ | = | 0 | 2 | 2 | 1.5 | 1 | 1 | 1 | 1.5 |
| N | = | 2 | 2 | 2 | 2 | 2 | 2 | 2 | 2 |
| LEVEL | = | 12 | 12 | 12 | 12 | 12 | 12 | 12 | |
| IDUM | = | 123 | 156 | 1456 | 1458 | 1210 | 14578 | 12910 | |
| IC | = | Ø123 | 456 | | 78 | 910 | | | |
| IX(1) | = | 32008 | 32007 | 32007 | 32007 | 32008 | 32007 | 32008 | |
| IX(2) | = | 32006 | 32008 | 32008 | 32007 | 32007 | 32007 | 32007 | |

It will be noted that on line 1 of TABLE III the values of the input signal $u$ correspond with those found in Table I. Similarly, the values on line 2 correspond with the desired output values of Table I. On line 3, the values of the feedback signal are altered in dependence upon the training results.

On line 4, the N register stays constant at 2 throughout the entire operation since there are only two effective inputs, i.e., $u$ and $x_{t-1}$. On line 5, the level changes from 1 to 2 in each sequence as the search for a given address changes from first level in the tree storage to the leaf level.

On line 6, the IDUM register 191 of FIG. 23 varies throughout the sequence from the starting value of 1 to a maximum of 10. It will also be noted that the IC register includes storage which varies from an initial value of 0 to the maximum of 10 in an ordered sequence. The value stored in registers IX(1) and IX(2) correspond with the quantization levels for the input values $u$ and $x_{t-1}$ as determined by the graph of FIG. 4.

The manner in which the storage is utilized is illustrated in Table IV, where /, i.e., 0 signifies storage replacement.

TABLE IV

| IC | ID(L,IC) | ID(2,IC) |
|---|---|---|
| 1 | Ø 32008 | Ø 1 4 |
| 2 | Ø 32006 | Ø 2 9 |
| 3 (matrix elements) | Ø 2 | Ø 1 |
| 4 | Ø 32007 | Ø 1 |
| 5 | Ø 32008 | Ø 5 7 |
| 6 (matrix elements) | Ø 2 3 | Ø 1 2 |
| 7 | Ø 32007 | Ø 5 |
| 8 (matrix elements) | Ø 1 2 | 0 1 2 |
| 9 | Ø 32007 | Ø 2 |
| 10 (matrix elements) | Ø 1 3 | Ø 1 2 |
| 11 | 0 | 0 |
| 12 | 0 | 0 |

It will be noted that the G and A matrices values are found at addresses in ID1 and ID2 corresponding to the third, sixth, eighth and 10th locations.

For any sequence of input signals $u$ and desired output signals $z$, the processor is trained so that it will provide the answer most representative of the desired response in post training operations. The example given is elementary and has been purposely so designed in order to assist in understanding the invention. It will be understood, however, that a plurality of input signals and/or a plurality of feedback signals may be employed. Thus, the flow chart of FIG. 10 is of general applicability. The special purpose computer of FIGS. 22–25 has been tailored to the two input examples set out in Table I. To accommodate more inputs, additional registers such as register 157 for input signals and such as register 158 for feedback signals $x_{t-2}$, etc., would be provided. Thus, there is presented the system of FIGS. 22–25 by way of example, recognizing and emphasizing the general applicability of the method and system disclosed herein.

OPERATION — EXECUTION

After completion of training, system changes are made as represented by opening of switches 140, **140*a*, 140*b* and 141. Thereafter, the execution sequence of Table I may be followed by reference to FIG. 21 and FIGS. 22–25. When the switches 140, 140*a*, 140*b* and 141 are in the execution position, control state 8 is ineffective thus producing the same effect as a direct shift from control state 7 to control state 9. Control state 10 will transfer to control state 16 rather than 11 when the test in control state 10** is true.

Control state 16: This state represents the system as it reacts during execution when it encounters an untrained point. There are different methods possible for proceeding when an untrained point is encountered. One way would be to utilize the preceeding trained point through use of a first order delay for state 16 and return from state 16 directly to state 1.

From the foregoing it will be seen that the operations shift backwards on each of control states 6, 9, 13A, 14 and 15B. The control states shift forward on each of control states 4, 5, 10 and 12, depending upon conditions encountered. The shifts backward are unconditional. The necessary logic arrangement for shifting forward or backwards in accordance with FIG. 4 is implemented through OR gates **346*a–f* and AND gates 347*a–d***.

Just as the operations indicated on the flow diagram of FIG. 21 have been implemented in the special purpose computer of FIGS. 22–25, the same may also be implemented through use of software for the control and actuation of a general purpose digital computer. The system, however implemented, provides for an infinite quantization with minimization of the storage required, the storage in the registers 184 and 221 being allocated on a first come, first served basis with keys being provided for retrieval of any desired information either during the training or during the execution mode of operation.

PREFERRED UNTRAINED POINT EXECUTION

Use of the last trained point when, in execution, an untrained point is encountered, would permit the operation to continue with the untrained point being replaced by the previous trained response of the system. However, such a mode of operation is not the most preferred, especially in problems not involving time sequences of continuous training functions, even thought such mode is easy to implement.

A preferred mode of operation involves use of the portions of the system, when an untrained point is encountered during execution, shown in FIGS. 26 and 27 responsive to control states 16–43.

FIGS. 26 THROUGH 27

IN FIGS. 22 through 27 the portion of the system illustrated provides for carrying out the expanded search operation of FIG. 21. This portion of the system may be used to carry out a search operation for testing with untrained points in execution.

The system serves to compare an untrained key, component by component, with stored keys previously entered in register 184. The manner in which this is done is to compare the untrained component stored in IX(1) with the first key component of the first path stored in register 184. The difference between the first untrained and the first trained key component is then stored. The G and A for the first trained key are also stored. The second untrained and second trained key components are then compared and the difference is stored. Such a sequence of comparisons continues from the root of the first path to the leaf. Each difference is multiplied by an appropriate preassigned weight designated by WT($i$) in FIG. 4, and the weighted differences are then summed. Of course, the values of WT($i$) may be unity so that the sum of the differences is obtained. Thereafter, the untrained key is compared with the second trained key, component by component, and the weighted differences are summed. At the end of this sequence a comparison is made to see if the difference between the untrained key and the second reference key is less than the difference between the untrained key and the first trained key. If it is not, the first difference is retained in storage, and the G and A of the first trained key are retained, and the untrained key is compared, component by component, with the third trained key. If a subsequent trained key is found to be closer to the untrained key, then that difference replaces the previous difference, and the pertinent values relative to that trained key are stored. Thus, the operation continues to provide differences pursuant to steps 16–35 of FIG. 21. As minimum error trained responses are identified in control states 16–35, the G and A matrix values relating to the trained keys are stored.

If there are several trained keys found to be equally close to the untrained key, then, in the steps 36–41 of FIG. 21, a choice is made between those of apparent equal closeness. While only one basis for the latter choice has been shown in detail as implemented by steps 36–41 of FIG. 21, other bases for such choice will also be described. Thus, with the foregoing general understanding of the operation to be followed when an untrained point is encountered, reference may now be had to the circuit of FIGS. 26 and 27. After the best fit is found, the ratio G/A is then produced and stored in the registers 407 and 408, FIG. 27, and the execution operation returns to normal and continues until an untrained point is next encountered.

The system includes a dummy register 402 in which I values are stored. While this register could be the same as register 175, FIG. 22, a separate unit has been shown and will be described in operation independent of register 175. It serves the same function in FIGS. 26 and 27 as unit 175 serves in FIG. 22.

The value stored in register 402 appears on its output channel for use at various points required by FIG. 21. Provision is made for incrementing or decrementing the count stored in register 402. More particularly, a +1 source **402*a* and a −1 source 402*b* are provided, together with adders 402*c* and 402*d*. The output of adder 402*c* is connected by way of AND gate 402*e* and OR gate 402*f* to register 402. AND gate 402*c* is enabled by way of the output of an OR gate 402*g*. Control states 16 and 36 are applied to OR gate 402*g* by way of OR gate 402*h*. Control states 27, 29 and 40 are applied to OR gate 402*g* by way of OR gate 402*i*. The output of OR gate 402*i* is also applied to one input of an AND gate 402*j* where it is ANDed with the output of register 402 to perform the summation in unit 402*c*. Control state 32 is applied to AND gate 402*k* to perform the decrementing operation involving source 402*b***.

An array of weighting registers (WT) 405 are provided for storing weighting functions preset prior to operation. The weighting functions are selected to represent multipliers predetermined as will hereinafter be set out. The selected values stored in the register 405 may be read from storage by way of output select unit **405*a*. The address is provided for output select unit 405*a* by way of AND gate 405*b*. The inputs to AND gate 405*b* are the I values from register 402 and control states 17 or 25 applied by way of OR gate 405*c***.

An output select unit **405*d* is employed to read from registers 168, 169 or other registers associated therewith in which the IX values or keys are stored. The address for output select unit 405*d* is provided by way of AND gate 405*e* which is enabled by control state 18 and the I value from register 402. The IX values from unit 405*d* are applied by way of AND gate 405*f* to a subtraction unit 405*g*. AND gate 405*f* is enabled by either of control states 17 or 25 applied thereto by way of OR gate 405*h*. The output select unit 210 shown dotted in FIG. 27 is shown in its relationship to register 184, FIG. 23. The value on path 210*a* is applied to subtraction unit 405*g*. The difference output is then applied to a multiplier 405*i* whose second input is derived from output select unit 405*a* and is a weighting function. The product is then applied by way of an input select unit 405*j* to the IE(1) array registers 404. Array 404** serves to store the individual node errors for the leaf under consideration.

Any error value stored in register 404 may be read by way of an output select unit **404*a* in response to control state 35 at the address N by way of AND gate 404*b*. The output may also be selected in response to control state 21 at the address I by way of a AND gate 404*c*. It may also be read in response to control state 18 at address I by way of AND gate 404*d*. Gates 404*c* and 404*d* are connected to unit 404*a* by way of OR gate 404*e***.

A K register 406 stores K values representing a value at any point in time which defines the path under test. These are numerical values utilized in determining where the operation is in the diagram of FIGS. 21 and 21A. IDUM values from unit 191, FIG. 22, are stored in registers 406 by way of an input select unit 406*a*. The address in K register 406 at which such values are stored is determined by the output of AND gate 406*b* having the I values applied to one terminal thereof and in response to either control state 17 and 25 from gate 405*h*.

The values stored in K register 406 may be read by way of output select unit 406*c*. The address is selected in response to control state 34 by way of AND gate 406*d*, the address being the value I from register 402. The output is applied by way of AND gate 406*e* and OR gate 406*f* to IDUM register 191.

The IDUM register 191 may also be loaded with the quantity I+1 by way of the summation unit 406*i* and AND gate 406*j* in response to control state 38.

An ITOT register 403 is provided to store a value representative at any time of the total error for the particular leaf under consideration. The value is derived from IE(I) register 404 as read by unit 404*a*. The latter value appears on path 403*a* connected to AND gates 403*b* and 403*c*. AND gate 403*b* is enabled by control states 18 and 26 by way of OR gate 403*d*. AND gate 403*c* is enabled by control states 21 or 35 by way of OR gate 403*e*. The output from register 403 is applied to a summation unit 403*f* along with the outputs of AND gate 403*b*, the sum being applied by way of AND gate 403*g* and OR gate 403*h* to register 403. The difference output is derived by a subtraction unit 403*i* whose output is connected by way of AND gate 403*j* and OR gate 403*h* to register 403.

Comparator 350, responsive to control state 33, compares the I value from register 402 with zero from source 353 to produce the appropriate outputs on output lines 351 and 352.

Comparator 360, in response to control state 19 or 28 applied through OR gate 363, compares the I value from register 402 with the N value from register 201, FIG. 22, to produce the appropriate output states on lines 361 and 362.

Comparator 370 compares the value stored in register 403, namely ITOT, with the value in register 409, namely ITOTAL. ITOTAL register 409 contains a value representative at any given time of the smallest error encountered at that time. The comparison in unit 370 is carried out in response to control state 27. The value from register 403 may be stored in register 409 in response to control state 20 by way of AND gate 409*a*. The output of comparator 370 appears on lines 371 and 372 and is true if the value stored in register 403 is greater than the value stored in register 409.

Comparator 380, in response to control state 30, determines whether or not the value stored in register 409 is equal to the value stored in register 403 to produce the appropriate voltage states on output lines 381 and 382.

JC register 401 is a dummy register for storing integers. In response to control states 16, 21 and 31, a 1 from source 401*a* is applied by way of AND gate 401*b* to an adder 401*c*, the output of which is connected to the input of register 401. The contents of unit 401 is incremented by way of AND gate 401*b* in response to control state 21.

The output of register 401 is connected by way of AND gate 401*e* along with control state 20 to select addresses for storage of values by way of input select units 407*a* and 408*a* leading to sets of registers 407 and 408, respectively. The output of register 401 is also connected to a comparator, 390. The outer input to comparator 390 is supplied by way of unity source 393 and adder 394 so that there appears on line 395 the quantity I+1. In response to control state 39, comparator 390 determines whether or not the contents of JC are equal to I+1. Appropriate voltage states will then appear on output lines 391 and 392.

Selected values from output select unit 210 are applied by way of AND gate 407*b* along with control state 20 for storage by way of input select unit 407*a* for registers 407. Similarly, selected values from output select unit 220 are applied by way of AND gate 408*b* along with control state 20 for storage in registers 408 by way of input select unit 408*a*.

Values stored in registers 407 and 408 are selected to be read by way of output select units 407*c* and 408*c*. The address from which values are to be read are specified by IDUM signals appearing at the output of IDUM unit 191 and control state 41, the latter being applied by way of AND gates 407*d* and 408*d*. It will be noted that control states 37 and 38 are connected to OR gate 408*e* to read from address I+1 in register 408 through unit 408*c*. Control states 37 and 38 are connected through AND gate 408*f* and OR gate 408*g*.

The output read by unit 407*c* is applied to a divider 407*f*. The second input to divider 407*f* is provided at the output of unit 408*c*. The output of divider 407*f* is transmitted by way of AND gate 407*g* as enabled by control state 41 to the input register 152, FIG. 22.

The output select unit 408*c* is connected to comparator 400 and in response to control state 37 determines whether or not the value read by unit 408*c* is greater than the value stored in an ITOT dummy register 403. Thus, output states appear on output lines 401 and 402. The value stored in register 403 is the value I from register 402 in response to control state 36. This value is stored by way of AND gate 403*a* and AND gate 403*b*. The value from select unit 408*c* may be stored in register 403 by way of AND gate 403*c* in response to control state 38.

Comparator 410 is employed to determine whether or not the quantity ID(2,IDUM+1) as it appears at the output of select unit 220 is greater than the quantity IDUM stored in register 191. More particularly, the output of unit 220 is connected by way of AND gate 410*a* to the comparator. The output of IDUM register 191 is connected by way of AND gate 410*b*. By this means appropriate voltage states appear on lines 411 and 412.

EXPANDED SEARCH OPERATION

In execution, it should be remembered that the key components stored in registers 184 and 221, FIG. 23, are identifiers that define specific trained responses. When an untrained key occurs, a key component has been generated from a key comprising a set of key components that has been encountered for which no such key occurred in training. The expanded search operation is based upon the proposition that since the keys describe the appropriate trained responses, then a comparison of the untrained key with the trained keys is an intelligent means for applying what has been trained to a new unknown which is encountered in similar circumstances. Therefore, the difference between the untrained key and the trained key of the file is made the criteria for determining responses appropriate to the new input condition which is the untrained key. Thus, during execution when an untrained point is encountered, the operation shifts to control state 16. Control state 16 is the first control state in the flow diagram of FIG. 21. On control state 16 the registers JC and IDUM are set to a value of one. Register ITOT is set to zero. .

On control state 17, the value ID(1,IDUM) and the value IX(I) are fetched from their storage registers. ID(1,IDUM) is read from register 184. IX(1) is read from register 168. The difference between them is then produced in unit 405*g* and the difference is multiplied in unit 405*i* by the weighting function from register 405. The result is then stored in the first element IE(1) of register 404. At the same time, the value IDUM is loaded into the K register 406.

On control state 18, register A ITOT 403 is loaded with the error value stored in register IE(1). The new key component stored in register 168 has thus been compared with the value stored in register 184. The difference is produced and is stored in array 404 and in the ITOT register 403. The difference for the second comparison is added to the ITOT register 403.

On control state 19, a comparison is made to see if the contents of I register 402 equals the contents of N register 201. Since in this example N=2 and at this time I=1, the answer is no. N indicates the number of levels in the tree.

As a result on control state 22, I register 402 and IDUM register 191 are incremented. Thereafter, control states 17 and 18 are repeated with I=2. Following the repeat of states 17 and 18, the comparison of state 19 is true so that the operation proceeds to control state 20. In response to control state 20 the value stored in the ITOT register 403 is stored in the ITOTAL register 409. The number in the ITOTAL register 409 is the total DIF resulting from the comparison between the untrained key in registers 168 and 169 and the trained key in the first two nodes in the first two registers in Register 184. The register IGI(JC) is enabled to receive and store the G value from register 184 found at the address ID(1,IDUM+1). Similarly, the register 408 receives the A value from register 221 found at the address ID(2,IDUM+1).

On control state 20 the value stored in register IE(N) is subtracted from he quantity stored in register 403 and the difference is then stored in register 403. At the same time JC register 401 is incremented.

On control state 23 a comparison is made to see if ID(2,IDUM) is greater than IDUM, to see if the search is at the leaf level. If the search is not at the leaf level, the search continues.

Control state 24: At control state 24 a signal is applied for a circuit 224 in FIG. 23, the output of which is applied to circuit 223, the output of which is connected to output select unit 220, thereby causing the ADP of the node which had just been searched to identify the next node in the filial set to be searched.

Control state 25: The value ID(1,IDUM) and the value IX(2) are fetched from their storage registers. ID(1,IDUM) is read from register 184 and it is the value of the third node in that register so that it is ID(1,3). IX(I) is read from register 168. The difference between them is then produced in unit 405G and the difference is multiplied in unit 405I by the weighting function from register 405. The result is then stored in the first register IE(1) in register 404. At the same time the value IDUM is loaded into the K register 406.

Control state 26: On the control state 26 the ITOT register 403 is loaded with the error value stored in register IE(1). The key component stored in register 169 has thus been compared with the value of node three stored in the third register of register 184. The difference is produced and stored in array 404 in the first register of that array. The difference is also transferred over channel 403A and added to the present contents of the ITOT register 403 and then restored in the ITOT register 403. The ITOT register 403 now contains the accumulated difference resulting from the comparison of the first key component and the value in node 3.

Control state 27: At control state 27 the contents of the ITOTAL register 409 are compared with the contents of the ITOT register 403 in comparator 370. If the ITOT is not greater than the contents of the ITOTAL register 409 the next control state is 28. Control state 28 determines if the search is at the leaf level. If it is not, control state 29 selects the next node in that filial set to be searched in the tree and returns to control state 25 for a calculation of the difference between the key component and the value in that next node.

Control state 27: At control state 27 the contents of the ITOTAL register 409 are compared with the contents of the ITOT register 403 in comparator 307. The comparison will determine whether or not further search is continued towards the leaf level, and if that trained key needs to be searched further. This is determined in this specific example by whether the difference accumulated in the ITOT register 403 is already greater than the total difference stored in the ITOTAL register 409. If it is, there is no further need to proceed with an Expanded Search along this filial set and we can proceed to examine other trained keys and their trained responses.

CONTROL STATE 27 — NODE REJECTION

The decision to reject the nodes and not go further in that search may be determined by several different criteria. The particular criteria used here is a direct comparison with the best previous DIF, which is stored in the ITOTAL register 409, with the running or accumulated DIF, which is stored in the ITOT register 403, at comparator 370 in response to control state 27. If the comparison indicates that the total accumulated DIF at this point in the search operation as indicated in the ITOT register 403 is worse than the total DIF or best previous DIF as indicated in the ITOTAL register 409, there is no need to continue the search operation so that the search operation can start on a new trained key.

Control state 35: In control state 35 a voltage signal is applied to circuit 403E, then to circuit 403C and applied to subtractor 403I to subtract from the ITOT register 403 the difference or DIF contribution of the last node value searched, to continue the search at a new node.

Control state 23: Control state 23 determines if there are any more nodes in this filial set. If there are, the search continues to control state 24 where a new value in a different leaf is examined in the manner previously described. The purpose of the Expanded Search is to find a DIF which is better than the best previous DIF recorded. If there are no further nodes in that filial set the operation goes to control state 32.

Control state 32: Applies a voltage signal to AND circuit 402K so that the level indicator in the I register 402 has a 1 subtracted from it by the subtractor 402B in the accumulator 402D. The search backs up to the next previous node to determine if there is a node in that filial set that the search can continue to.

Control state 33: Control state 33 is applied to comparator 350 wherein the contents of the I register indicating the level at which the search is at is compared with 0 generated by register 353. If the search is at the beginning of the tree, this comparison will be true so that the next control state will be the output decision control states 36–41 which will be described.

If the comparison is false, this indicates that the search is not yet at the beginning of the tree so that the control state 34 is the next control state.

Control state 34: Control state 34 is applied to AND circuit 406D applying the level indicator from level register 402 (which is now set at the next previous level) to the output select unit 406D to select the node at the previous level with the indication of such a node being in the K register 406. After this node at the previous level has been selected the search continues to control state 35 which (as previously described) subtracts the error contribution of the node so that the search can continue to the node in the same level in that filial set.

Control state 43: When switch 43a as shown in FIG. 21 and in FIG. 27 has been closed, a preassigned value is assigned to the ITOTAL register 409. Thus control steps 17, 18, 19 and 22 are no longer used for the reason that these original control states were set to determine an ITOTAL or DIF for trained key already in the tree so that subsequent search operations in the expanded search could determine a better DIF than that one. Experience may be used to determine a first or preassigned value for an ITOTAL (or best DIF) which will save a significant amount of effort during search in that control state 27 for node rejection (or waiver of examination) can take place and waive examination of a significantly larger number of nodes during the expanded search operation. There is the danger that preassigned ITOTAL may be set at too low a level, and there may not be an answer. This emphasizes the importance of presetting the ITOTAL register 409.

ADD/REPLACE RESPONSE

Control state 30: This state comes after control state 28. Control state 28 has decided that the leaf level of the filial set has been reached so that there is a new total DIF in the ITOT register which must replace or be added to the response in the IGI and IAI resistors. Control state 30 is applied to comparator 380 in FIG. 27 comparing the contents of the ITOT register 403 and the ITOTAL register 409. The ITOT register 403 contains the total DIF for this particular search on this node chain and the ITOTAL register 409 contains the best previous DIF. There is a voltage state on output line 381 or output line 382 depending upon the results of that comparison. If the new DIF in the ITOT register is better than the previous best DIFs then the answer is no and control state 31 resets the JC register 401 to 1 and control state 20 stores the new information in the ITOTAL register 409. If the new DIF is equal to or within predetermined limits similar to the previous best DIF then the response corresponding to that DIF is added, and the JC register is incremented by 1 to indicate that there is a new response in the IAI register 408 and the IGI register 407.

There are other criteria which could be used to determine rather to add or replace the response for a new best DIF.

If the ITOT register is equal to the ITOTAL register then the DIF is equal to the best previous DIF. If so, proceed as we have described in this example to add the response.

The second criteria is if the ITOT register is less than the ITOTAL register (meaning that the new DIF is better than the best previous DIF) then we replace the previous DIF, as has been described in the previous example.

For the third possible criteria the DIFs for each of the nodes when the key components have been compared with the values may be taken into account. Therefore, the DIFs stored in the IE(I) register 404 may be individually compared with a separate IE(I) register provided for each DIF which has previously been stored, and each individual DIF for each node may be examined to determine whether to add or replace that previous stored total DIF. Another criteria would be to take the two DIFs when a DIF has been determined to be approximately equal to the best previous DIF, and look at the maximum DIF for a specific node for the best previous DIF stored and the maximum DIF for the particular DIF now under consideration and determine which of these DIFs is greater and depending upon which individual node DIF is the largest.

There may be combinations of these criterias which may be used to determine whether or not to add or replace DIFs.

OUTPUT DECISION

Figure 21A:
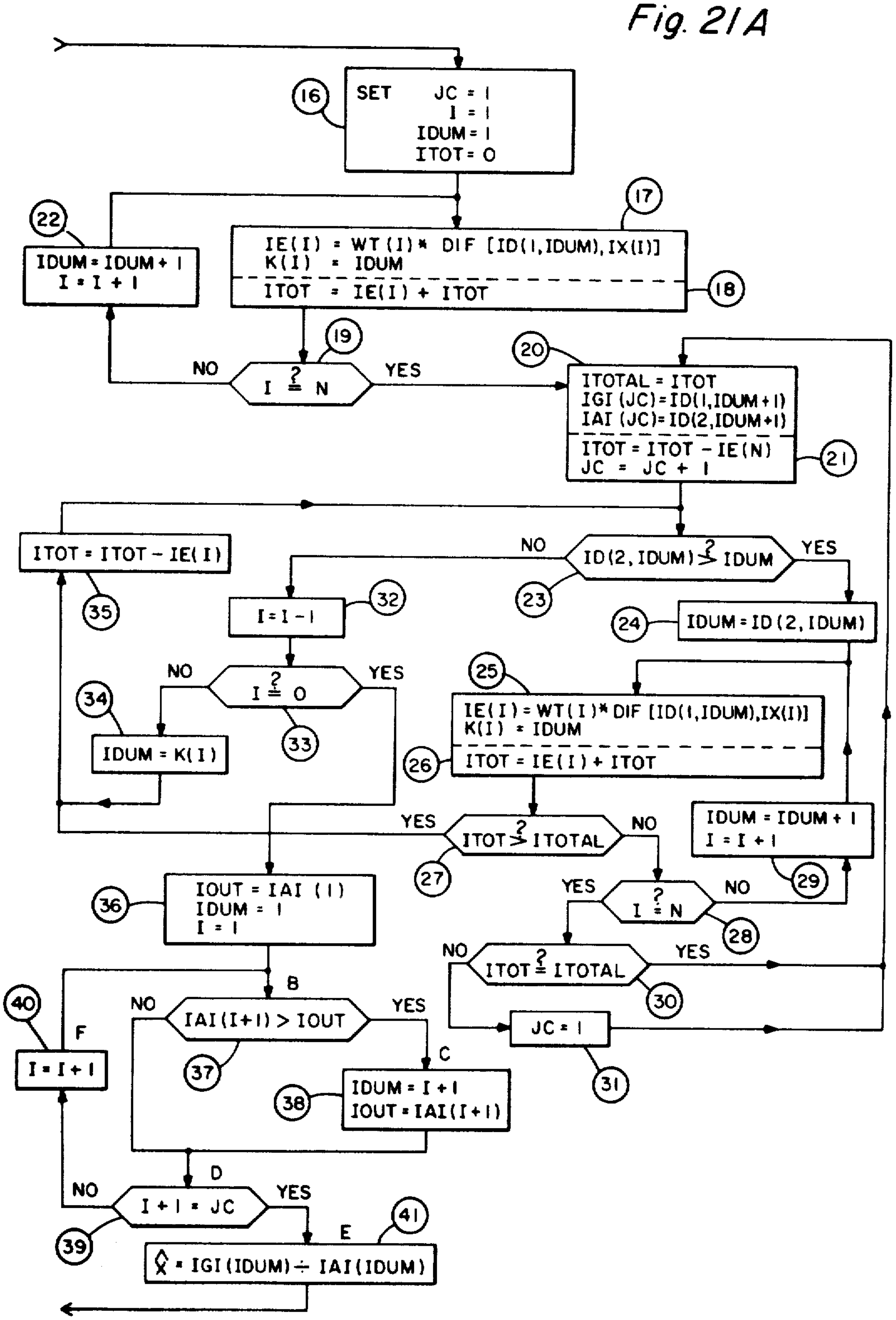

The output decision made in control states 36–41 of FIGS. 21A selects an output from the results obtained by the search procedure based on maximum likelihood criteria. For example, suppose several answers are retrieved all of which satisfy the minimum error criteria $$\sum_{i=1}^{N} WT(i)*DIF[IX(i), KEY(i)]$$

Then JC = number trained responses which satisfies the selected DIF criterion and the IGI and IAI registers contain their G and A values. A decision is then made as to which answer to select. By way of example, suppose three trained responses all satisfy the selected DIE criterion then IGI, IAI registers contain the following G's and A's:

| IGI | IAI |
|---|---|
| $G_1$ | $A_1$ |
| $G_2$ | $A_2$ |
| $G_3$ | $A_3$ |

The output decision may yield any of the following:

a. Maximum Likelihood — Determine which $A_i$ is largest and make $\hat{X}=G_i/A_i$ for the value of i as above described b. Majority Rule — Calculate $\hat{X}_i = G_i/A_i$ for $i$=1,2,3. If two or more of the $\hat{X}_i$ agree, select that value.

c. Weighted Average — Make $\hat{X} = (G_1 + G_2 + G_3)/(A + A_2 + A_3)$.

In addition to the Maximum Likelihood, Majority Rule, and Weighted Average choices above discussed, a nearest neighbor or a committee method may be used. In the nearest neighbor (*k*NN) and committee rule several responses are located rather than a single response (in general) as is done in the processor described by flow graphs. In *k*NN a value is assigned to *k* and then *k* responses are located whose mismatch is smallest. For example, if $k = 6$, the six responses with the smallest mismatch would be located without any consideration as to the magnitude of the mismatch.

In committee method as defined here, a mismatch threshold is assigned and all responses which have a mismatch below this threshold are used in a majority decision. Thus, several such responses are located but all are assured to be below the mismatch threshold. The majority rule is then employed.

GENERAL PURPOSE COMPUTER

Following is a description of an implementation of the invention in a general purpose computer. The Control state shown in the flow graphs have been implemented by program instructions.

PROGRAM A

This program is a multimodal search with two different DIFs at different levels of the tree. This program also has a multi-output decision. The node rejection is based upon total accumulation as described in the previous examples.

This program follows the flow chart shown in FIG. 21 with some exceptions which will be described.

The multimodal search with two DIFs has the first DIF at the first level being the absolute value difference between the first key component and the value in the first level nodes. The search in all subsequent levels depends upon a different DIF which is described later in this description. Thus the best trained response is determined by a plurality of DIFs.

The particular problem to which this program is directed has a 15 × 15 array so that there are 225 different individual segments of information which must be compared. This means that there will be a reference key with 225 different segments of information and there will be a query key of 225 different segments. This would normally result in a 225-level tree. However, in this particular problem each segment is either 0, 1, 2, or 3. Therefore it is only necessary to have two binary bits for each segment of information. The particular machine which the program is being run on is a 32-bit machine so with 15 by 15 array it is possible to have 15 two-bit segments. Therefore, it is possible to store all 15 segments in a 30-bit register and then compare 2-bit segments of the key components with the corresponding 2-bit segments in the node values.

For information storage this particular program stores the total DIF plus the G and the A. This information is stored under the condition that the value of the ITOT, which is the accumulated value of the DIF, is equal to the best ITOTAL which is the best DIF to date. This is the same as that given in the previous examples.

The output decision is based upon two output decisions. The first is a logic variable which is a true-false variable. The term IAVE determines which output decision is used. The first output decision is simply to list all responses stored. The second output decision is to use all responses and determine a single response which is the weighted average of the responses stored. The expanded search in this program is designed to be used with the tree designed for the Probability Sort. This means that the statement in control state 22 is IDUM equals ID(3IDUM) rather than I equals I+1. The statement in control state 29 is IDUM equals ID(3IDUM) rather than I equals I+1.

In the program the following symbols are as follows:

M, I, D, IX, I.E., are all variables and are the same as those shown in FIG. 21 and as described previously in describing that FIGURE.

IERR is equivalent to ITOTAL as shown and described in flow chart in FIG. 21. IETOT is equivalent to ITOT in the flow chart in FIG 21. K(1) is equivalent to K in the flow chart. The J array is an array similar to the K(1) array. A DIF [IX(I1), ID(1,I2), 15, I1, 2] is equivalent to the DIF in control points 17 and 25 in flow chart 25, when I is greater than 1.

IABS [I-IX (1) ] is equivalent also to the DIF shown in control states 17 and 25 in FIG. 21 when I equals 1.

M1 is a measure of the amount of direct storage allocated for the first level.

RS is a scaling factor to preserve decimal location since a response is stored as an integer.

W and IW and NW are variables used to indicate the response chosen.

IZI is the array in which A is stored.

IYI is the array in which the G information is stored.

IXI is the array in which is stored the value of the ITOTAL for the G and A which is stored.

IUNTRN is a logic variable set to false during expanded search. If the output decision option is chosen then the weighted average is determined as a response.

This program also enters with a predetermined ITOTAL as shown in control state 43 in FIG. 21. Therefore control states 17, 18, 19 and 22 as shown in the FIG. 21 are not shown or used in this program.

The control states are equivalent to those shown and described with relation to FIG. 21 in the following manner. The operation of the program itself after these steps have been described operates in the same manner as the description with reference to FIG. 21 and the specific example which is then described with respect to a specific tree.

Needless to say, in this description of the program the program is operating during execution and during expanded search. The program is going into a tree which has already been trained with a query or test key to find the best trained response for the query key. During this expanded search operation to significantly save time during the search some portions of the tree will have the search waived through the particular node rejection criteria which has been described. The ITOTAL has been preset with a DIF as has also been described. Depending upon what criteria results, the different information will be read out in the form of either a weighted average for the best response or all of the information will be read out for external processing.

Steps 9 and 16 in the program are equivalent to control state 25 in FIG. 21 where the DIF is calculated between the key component in the query key and the storage value in the node of the trained key. As described previously two DIFs are calculated:: the DIF for the first level being an absolute difference and the DIF for the second level is another DIF.

The DIF for the subsequent levels is shown in step 16. There are 15 segments, two bits in each segment. The LDIF in step 16 takes the first segment of the key component and compares it with the first segment of the node value, and takes the absolute difference. It then takes the absolute difference of the second through the fifteenth segments of the key components and the node values, respectively, and then adds the differences, which sum then becomes the DIF resulting from the comparison of that key component and node value.

Steps 10 and 18 in the program are equivalent to control state 27 in FIG. 21 which determines node rejection or waiver of examination during Expanded Search. This is where in the specific example herein the DIF at any particular node calculation is already greater than the best previous DIF already stored. In this specific example of course the best previous DIF is an arbitrary one chosen before the operation starts. This insures that all of the tree need not be searched.

Steps 11 and 19 in the program are equivalent to the K assignment which is the second statement in control statement 25 which determines which node corresponds to this DIF.

Step 17 in the program is equivalent to control state 16 shown in FIG. 21 and described previously. Control state 16 sets the JC and I register, IDUM registers and ITOT registers at predetermined values.

Step 22 of the program is equivalent to control state 35 of the flow chart shown in FIG. 21 wherein error contribution of a node is subtracted from the ITOT register.

Step 23 of the program is equivalent to control state 23 of the flow chart shown in FIG. 21 wherein it is determined if there are any further nodes in that filial set which is being searched.

Step 24 of the program is equivalent to control state 24 shown in the flow chart wherein the ADP of the node at which the search is directs the search to the next node in the filial set.

Step 27 of the program is equivalent to control state 32 of the flow chart and shown in FIG. 21 wherein the level designation backs up on e level at a time.

Step 36 of the program is equivalent to control state 30 of the program. Control state 30 will be noted — the question is whether or not the response is added or replaces the response already stored.

Steps 44, 45, 46 and 47 are instructions to determine what information is stored and is equivalent to control state 20 in FIG. 21.

Step 70 in the program is the decision block which is equivalent to control states 36 through 41 which determine which output decision is to be used in the determination of the response for the query or test key which has been entered.

Steps 71 through 81 of the program are blocks which are used to simply list the responses if that is the decision determined by the output decision step.

Steps 82 through 94 are used when the weighted average of the responses is a correct decision to be calculated. This is in response to the output decision step 70.

PROGRAM B

The multimodal operation for Program B is the same for Program A. There are two different DIFs. There are also two output decisions.

MULTICRITERIA

The node rejection in Program B is multicriteria. The node rejection is based upon either of the following:

1. the total accumulation of error; or
2. when any individual error or DIF for any individual node exceeds a threshold which is predetermined.

The steps in Program B are equivalent to those in Program A with the following differences.

Step 2 enters the value for the threshold to be used for determining whether or not expanded search should be waived or avoided at any individual node when the DIF for that node exceeds the predetermined threshold.

Step 18 tests to determine if the individual contribution to the error or DIF exceeds a threshold. In other words, is the individual contribution to the DIF for that specific node which is being searched too large? If it is then further search along that particular trained key is avoided or waived and then there is a branch or skip to step 25.

Step 25 is labeled as a Fortran statement 1. This is equivalent to control state 23 in FIG. 21. This tests to determine if there are any more nodes in this filial set. Depending upon the answer, the operation continues as previously described for Program A and also for the operation shown in the flow chart in FIG. 21.

PROGRAM A

FORTRAN IV G LEVEL 1, MOD 3    ESPI

```
0001...        SUBROUTINE ESP1(N,MI,ID,IERR,IX,W,IUNTRN)
0002...        DIMENSION IXI(40),IYI(40),IZI(40),ID(4,1),IX(1), K1(31),J(31),IE 1 (31)
         C     THE DIMENSION FOR K1(  ), J(  ), AND IE(  ) SHOULD BE EQUAL TO N.
0003...        COMMON MI, RS
0004...        LOGICAL *4 IAVE,IUNTRN
0006...        JC=0
```

PROGRAM A—Continued

FORTRAN IV G LEVEL 1, MOD 3 ESPI

```
      IAVE=.FALSE.
      DO 111 I=1,M1
      IF(ID(2,1).EQ.0) GO TO 111
      IE(1)=IABS(I-IX(1))
      IF(IE(1).GT.IERR) GO TO 111
      K1(1)=I
      IETOT=IE(1)
      M=2
    7 DO 10 I1=M,N
      I2=K1(I1-1)
    6 IE(I1)=LDIF(IX(I1),ID(1,I2);15,I1,2)
      IETOT=IETOT+IE(I1)
      IF(IETOT.GT.IERR) GO TO 11
      K1(I1)=ID(3,I2)
      J(I1)=I2
      GO TO 10
   11 IETOT=IETOT-IE(I1)
      IF(ID(2,I2).LE.I2) GO TO 606
      I2=ID(2,I2)
      KI(I1-1)=I2
      GO TO 6
  606 I4=I1-1
  607 IF(I4.LT.2) GO TO 111
      IETOT=IETOT-IE(I4)
      I3=J(I4)
      IF(ID(2,I3).LE.I3) GO TO 12
      GO TO 16
   12 I4=I4-1
      GO TO 607
   10 CONTINUE
      IF(IETOT.EQ.IERR) GO TO 15
      IERR=IETOT
      JC=0
   15 JC=JC+1
      IF(JC.LE.40) GO TO 17
      WRITE(6,20)
   20 FORMAT(5X,'MORE LEAVES HAVE MINIMUM DEVIATION THAN EXPECTED.STOP')
      GO TO 5
   17 IXI(JC)=IERR
      IYI(JC)=K1(N)
      I5=J(N)
      IZI(JC)=ID(4,I5)
      I6=N
      IETOT=IETOT-IE(N)
      IF (ID(2,I5).GT.I5) GO TO 14
   13 M=I6-1
      IF(M.LT.2) GO TO 111
      I5=J(M)
      IF(ID(2,15).LE.15) GO TO 18
      K1(M-1)=ID(2,15)
      J(M)=K1(M-1)
      IETOT=IETOT-IE(M)
      GO TO 7
   18 I6=I6-1
      IETOT=IETOT-IE(M)
      GO TO 13
   16 M=I4
      K1(I4-1)=ID(2,I3)
      GO TO 7
   14 M=N
      I5=J(N)
      K1(N-1)=ID(2,I5)
      GO TO 7
  111 CONTINUE
      IF(IAVE) GO TO 110
      WRITE(6,100) IXI(JC)
  100 FORMAT(9X,'THE FOLLOWING OUTPUT(S) HAVE HAMMING ERROR OF ',I9)
      DO 101 I=1,JC
      W=IYI(I)/RS
      IW=W
      NW=MOD(IW,43)
      WRITE(6,102)IW,NW
  102 FORMAT(13X,'OUTPUT=',' SEQ NUMBER',I6,' WORD IS',I3/)
  101 CONTINUE
      IUNTRN=.TRUE.
      GO TO 4
  110 SUM=0.0
      IAUM=0
      DO 104 I=1,JC
      W=(IYI(I)*IZI(I))/RS
      SUM=SUM+W
      IAUM=IAUM+IZI(I)
  104 CONTINUE
      W=SUM/IAUM
      WRITE(6,106) IERR
  106 FORMAT(10X,'TOTAL ERROR ESP YIELDS HAM DISTANCE OF ',I9)
      WRITE(6,105)W
  105 FORMAT(5X,'TOTAL ERROR ESP ANSWER IS',F10.5)
    4 CONTINUE
      RETURN
    5 STOP
      END
```

PROGRAM B

FORTRAN IV G LEVEL 1, MOD 3 ESPI

```
      SUBROUTINE ESP1(N,M1,ID,IERR,IX,W,IUNTRN)
      COMMON/THRES/ITH
      DIMENSION IXI(40),IYI(40),IZI(40),ID(4,1),IX(1),K1(31),J(31),IE 1 (31)
C     THE DIMENSION FOR K1( ), J( ),AND IE( ) SHOULD BE EQUAL TO N.
      COMMON MI,RS
      LOGICAL*4 IAVE,IUNTRN
      JC=0
      IAVE=.FALSE.
```

FORTRAN IV G LEVEL 1, MOD 3     ESPI

```
          DO 111 I=1,M1
          IF(ID(2,I).EQ.O) GO TO 111
          IE(I)=IABS(I-IX(I))
          IF(IE(I).GT.IERR) GO TO 111
          K1(1)=I
          IETOT=IE(1)
          M=2
     7    DO 10 I1=M,N
          I2=K1(I1-1)
     6    IE(I1)=LDIF(IX(I1),ID(1,I2),12,I1,2)
          IF(IE(I1).GT.ITH)GO TO 1
          IETOT=IETOT+IE(I1)
          IF(IETOT.GT.IERR) GO TO 11
    36    K1(I1)=ID(3,I2)
          J(I1)=I2
          GO TO 10
    11    IETOT=IETOT-IE(I1)
 1        IF(ID(2,I2).LE.I2) GO TO 606
          I2=ID(2,I2)
          K1(I1-1)=I2
          GO TO 6
   606    IR=I1-1
   607    IF(I4.LT.2) GO TO 111
          IETOT=IETOT-IE(I4)
          IE=J(I4)
          IF(ID(2,I3).LE.I3) GO TO 12
          GO TO 16
    12    I4=I4-1
          GO TO 607
    10    CONTINUE
          IF(IETOT.EQ.IERR) GO TO 15
          IERR=IETOT
          JC=0
    15    JC=JC+1
          IF(JC.LE.40) GO TO 17
          WRITE(6,20)
    20    FORMAT(5X,'MORE LEAVES HAVE MINIMUM DEVIATION THAN EXPECTED.STOP')
          GO TO 5
    17    IXI(JC)=IERR
          IYI(JC)=K1(N)
          I5=J(N)
          IZI(JC)=ID(4,I5)
          I6=N
          IETOT=IETOT-IE(N)
          IF (ID(2,I5).GT.I5) GO TO I4
    13    M = I6 -1
          IF(M.LT.2) GO TO 111
          I5 = J(M)
          IF(ID(2,I5).LE.I5) GO TO 18
          K1(M-1)=ID(2,I5)
          J(M)=K1(M-1)
          IETOT=IETOT -IE(M)
          GO TO 7
    18    I6 -I6 -1
          IETOT=IETOT -IE(M)
          GO TO 13
    16    M=I4
          K1(I4 -1)=ID(2,I3)
          GO TO 7
    14    M=N
          I5=J(N)
          K1(N -1)=ID(2,I5)
          GO TO 7
   111    CONTINUE
          IF(IAVE) GO TO 110
          WRITE (6,100) IXI(JC)
   100    FORMAT (9X,'THE FOLLOWING OUTPUT(S) HAVE HAMMING ERROR OF ', I9)
          DO 101 I=1,JC
          W=IYI(I)/RS
          IW=W
          NW=MOD(IW,43)
          WRITE (6,102)IW,NW
   102    FORMAT (13X, 'OUTPUT=',' SEQ NUMBER', I6,' WORD IS', I3/)
   101    CONTINUE
          IUNTRN=.TRUE.
          GO TO 4
   110    SUM=0.0
          IAUM=0
          DO 104 I=1,JC
          W=(IYI(I)*IZI(I))/RS
          SUM=SUM+W
          IAUM=IAUM+IZI(I)
   104    CONTINUE
          W=SUM/LAUM
          WRITE (6,106) IERR
   106    FORMAT (10X, 'TOTAL ERROR ESP YIELDS HAM DISTANCE OF', I9)
          WRITE (6,105)W
   105    FORMAT (5X, 'TOTAL ERROR ESP ANSWER IS', F10.5)
     4    CONTINUE
          RETURN
     5    STOP
          END
```

What is claimed is:

1. A method of operating a trained processor comprised of at least one memory array in which reference signals are stored along with associated trained responses forming a data base to locate and extract a desired output to query signals, which method comprises:

a. in a first mode, searching through reference signals stored in a memory array comprising said at least one memory array with a query signal;

b. selecting one or more of said reference signals from such memory array according to a first preselected criterion;

c. retrieving from such memory array first mode trained responses associated with the reference signals selected according to said first criterion, said first mode trained responses determining the domain of a search to be conducted in a second mode;

d. and in said second mode, searching through reference signals stored in a memory array comprising said at least one memory array is determined by said first mode trained responses;

e. selecting one or more of said reference signals from such memory array for said query signal according to a second preselected criterion; and f. retrieving from such memory array second mode trained responses associated with the reference signals selected according to said second criterion.

2. The method of claim 1 wherein said second mode trained responses provide the desired output of the trained processor to said query signals.

3. The method of claim 1 wherein said at least one memory array comprises a single tree-structured array, the reference signals stored in said tree-structured array being searched in said first mode and only those reference signals selected during said first mode being searched in said second mode.

4. The method of claim 1 wherein said at least one memory array comprises a plurality of separate tree-structured arrays, at least one tree-structured array for each mode, the reference signals stored in one of said tree-structured arrays being searched in said first mode, and said first mode trained responses determining reference signals stored in another of said tree-structured arrays to be searched in said second mode.

* * * * *